United States Patent
Fleizach et al.

(10) Patent No.: US 9,298,360 B2
(45) Date of Patent: Mar. 29, 2016

(54) ACCESSIBILITY TECHINQUES FOR PRESENTATION OF SYMBOLIC EXPRESSIONS

(71) Applicant: Apple Inc., Cupertino, CA (US)

(72) Inventors: Christopher B. Fleizach, Morgan Hill, CA (US); Eric T. Seymour, San Jose, CA (US); Gregory F. Hughes, San Jose, CA (US); Mike Pedersen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 13/750,199

(22) Filed: Jan. 25, 2013

(65) Prior Publication Data

US 2014/0210828 A1    Jul. 31, 2014

(51) Int. Cl.
| | |
|---|---|
| G06T 11/00 | (2006.01) |
| G06F 3/041 | (2006.01) |
| G06F 3/048 | (2013.01) |
| G06F 3/033 | (2013.01) |
| G10L 13/00 | (2006.01) |
| G10L 13/08 | (2013.01) |
| G06F 3/0488 | (2013.01) |
| G06T 11/20 | (2006.01) |

(Continued)

(52) U.S. Cl.
CPC .......... *G06F 3/0488* (2013.01); *G06F 3/04842* (2013.01); *G06F 3/04883* (2013.01); *G06F 3/04886* (2013.01); *G06T 11/203* (2013.01); *G10L 13/07* (2013.01); *G10L 13/08* (2013.01)

(58) Field of Classification Search
CPC ..... G06T 11/203; G10L 13/08; G06F 3/0488; G06F 3/0481; G06F 3/04883; G09B 21/006; G06K 9/18; G06K 9/48; G06K 9/72

USPC .......... 345/467–471, 173; 715/764, 765, 767, 715/781, 802, 863; 704/258, 260; 382/114, 382/182–184, 198, 200, 229
See application file for complete search history.

(56) References Cited

U.S. PATENT DOCUMENTS

| | | |
|---|---|---|
| 5,572,625 A | 11/1996 | Raman et al. |
| 6,323,846 B1 | 11/2001 | Westerman et al. |

(Continued)

OTHER PUBLICATIONS

Mathematical Markup Language (MathML) Version 3.0; Oct. 21, 2010 (385 pages).

(Continued)

*Primary Examiner* — Phi Hoang
*Assistant Examiner* — Andrew Shin
(74) *Attorney, Agent, or Firm* — Fenwick & West LLP

(57) ABSTRACT

Methods for presenting symbolic expressions such as mathematical, scientific, or chemical expressions, formulas, or equations are performed by a computing device. One method includes: displaying a first portion of a symbolic expression within a first area of a display screen; while in a first state in which the first area is selected for aural presentation, aurally presenting first information related to the first portion of the symbolic expression; while in the first state, detecting particular user input; in response to detecting the particular user input, performing the steps of: transitioning from the first state to a second state in which a second area, of the display, is selected for aural presentation; determining second information associated with a second portion, of the symbolic expression, that is displayed within the second area; in response to determining the second information, aurally presenting the second information.

54 Claims, 32 Drawing Sheets

(51) Int. Cl.
*G10L 13/07* (2013.01)
*G06F 3/0484* (2013.01)

(56) References Cited

U.S. PATENT DOCUMENTS

| | | | |
|---|---|---|---|
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,657,849 | B2 | 2/2010 | Chaudhri et al. |
| 7,663,607 | B2 | 2/2010 | Hotelling et al. |
| 7,694,231 | B2 | 4/2010 | Kocienda et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0026536 | A1 | 2/2006 | Hotelling et al. |
| 2006/0033724 | A1 | 2/2006 | Chaudhri et al. |
| 2006/0161871 | A1 | 7/2006 | Hotelling et al. |
| 2006/0197753 | A1 | 9/2006 | Hotelling |
| 2007/0100883 | A1* | 5/2007 | Rose et al. .................. 707/104.1 |
| 2007/0136334 | A1* | 6/2007 | Schleppenbach et al. .... 707/101 |
| 2007/0152980 | A1 | 7/2007 | Kocienda et al. |
| 2008/0165160 | A1 | 7/2008 | Kocienda et al. |
| 2010/0309147 | A1 | 12/2010 | Fleizach et al. |
| 2010/0309148 | A1 | 12/2010 | Fleizach et al. |
| 2010/0313125 | A1 | 12/2010 | Fleizach et al. |
| 2011/0016165 | A1* | 1/2011 | Uejima .......................... 708/141 |
| 2012/0036468 | A1* | 2/2012 | Colley .......................... 715/773 |
| 2012/0107779 | A1* | 5/2012 | Halton et al. ................. 434/188 |
| 2013/0179812 | A1* | 7/2013 | BianRosa et al. ............. 715/767 |

OTHER PUBLICATIONS

"MathPlayer" Speech Instructions and Examples *Design Science* Copyright 1996-2012 (2 pages).

Hayes, B., "Speaking of Mathematics > American Scientist" *Computing Science* (3 pages).

"Text to Speech Software: an article from iansyst Ltd" 2003 (8 pages).

* cited by examiner

ACCESSIBILITY TECHINQUES FOR PRESENTATION OF SYMBOLIC EXPRESSIONS

TECHNICAL FIELD

The disclosed embodiments relate generally to computer-implemented techniques for presenting information, and more particularly, to computer-implemented techniques for presenting symbolic expressions such as mathematical, scientific, or chemical expressions, formulas, or equations in a more accessible way.

BACKGROUND

Computers are very powerful tools for presenting information to users. Often, computers present information visually, on a display screen or other visual presentation device. However, many users of computers are blind, visually impaired, dyslexic or have low-vision or learning disabilities, or are sighted users who simply want or need to use a computing device without looking at the device during operation. These users can benefit from accessibility devices that present information in nonvisual ways. One way a computer presents information a nonvisual way is with a text-to-speech transducer that reads aloud the content of a display screen.

Current text-to-speech systems work reasonably well with linear prose, like that found in an electronic message or novel. Unfortunately, existing text-to-speech systems remain cumbersome and difficult to use for presenting symbolic expressions such as mathematical, scientific, or chemical expressions, formulas, or equations. Precise navigation and presentation of symbolic expressions is often difficult or not possible, thereby creating a significant cognitive burden on a user with impaired vision.

Accordingly, there is a need for computer-implemented techniques for presenting symbolic expressions in a more accessible way. Such techniques may complement or replace existing computer-implemented techniques for presenting information. Such techniques reduce the cognitive burden on a user with impaired vision and produce a more accessible and efficient human-machine interface.

SUMMARY

The above deficiencies and other accessibility problems associated with existing text-to-speech systems for presenting symbolic expressions are reduced or eliminated by the techniques disclosed herein. The techniques are implemented by a computing device. In some embodiments, the computing device is a desktop computer. In some embodiments, the computing device is a portable computer such as a laptop computer or handheld device. In some embodiments, the computing device has a touchpad (also known as a "track pad"). In some embodiments, the computing device has a touch-sensitive display (also known as a "touch screen" or "touch screen display"). In some embodiments, the computing device has a graphical user interface (GUI), one or more processors, memory and one or more modules, programs or sets of instructions stored in the memory for presenting symbolic expressions. In some embodiments, the symbolic expressions may include mathematical, scientific, or chemical formulas, equations, or expressions.

In some embodiments, a method for presenting a symbolic expression is performed at a computing device with a display. The method includes displaying a first portion of the symbolic expression within a first area of the display. The method also including aurally presenting first information related to the first portion of the symbolic expression while the computing device is in a first state in which the first area is selected for aural presentation. Also while the computing is in the first state, the computing device detects particular user input and in response to detecting the particular user input, the computing device transitions from the first state to a second state in which a second area of the display is selected for aural presentation. In the second state, second information associated with a second portion of the symbolic expression that is displayed within the second area of the display is determined and aurally presented.

In some embodiments, the computing device has a touch-sensitive surface and detecting the particular user input includes detecting a user interface navigation gesture on the touch-sensitive surface. In some embodiments, the display is a touch-screen display and the touch-sensitive surface is on the display. In some embodiments, the user interface navigation gesture is a multi-finger gesture. In some embodiments, the user interface navigation gesture is independent of contacting a location on the touch-sensitive surface that corresponds to the second area. In some embodiments, the user interface navigation gesture does not contact a location on the touch-sensitive surface that corresponds to the second area. In some embodiments, the user interface navigation gesture is dependent on contacting a location on the touch-sensitive surface that corresponds to the second area.

In some embodiments, the technique also includes, while in the first state, mapping the first area of the display to the touch-sensitive surface. In response to detecting the particular user input, the computing devices ceases to map the first area of the display to the touch-sensitive surface, and proportionally maps the second area of the display to be substantially coextensive with the touch-sensitive surface.

In some embodiments, the symbolic expression is a mathematical, scientific, or chemical expression, equation, or formula.

In some embodiments, detecting the particular user input includes detecting a pointing device action. In some embodiments, the pointing device is a mouse.

In some embodiments, detecting the particular user input includes detecting a key strike on a keyboard.

In some embodiments, the second area resides within the first area and the second portion of the symbolic expression is a part of the first portion.

In some embodiments, the first information includes one or more words, aurally presented as spoken text, describing the first portion of the symbolic expression. In some embodiments, the second information includes one or more words, aurally presented as spoken text, describing the second portion of the symbolic expression.

In some embodiments, the computing device, in response to determining the second information, outputs a transition sound to indicate that the area selected for aural presentation has transitioned from the first area to the second area.

In some embodiments, the first area resides within the second area and the first portion of the symbolic expression is a part of the second portion.

In some embodiments, a computing device with a touch-sensitive surface, a display, one or more processors, memory is configured by one or more programs stored in the memory to perform some of the above methods.

In some embodiments, one or more non-transitory computer-readable media store one or more programs which, when executed by a computing device with a display, cause the computing device to perform some of the above methods.

In some embodiments, a graphical user interface on a computing device with a display comprises a symbolic expression displayed on the display and a plurality of selectable areas of the display. The symbolic expression has a plurality of portions. Each selectable area of the plurality of selectable areas corresponds to a portion of the plurality of portions. While in a first state in which a first selectable area of the plurality of selectable areas is selected for aural presentation, first information associated with the portion of the symbolic expression corresponding to the first selectable area is aurally presented. While in the first state, user input selecting a second selectable area of the plurality of selectable areas is detected. In response to detecting the user input, second information associated with the portion of the symbolic expression corresponding to the second selectable area is aurally presented.

In some embodiments, a method for presenting a symbolic expression includes while in a first state in which a first portion of a symbolic expression is selected for presentation, presenting first information related to the first portion of the symbolic expression. While in the first state, detecting particular user input. In response to detecting the particular user input: transitioning from the first state to a second state in which a second portion of the symbolic expression is selected for presentation; determining second information associated with a second portion of the symbolic expression; and in response to determining the second information, presenting the second information. In some embodiments, the computing device has or is operatively coupled to an electro-mechanical braille display and presenting the second information includes sending the information to the electro-mechanical braille display.

Thus, computing devices with displays are provided with new and improved accessibility methods and user interfaces for navigating symbolic expressions, thereby increasing the effectiveness, efficiency, and user satisfaction with such devices. Such methods, devices, and interfaces may complement or replace existing accessibility methods, devices, and interfaces.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Introduction

Figure 1:
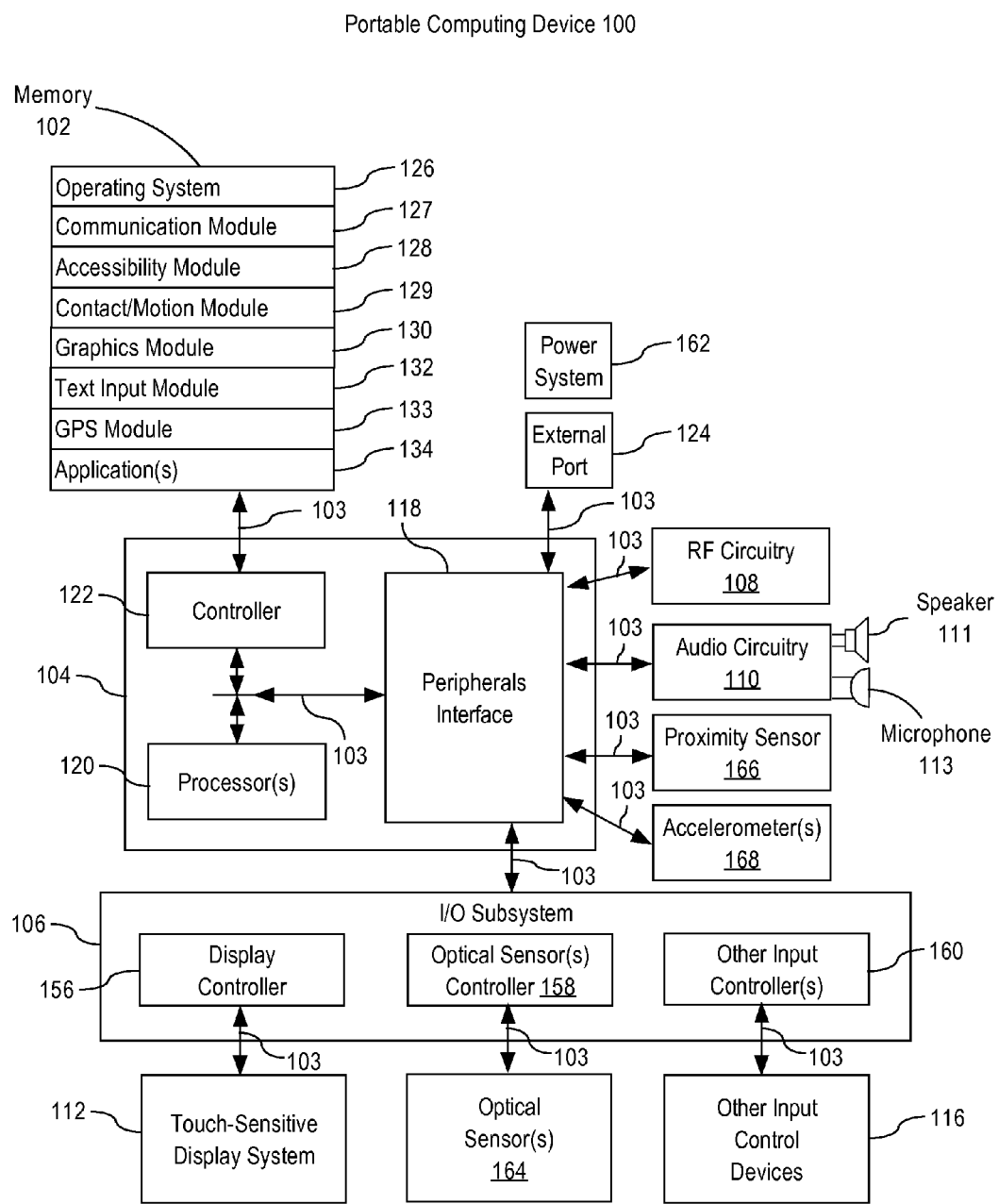
FIG. 1 is a block diagram of a portable computing device with a touch-sensitive display, according to some embodiments of the invention.

The following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion, without departing from the scope of the present invention. The first portion and the second portion are both portions, but they are not the same portion, unless otherwise clearly indicated.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Exemplary Computing Devices and User Interfaces

Embodiments of computing devices, user interfaces for such devices, and associated processes for using such devices are described. In some embodiments, the computing device is a portable computing device such as a tablet computer or electronic reading device that may also contain other functions, such as PDA and/or music player functions. Exemplary embodiments of portable computing devices include, without limitation, the iPad® device from Apple, Inc. of Cupertino, Calif. In some embodiments, the computing device is a stationary computing device such as a desktop computer or workstation computer.

In the discussion that follows, a computing device that includes a display and a touch-sensitive surface through which user input is provided is described. It should be understood, however, that the computing device may include one or more other physical user interface devices, such as a physical keyboard, a mouse and/or a joystick through which user input is provided in addition to or instead of user input provided through a touch-sensitive surface.

In some embodiments, the device supports one or more applications that implement or use the techniques described herein for presentation of symbolic expressions. These applications may include, but are not limited to, an e-book application, an e-reader application, a presentation application, a word processing application, a web browsing application, a spreadsheet application, or an e-mail application.

The various applications that may be executed on the device may use at least one common physical user interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards an embodiment of a portable computing device with a touch-sensitive display. FIG. 1 is a block diagram illustrating a portable computing device 100 with a touch-sensitive display 112 in accordance with some embodiments. The touch-sensitive display 112 is sometimes called a "touch screen" for convenience, and may also be known as or called a touch-sensitive display system. The device 100 may include a memory 102 (which may include one or more non-transitory computer readable mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable computing device 100, and that the device 100 may have more or fewer components than shown, may combine two or more components, or a may have a different configuration or arrangement of the components. The various components shown in FIG. 1 may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPad® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable computing device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module software component (also called a camera module) stored in the memory 102, the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for video-conferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the computing device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIG. 1 shows an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 127, an accessibility module 128, a contact/motion module (or set of instructions) 129, a graphics module (or set of instructions) 130, an attachment editing module 131, a text input module (or set of instructions) 132, a Global Positioning System (GPS) module (or set of instructions) 133, and applications (or sets of instructions) 134.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 127 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some iPad® devices.

In conjunction with audio circuitry 110, speaker 111, touch screen 112, display controller 156, contact module 129, graphics module 130, and text input module 132, the accessibility module 128 facilitates touch-based navigation among user interface elements so that a user may navigate, select, activate, and otherwise interact with elements in the user interface without necessarily seeing the user interface. In some embodiments, the accessibility module 128 facilitates selecting and activating user interface elements within the user interface without directly selecting or contacting those user interface elements. Exemplary user interface elements include, without limitation, user interface icons and widgets, application icons, application interfaces, menus, web browsers, web pages and applications from the world-wide web, application controls, documents, soft/virtual keyboards and numeric pads, calculators, calendars, lists, tables, emails, HTML text, XML text, rich text, unformatted text, maps, game interfaces, etc. User interface elements include any aspect of a graphical or textual user interface that a user may interact with or manipulate when using an electronic device the user interface is running on.

The contact/motion module 129 may detect contact with the touch screen 112 (in conjunction with the display controller 156) and other touch sensitive devices (e.g., a touchpad or physical click wheel). The contact/motion module 129 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 129 and the display controller 156 detects contact on a touchpad. In some embodiments, the contact/motion module 129 and the controller 160 detects contact on a click wheel.

The contact/motion module 129 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 130 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user interface objects including soft keys), digital images, videos, animations and the like.

In some embodiments, the graphics module 130 stores data representing graphics to be used. Each graphic may be assigned a corresponding code. The graphics module 130 receives, from applications etc., one or more codes specifying graphics to be displayed along with, if necessary, coordinate data and other graphic property data, and then generates screen image data to output to display controller 156.

The text input module 132, which may be a component of graphics module 130, provides soft keyboards for entering text in various software applications stored in memory 102 (e.g., contacts, e-mail, IM, browser, and any other application that needs text input).

The GPS module 133 determines the location of the device and provides this information for use in various software applications stored in memory 102 (e.g., to telephone application for use in location-based dialing, to camera application as picture/video metadata, and to applications that provide location-based services such as weather widgets, local yellow page widgets, and map/navigation widgets).

The applications 134 may include the following modules (or sets of instructions), or a subset or superset thereof:
  an e-mail client module;
  a web browser module;
  a word processing module;
  a spreadsheet module; and
  an e-reader module for reading digital books, textbooks, articles, periodicals, or the like.

Examples of other applications 134 that may be stored in memory 102 include other word processing applications, other image editing applications, drawing applications, presentation applications, JAVA-enabled applications, encryption, digital rights management, voice recognition, and voice replication.

One or more of the above identified modules and applications may correspond to a set of executable instructions for performing one or more functions described above and/or the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, an e-reader module may be combined with a web browser module into a single module). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
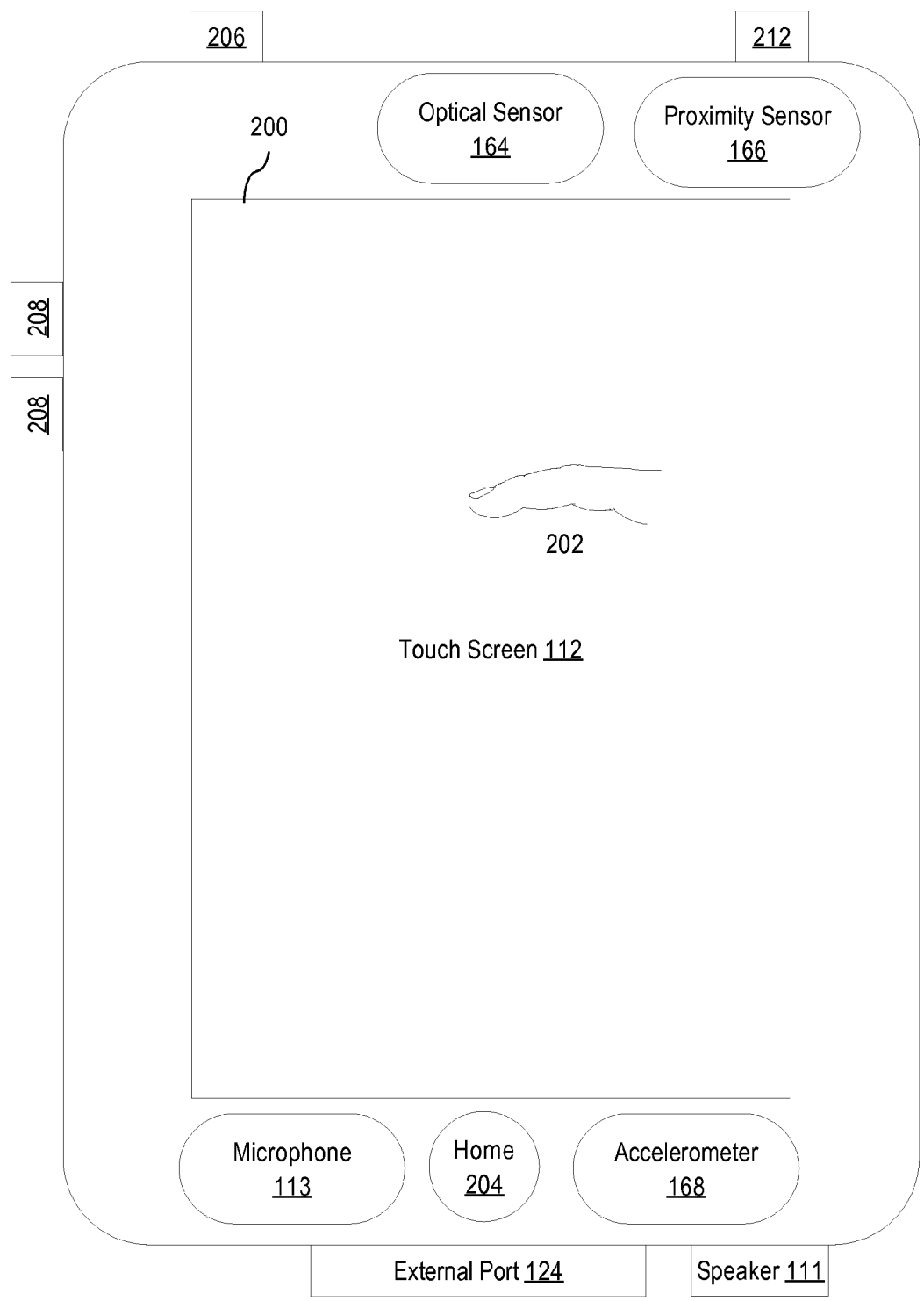
FIG. 2 illustrates a portable computing device in accordance with some embodiments.

FIG. 2 illustrates a portable computing device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 134 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
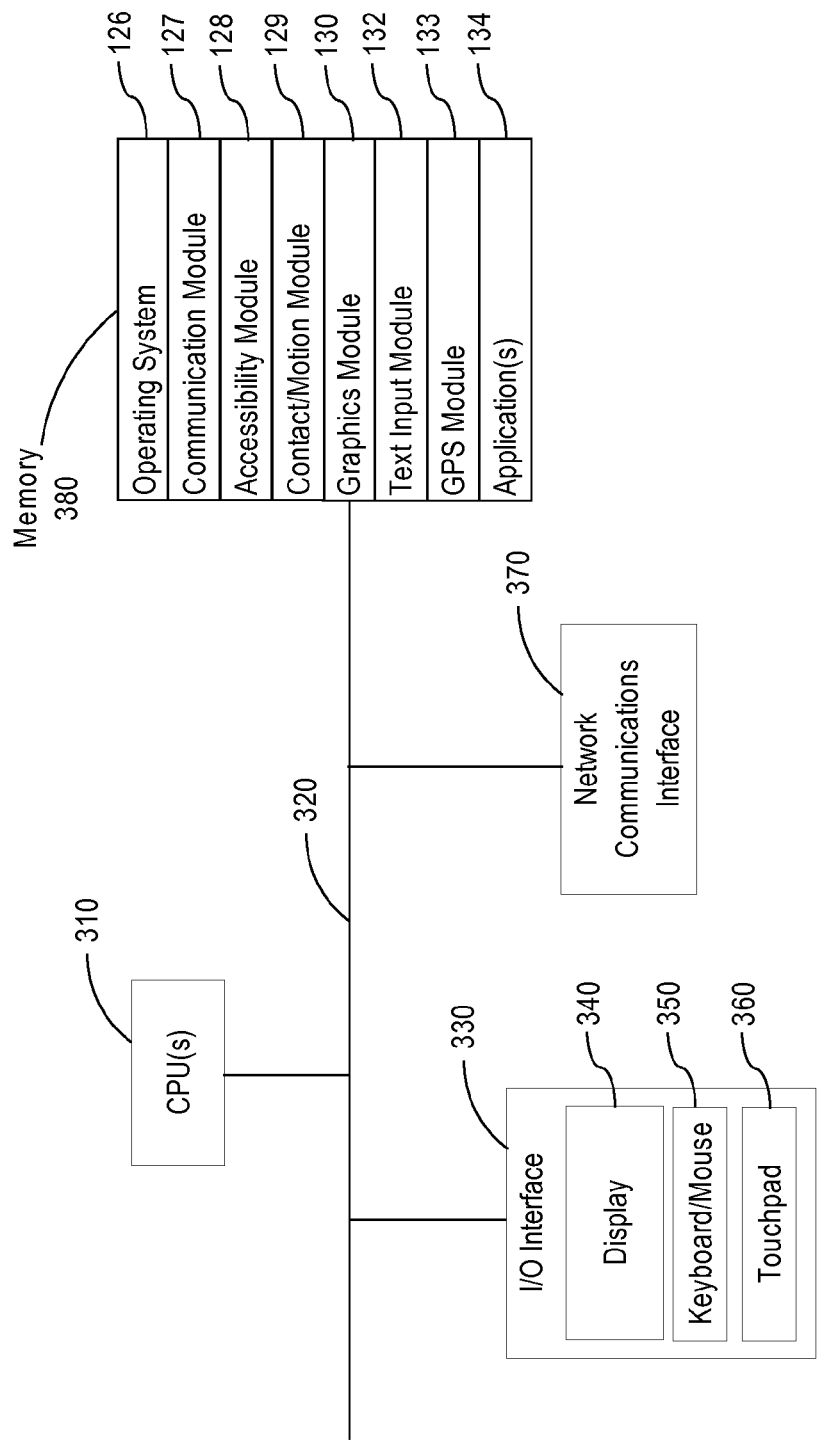
FIG. 3 is a block diagram of an exemplary computing device with a display and a touch-sensitive surface in accordance with some embodiments.

FIG. 3 is a block diagram of an exemplary computing device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 370, memory 380, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 360. Memory 380 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 380 may optionally include one or more storage devices remotely located from the CPU(s) 310. In some embodiments, memory 380 stores programs, modules, and data structures analogous to the programs, modules, and data structures stored in the memory 102 of portable computing device 100 (FIG. 1), or a subset thereof. Furthermore, memory 380 may store additional programs, modules, and data structures not present in the memory 102 of portable computing device 100. For example, memory 380 of device 300 may store a drawing module, a presentation module, a word processing module, a website creation module, a disk authoring module, a spreadsheet module and/or attachment an editing module, while memory 102 of portable computing device 100 (FIG. 1) may not store these modules.

Each of the above identified modules may be stored in one or more of the previously mentioned memory devices. Each of the above identified modules may correspond to a set of instructions for performing a function described above and/or the methods described in this application (e.g., the computer-implemented methods and other information processing methods described herein). The above identified modules or programs (i.e., sets of instructions) need not be implemented as separate software programs, procedures or modules, and thus various subsets of these modules may be combined or otherwise re-arranged in various embodiments. In some embodiments, memory 380 may store a subset of the modules and data structures identified above. Furthermore, memory 380 may store additional modules and data structures not described above.

Attention is now directed towards exemplary embodiments of user interfaces ("UI") and associated processes that may be implemented on a computing device with a display and a touch-sensitive surface, such as device 300 or portable computing device 100.

Navigation of Symbolic Expressions

Figure 4A:
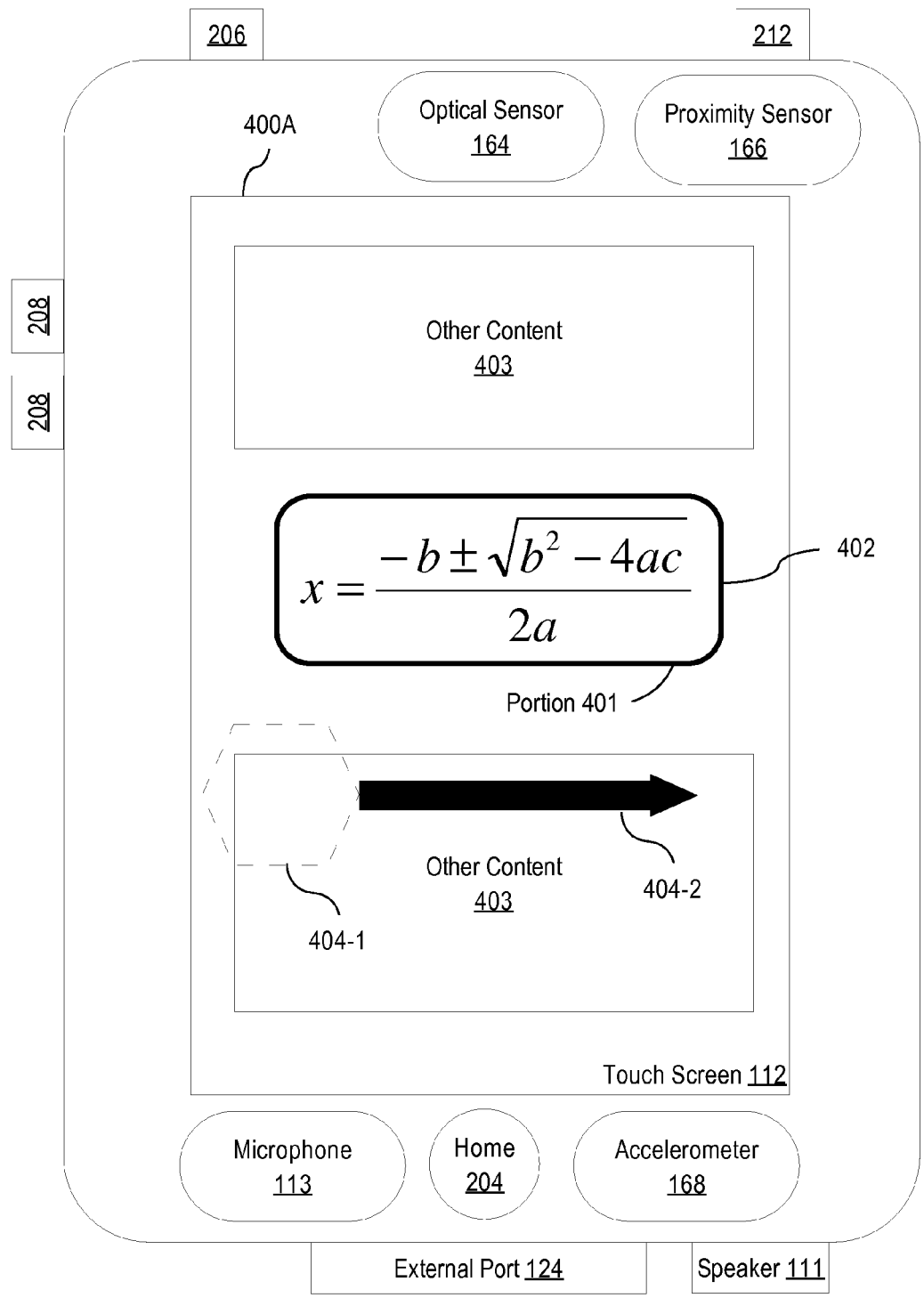
FIGS. 4A-4P illustrate accessibility user interfaces for a portable computing device with a touch-sensitive surface in accordance with some embodiments.
Figure 4B:
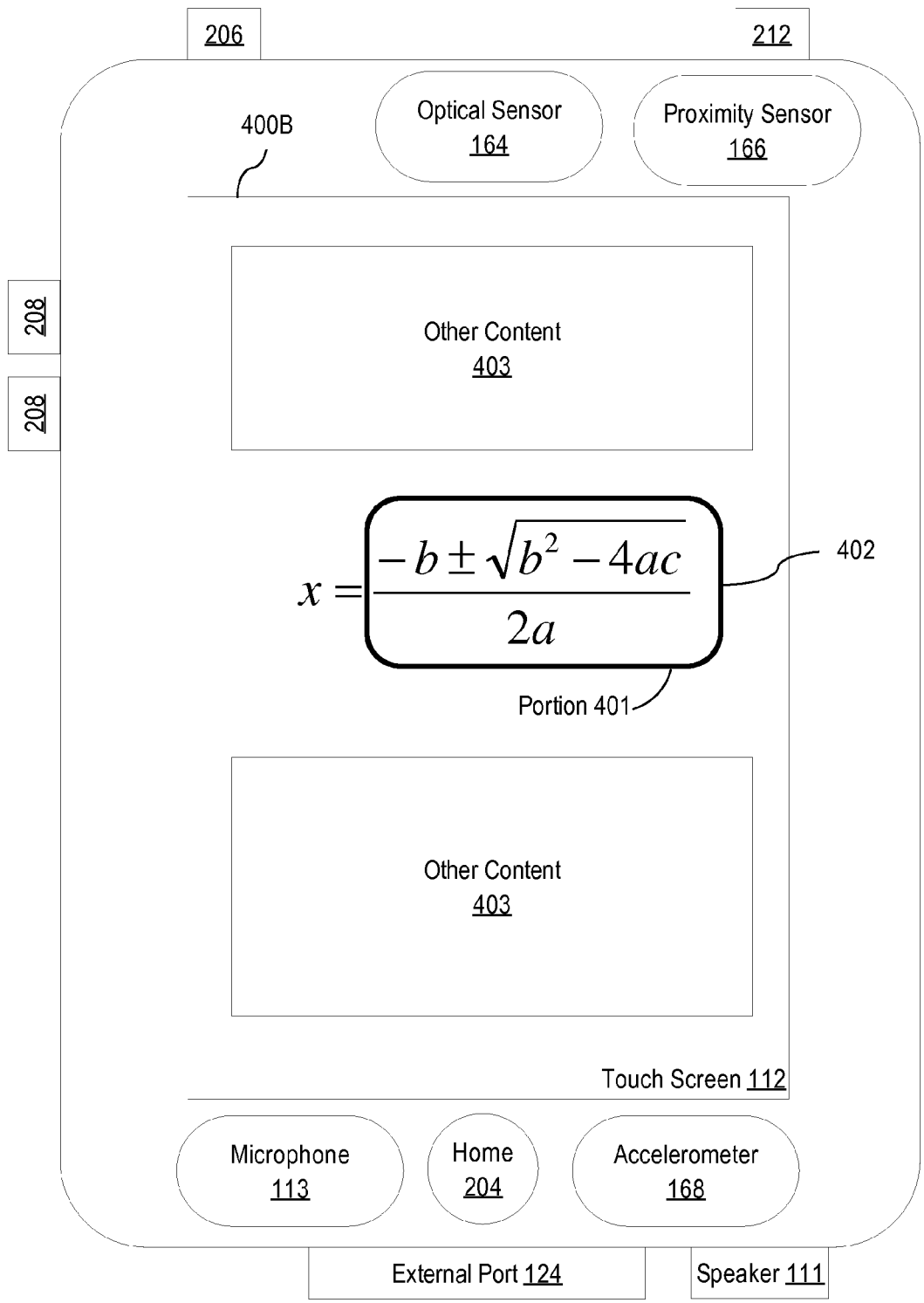
Figure 4C:
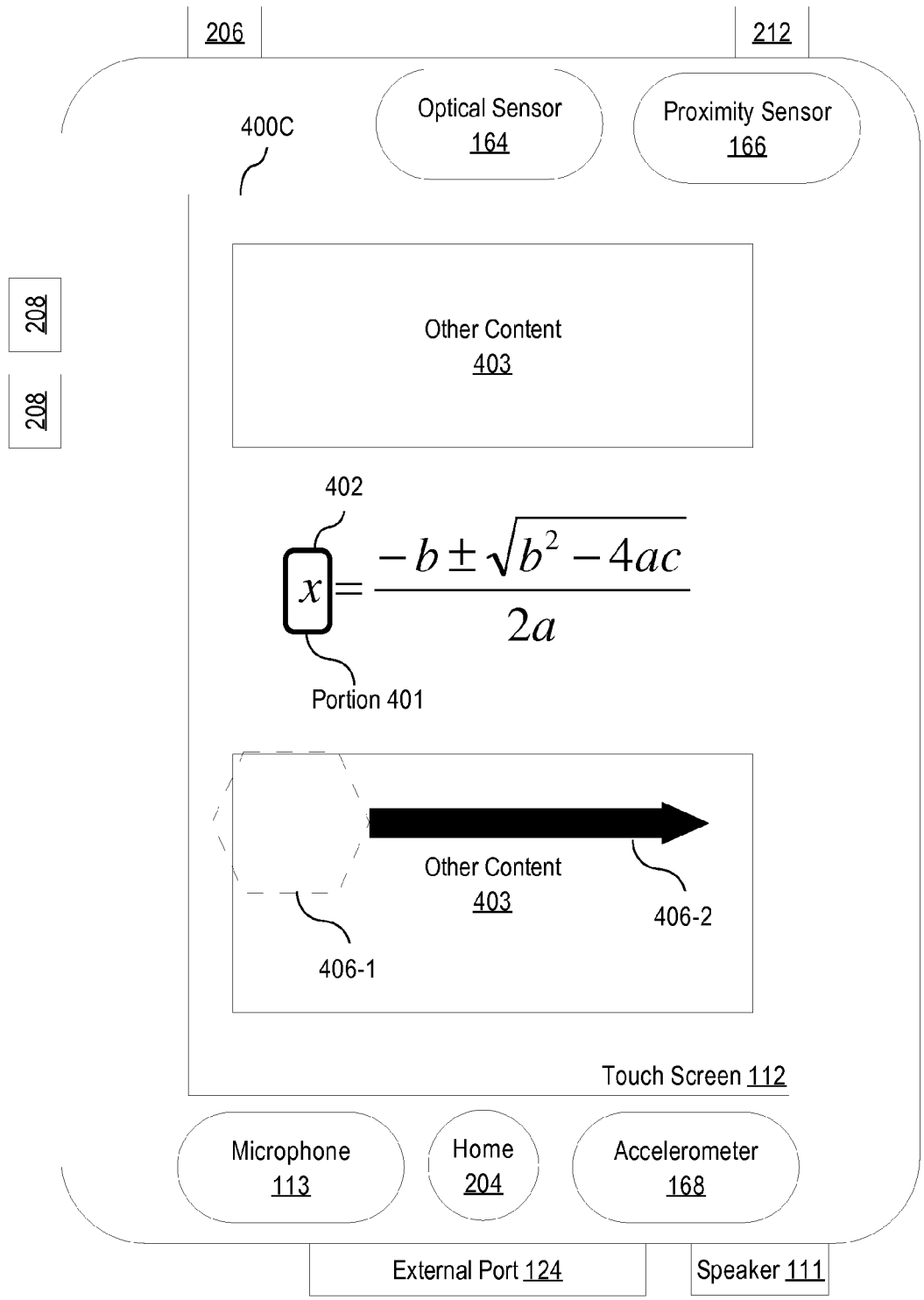
Figure 4D:
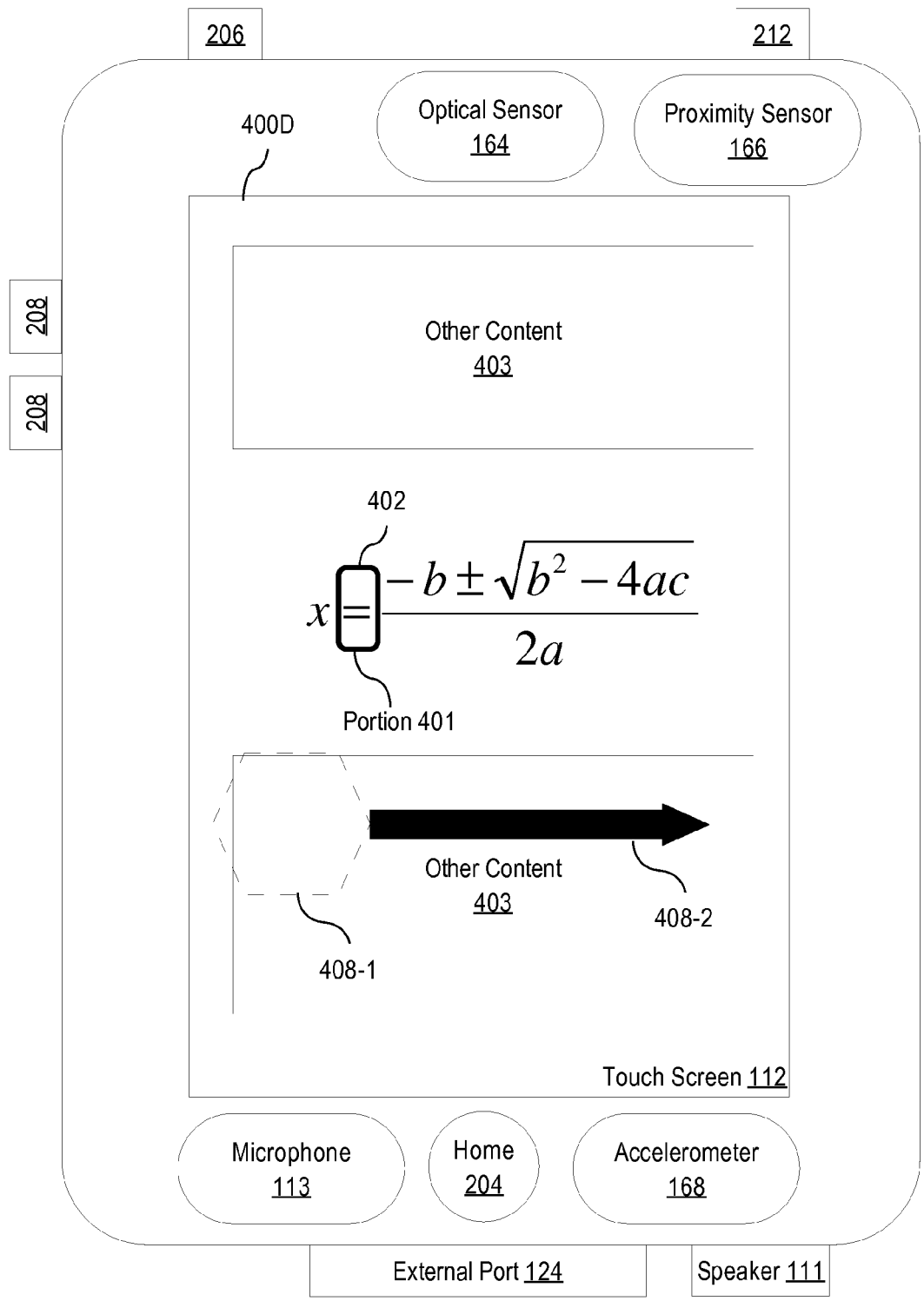
Figure 4E:
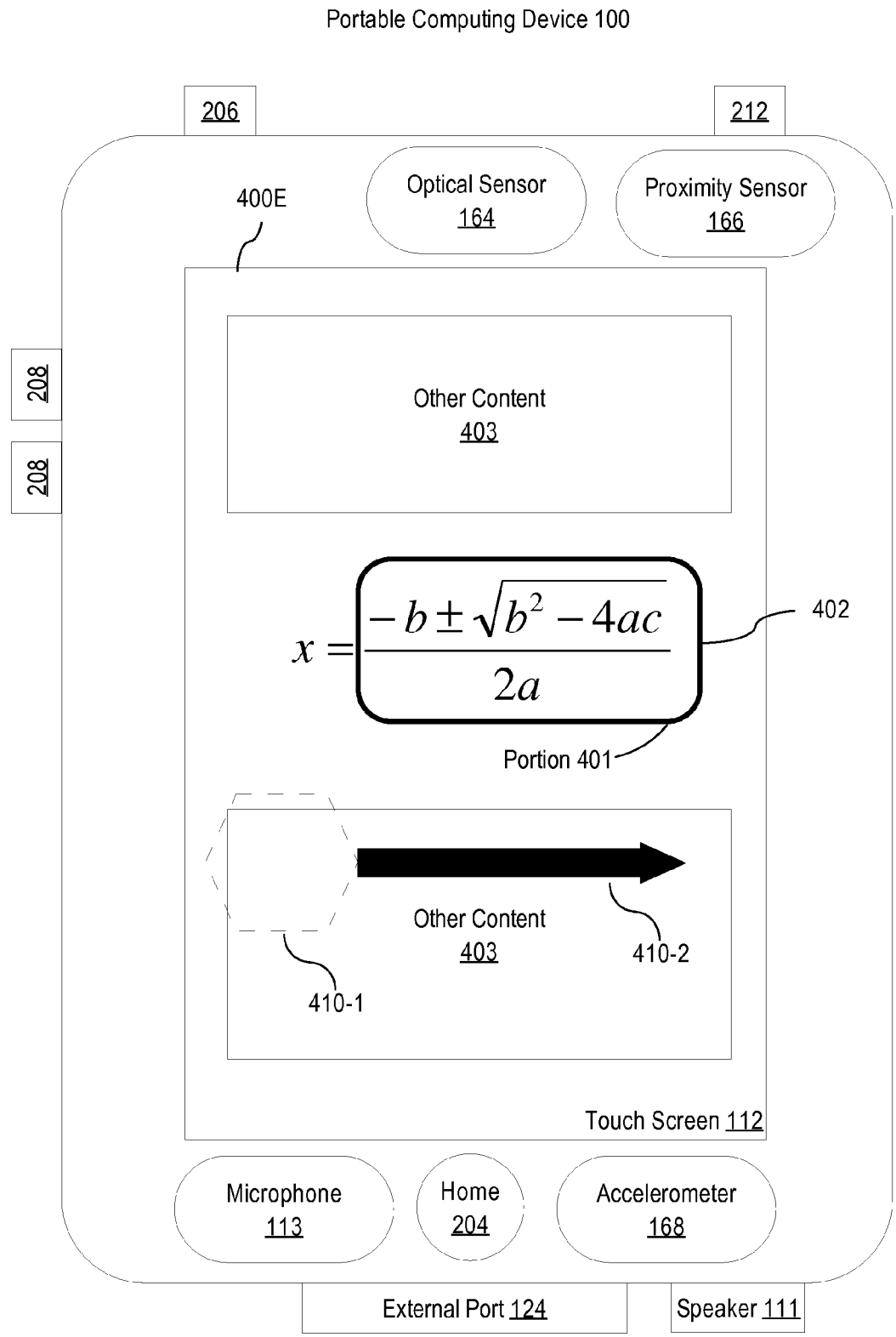
Figure 4F:
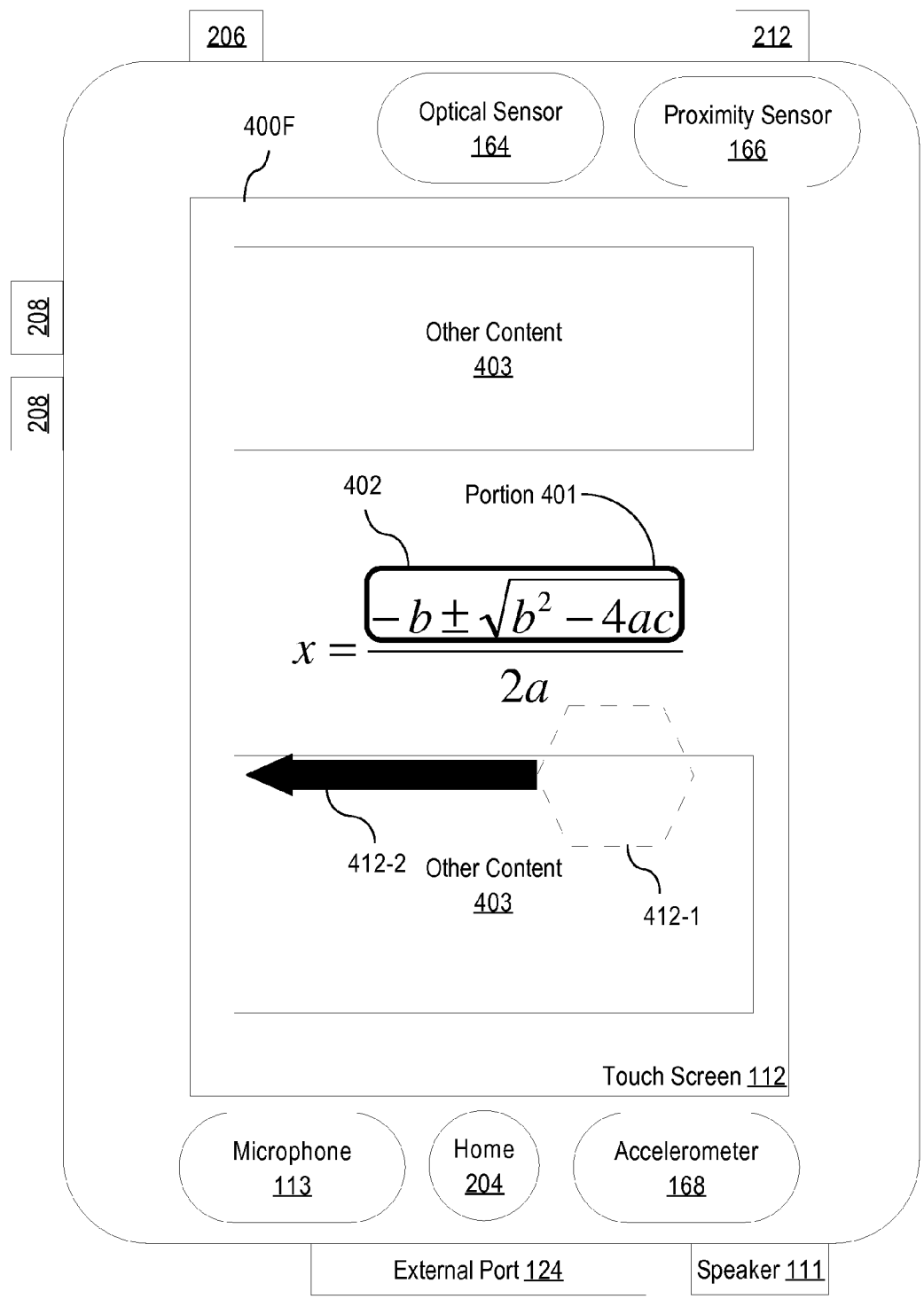
Figure 4G:
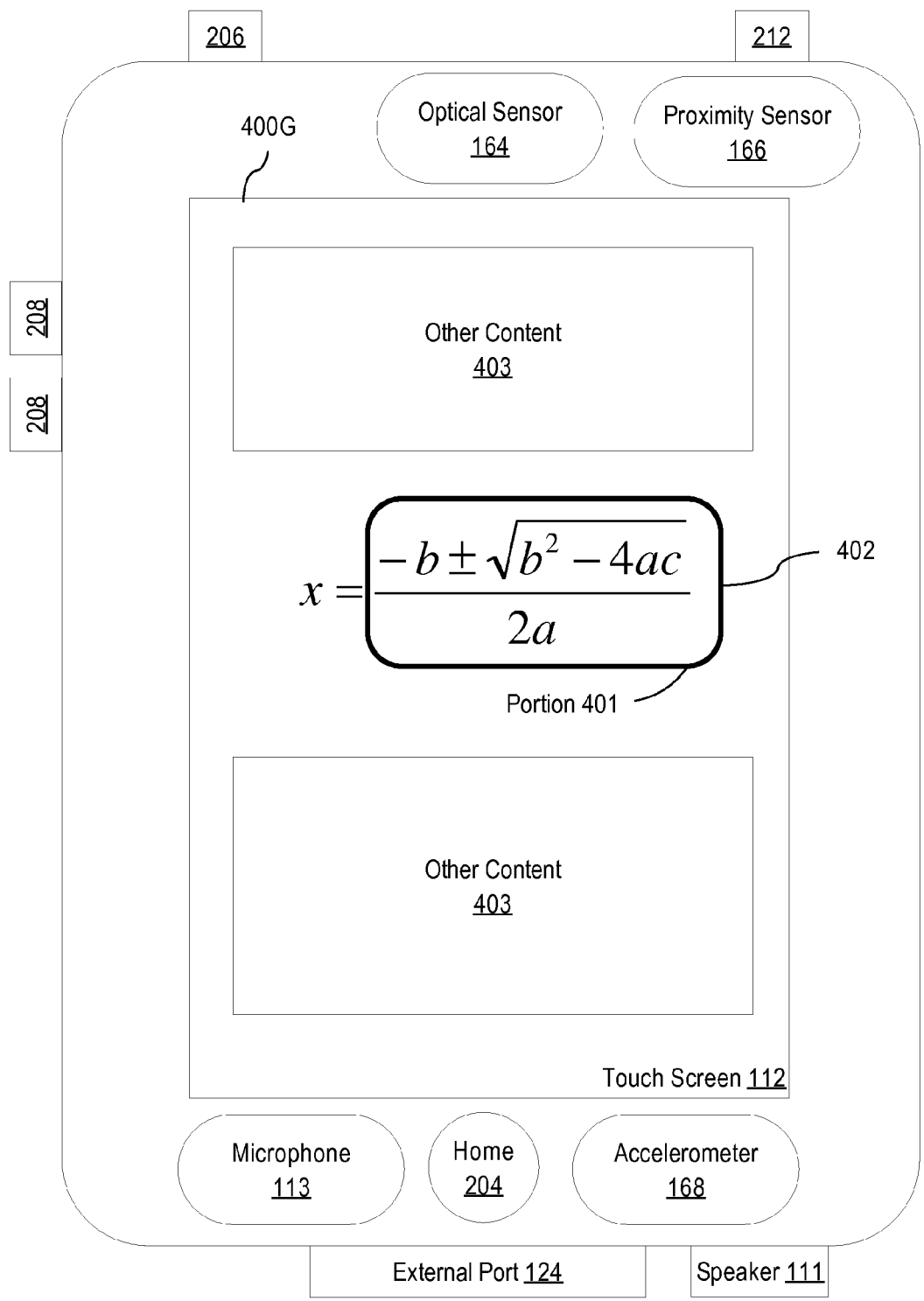
Figure 4H:
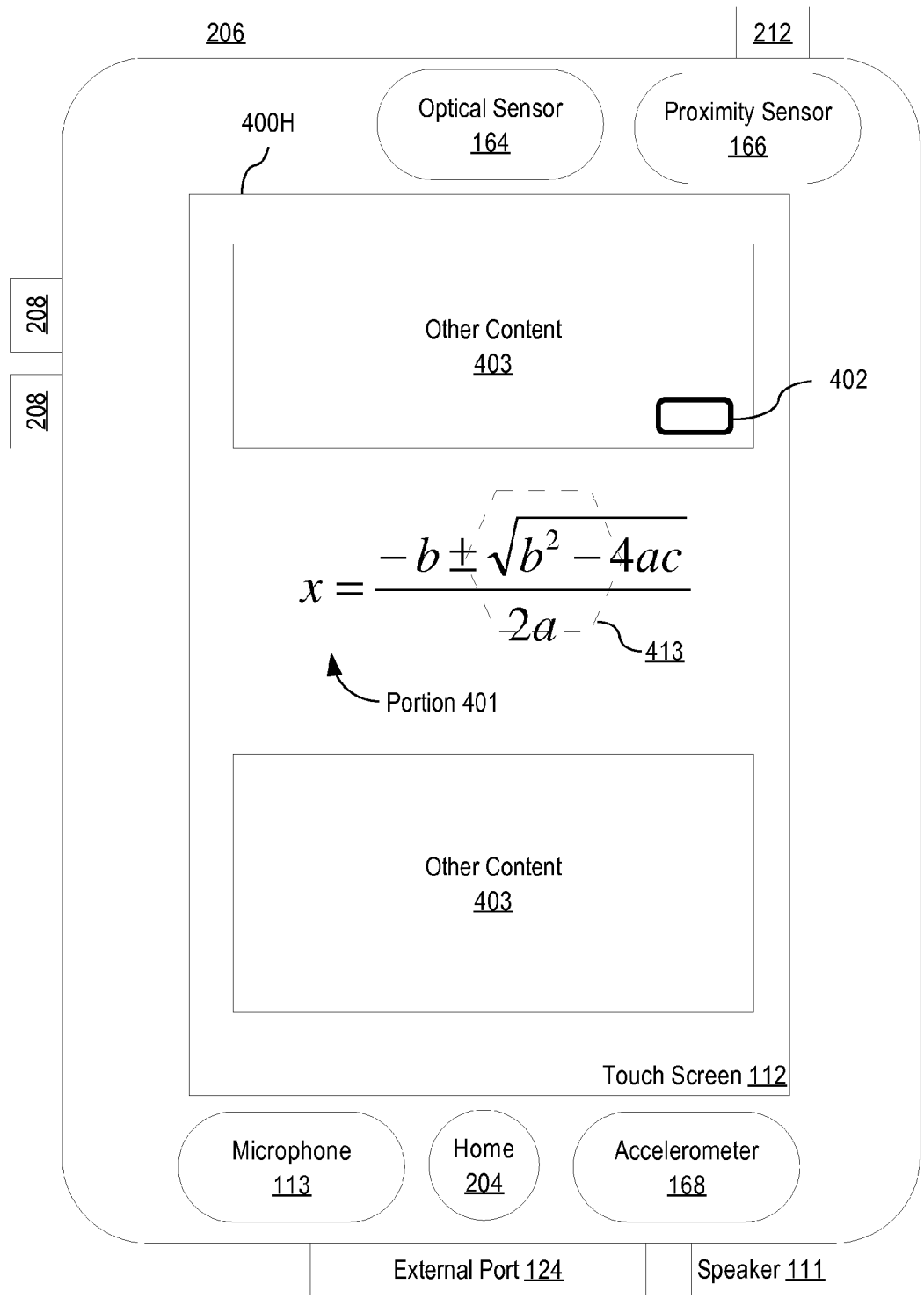
Figure 4I:
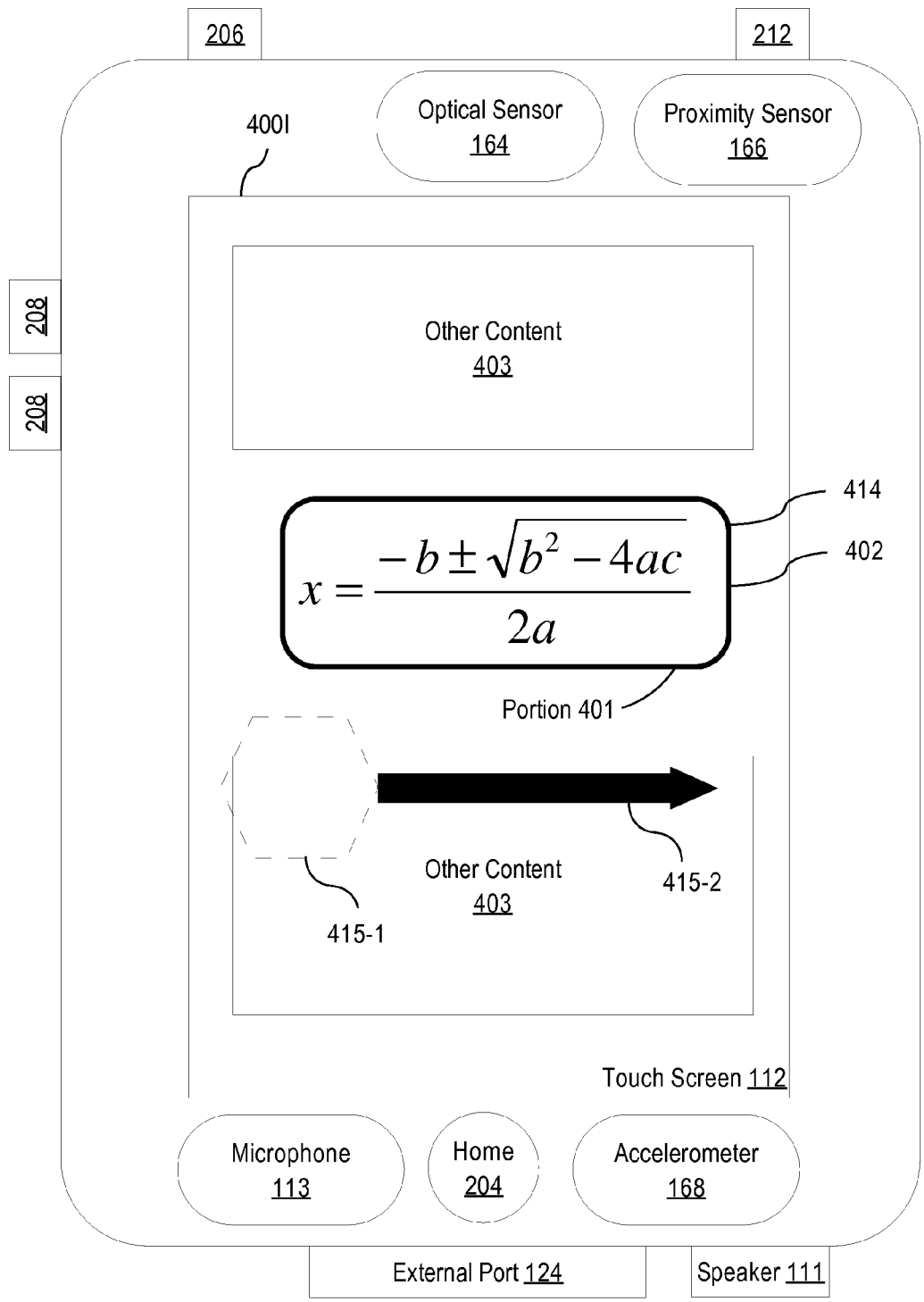
Figure 4J:
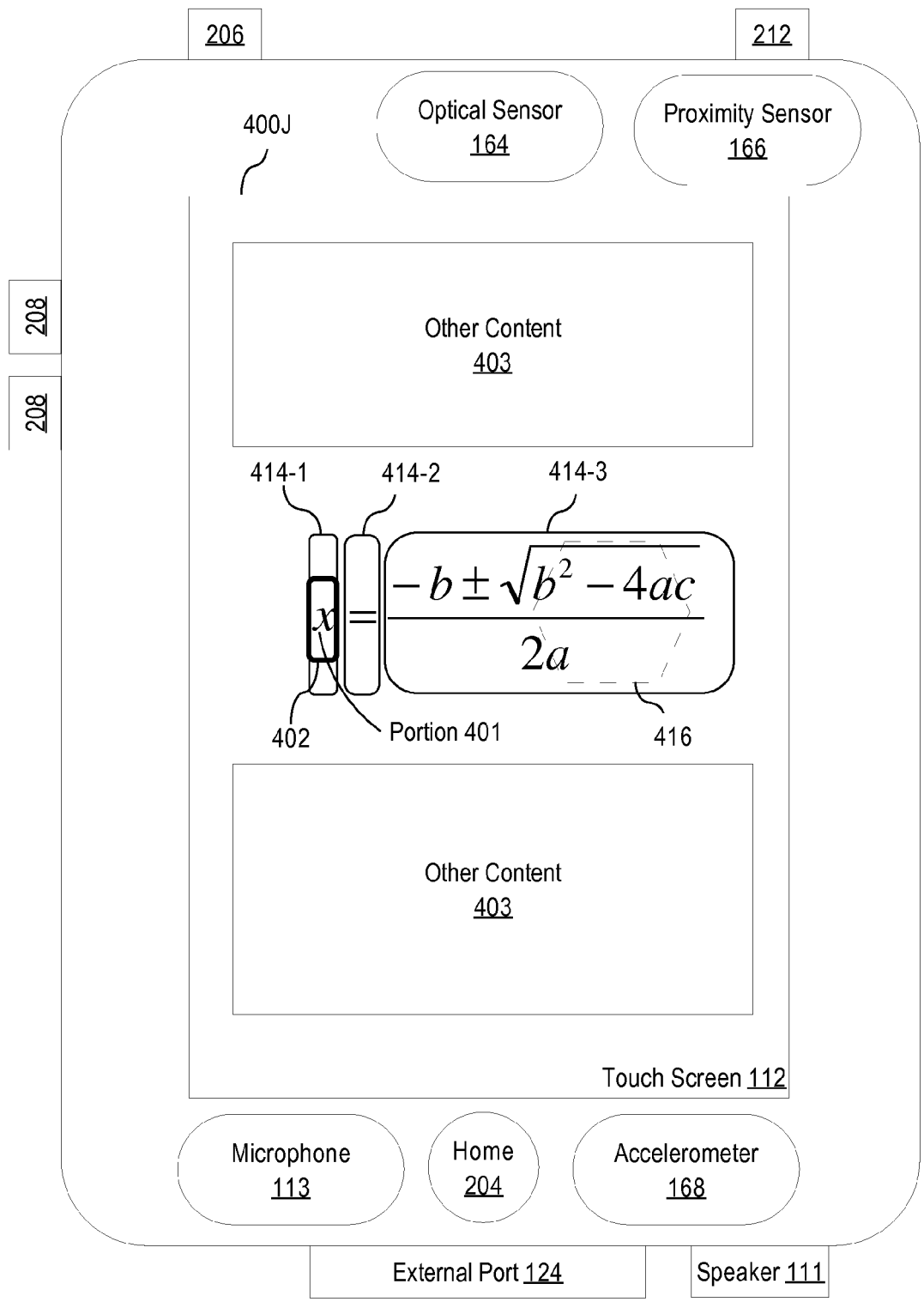
Figure 4K:
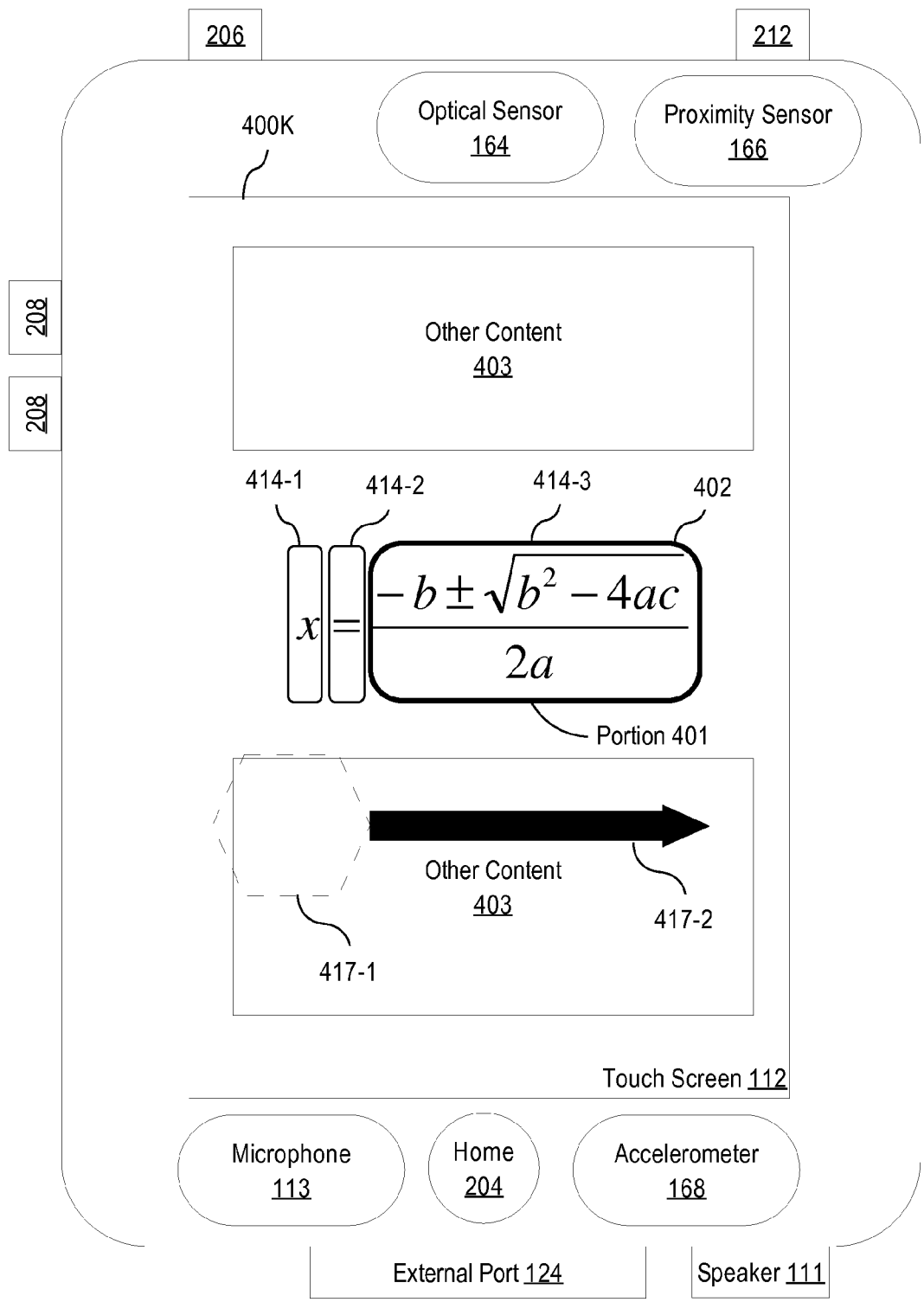
Figure 4L:
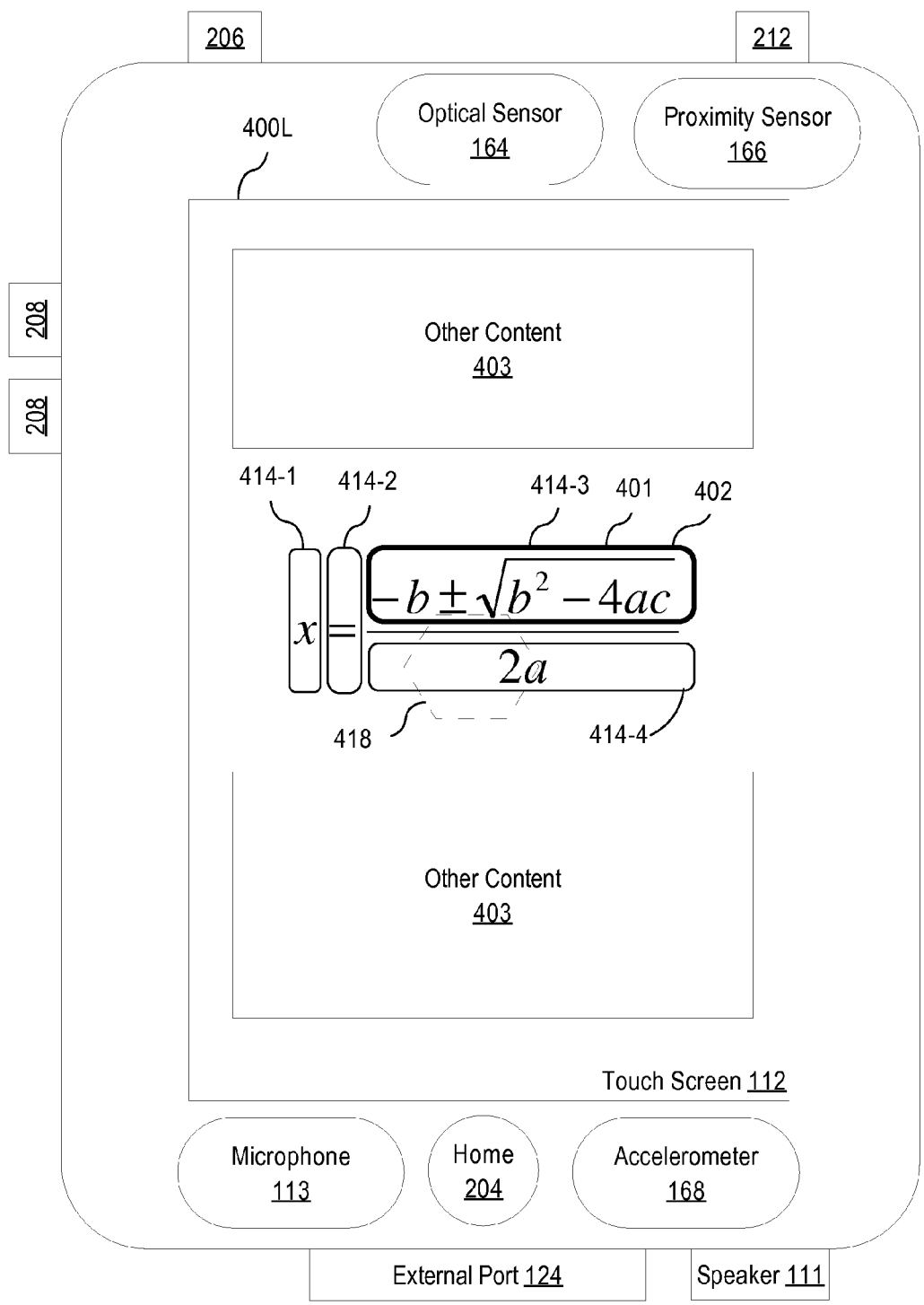
Figure 4M:
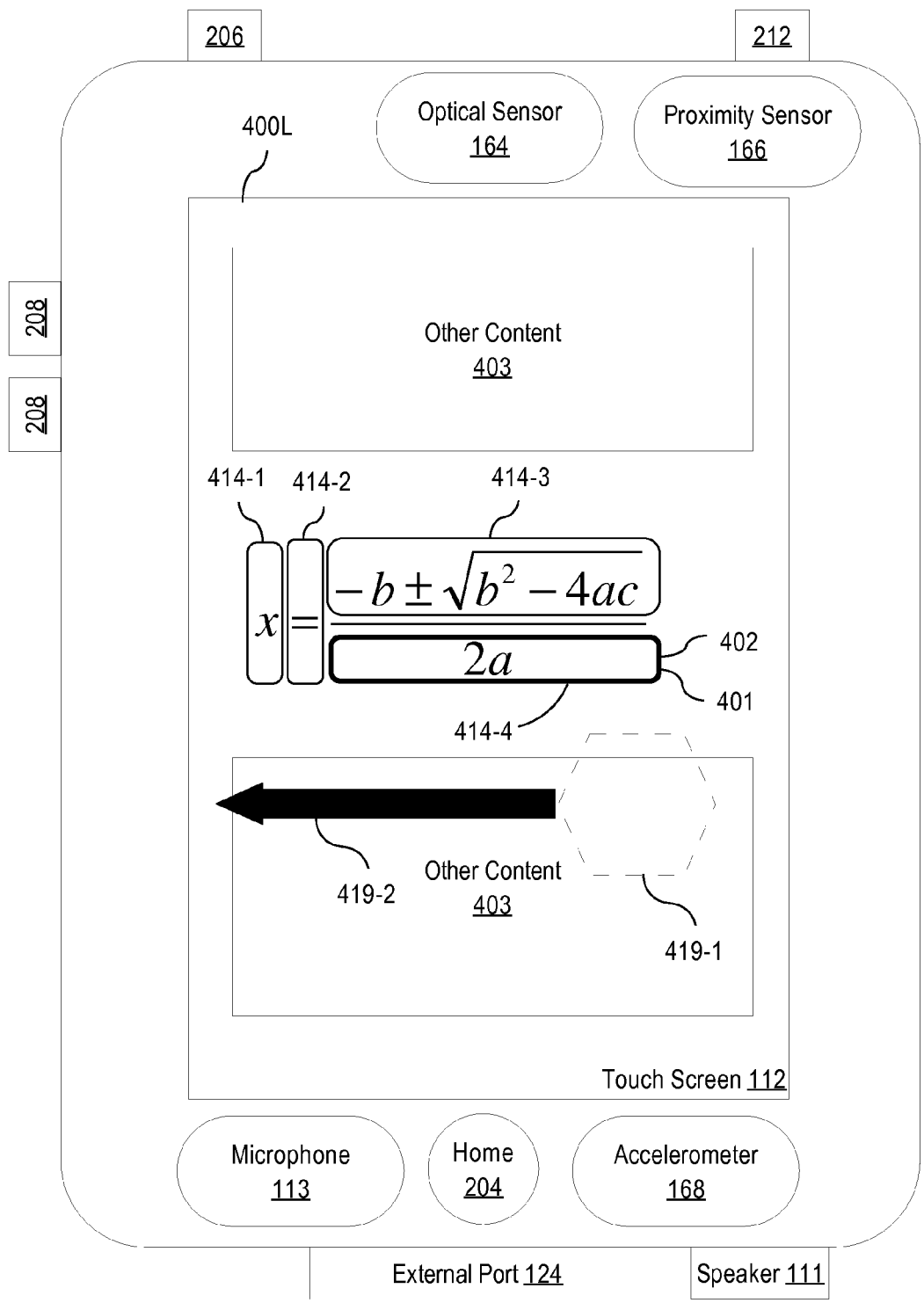
Figure 4N:
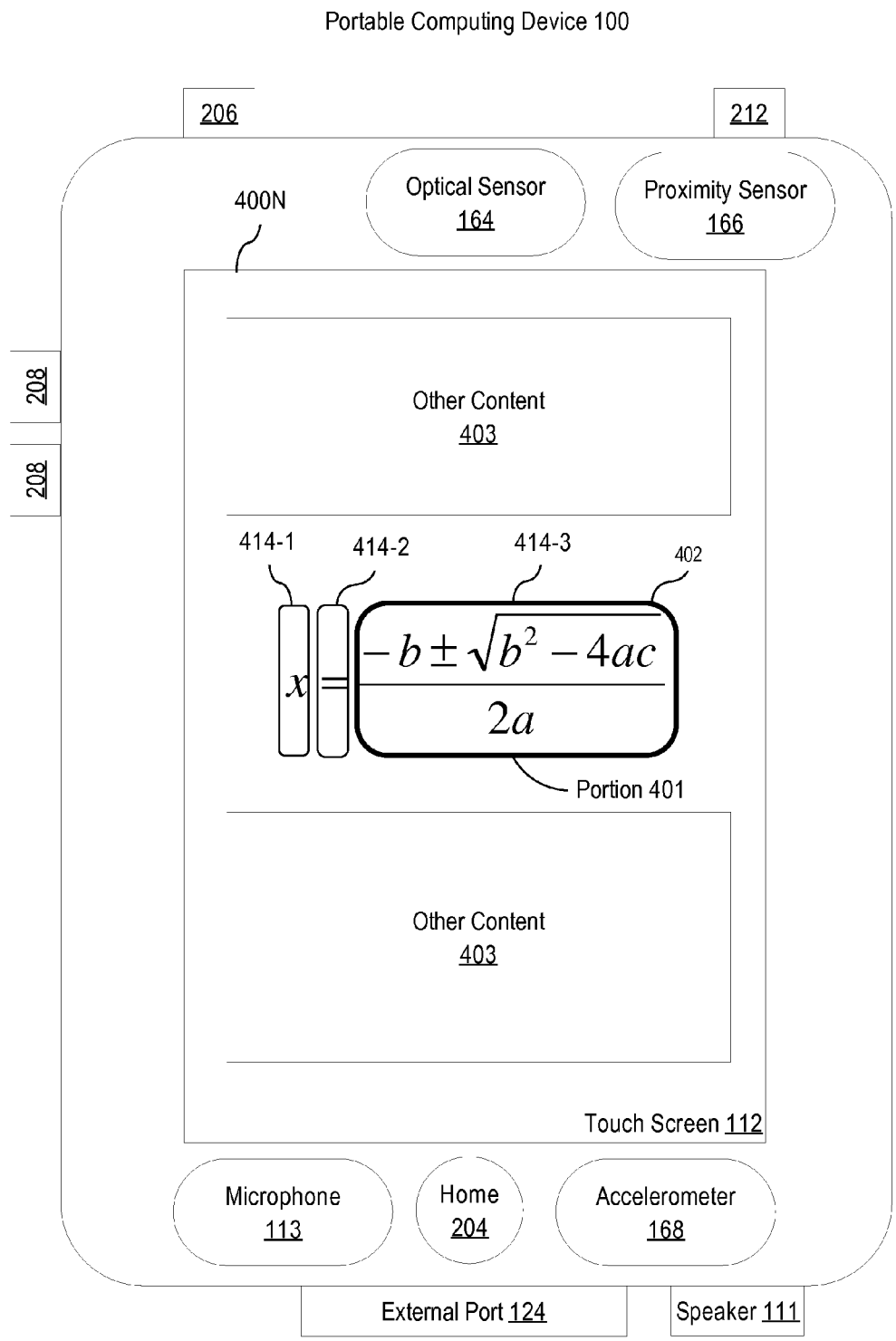
Figure 4O:
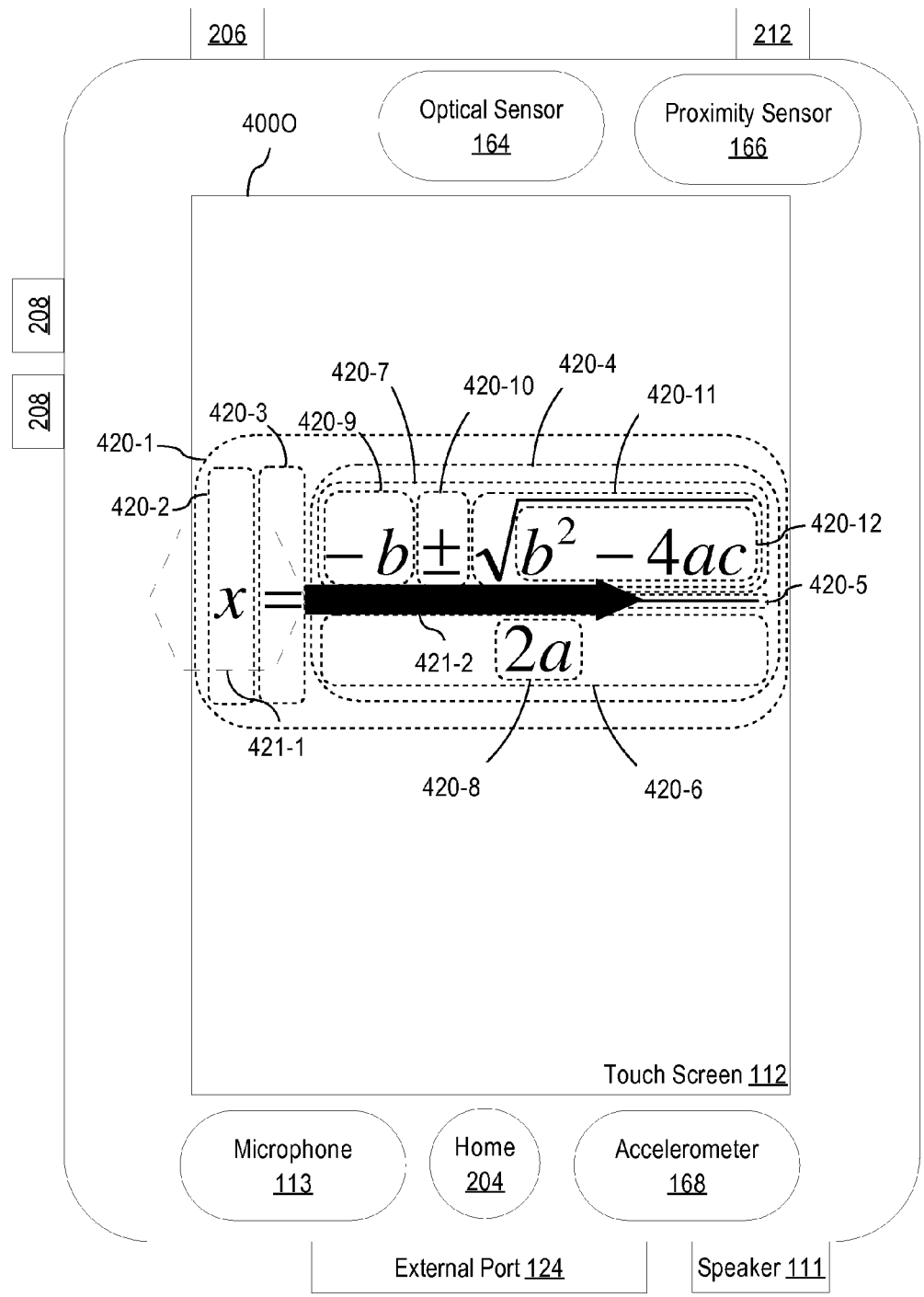
Figure 4P:
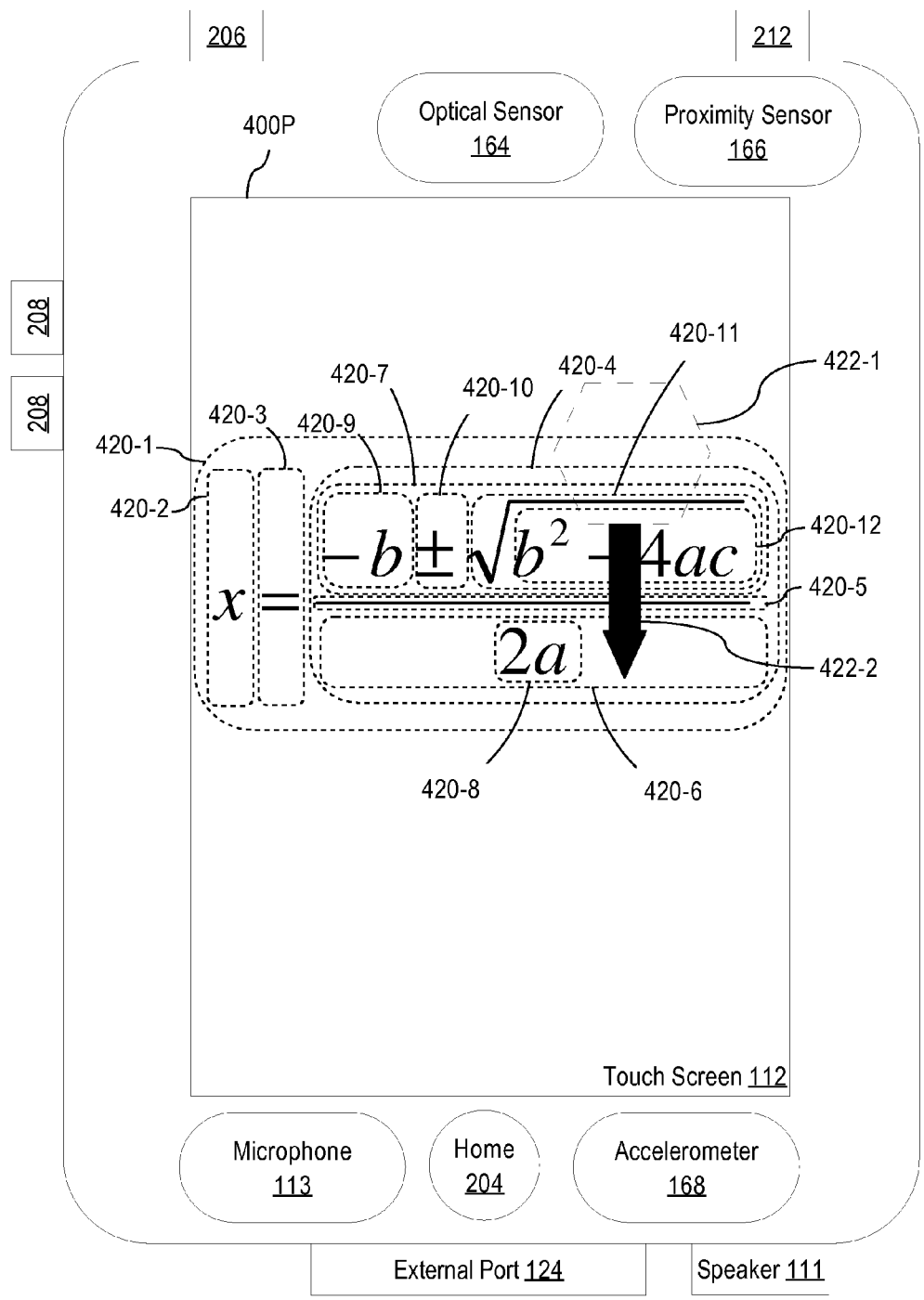

The exemplary user interfaces depicted in FIGS. 4A-4P are for accessibility interfaces for touch-based navigation among presentation elements (i.e., portions) of symbolic expressions on an electronic device.

In some embodiments, the symbolic expressions include mathematical, scientific, and chemical formulas, equations, and expressions.

In some embodiments, the presentation elements include tokens elements and layout elements of symbolic expressions. The tokens elements represent individual symbols of symbolic expressions. The layout elements represent information for constructing a symbolic expression from one or more symbolic sub-expressions. The set of possible token and layout elements may vary depending on the domain of the symbolic expression. For example, the token elements for the mathematics domain may include identifiers (e.g., variable or function names), numbers, operators (including fences, such as parentheses, and separators, such as commas), text, string literals, and whitespace. For example, in a mathematical equation, formula, or expression, sin and 24 may represent a single identifier token and a single number token, respectively. The layout elements in the mathematics domain may include a horizontal grouping of symbolic sub-expressions, a fraction, a square root, a radical, fenced content (e.g., content surround by parentheses), enclosed content (e.g., content enclosed with a stretching symbol such as a long division sign), subscripts, superscripts, subscript-superscript pairs, underscripts, overscripts, underscript-overscript pairs, pre-scripts and tensor indices, tables and matrices, etc. Other domains (e.g., chemical) may include some, all, or none of these layout elements in addition to other domain-specific layout elements.

In some embodiments, user interfaces are for audible navigation of presentation elements of mathematical formulas, equations, or expressions. In other embodiments, the user interfaces are for audible navigation of presentation elements of other types of symbolic expressions, such as chemical and scientific formulas, equations, and expressions. The symbolic expression could also be a description of an image or chart. For example, an image of a graph in a math textbook could have an accessibility description that is not show onscreen that says "Graph of $x/(y^2)$".

Further, although in some embodiments navigation of presentation elements is accomplished with gestures on a touch-sensitive surface, navigation is accomplished with a pointing device in other embodiments. Indeed, in some embodiments, there is no requirement that the computing device have a touch-sensitive surface at all. In those embodiments, the user may provide input, equivalent to a gesture, using a pointing device.

In some embodiments, keyboard selections are used to navigate presentation elements of symbolic expressions in addition to or instead of touch gestures and/or pointing device actions. For example, the user may perform a touch gesture or pointing device action to set focus on a particular presentation element of a symbolic expression and then use the left, right, up, or down arrow keys to navigate to a next presentation element relative to current presentation element.

The exemplary user interfaces depicted in FIGS. 4A-4P include a "current focus," which is not visually depicted. Many of these exemplary user interfaces also include a visually displayed "accessibility cursor". The accessibility cursor indicates where the current focus is. The current focus is associated with a specific portion of a symbolic expression which, if selected, would cause the device to execute an action associated with that specific portion. For example, in UI 400A (FIG. 4A) both the displayed accessibility cursor 402 and the current focus are on or at a portion of a symbolic expression 401, so that if that portion were selected, the device running the user interface would aurally present information associated with the portion 401.

Although in some embodiments, as exemplified by UI 400A, the portion which has the current focus is the entire symbolic expression (e.g., the entire quadratic formula), the portion which has the current focus may be less than the entire symbolic expression in other embodiments. For example, in UI 400B (FIG. 4B) both the accessibility cursor 402 and the current focus are on or at the fraction portion 401 of the quadratic equation, so that if the fraction portion were selected, the device running the user interface would aurally present information associated with the fraction portion 401 of the quadratic equation.

Although in some embodiments an accessibility cursor is displayed visually in the user interface, the accessibility cursor is not displayed visually in other embodiments. Indeed, in some embodiments, there is not a requirement that a user interface is visually displayed at all. In those embodiments, audible and/or tactile feedback (e.g., Braille, key-boards) which may be communicatively attached to or disposed in the device, is provided to a user so that the user may interface elements according to methods disclosed herein. In the exemplary user interfaces in FIGS. 4A-4P, however, the current focus is at or on the same portion where the accessibility cursor 402 is positioned (when the accessibility cursor is displayed).

In addition to symbolic expressions, the exemplary user interfaces depicted in FIGS. 4A-P may display other content (e.g., text, images, and/or video) which is visually depicted in some of the user interfaces. For example, in UI 400A, other content is represented as boxes 403 in which a symbolic expression is presented in line with the other content. Although in some embodiments a symbolic expression is presented in line with other content, a symbolic expression is surrounded by, behind, or in front of other content in other embodiments. Although in some embodiments other content is displayed in the user interface, other content is not displayed in other embodiments. For example, a user interface may display just a symbolic expression or just a portion of a symbolic expression without displaying other content. While some of the exemplary user interfaces depicted in FIGS. 4A-P display other content, those user interfaces are not required to display other content, unless the context clearly indicates otherwise. Similarly, the exemplary user interfaces depicted in FIGS. 4A-P that do not display other content are not required to omit display of other content, unless the context clearly indicates otherwise.

In some embodiments, some or all of the exemplary gestures contained in Table 1 may be utilized in accessibility interfaces as set forth herein. Each of the exemplary gestures in Table 1 is categorized into one of two different types of navigation. In some embodiments, the exemplary gestures are performed to navigate portions of a symbolic expression using location-independent user gestures. In some embodiments, the exemplary gestures are performed to navigate portions using location-dependent user gestures.

TABLE 1

Exemplary accessibility gestures

Location-independent navigation

| Detected gesture | Response to detected gesture |
| --- | --- |
| Single-finger tap on the touch-sensitive surface. | Speak information associated with the portion of the symbolic expression where the current focus is set. |
| Single-finger flick right on the touch sensitive surface. | Move the current focus to the next navigable portion of the symbolic expression. |
| Single-finger flick left on the touch-sensitive surface. | Move the current focus backward to the previous navigable portion of the symbolic expression. |
| Double-finger flick right on the touch-sensitive surface. | Move the current focus to the next navigable portion of the symbolic expression and increase the selection granularity to the next highest level. |
| Double-finger flick left on the touch-sensitive surface. | Move the current focus to the previous navigable portion of the symbolic expression and decrease the selection granularity to the next lowest level. |
| Three-finger flick right on the touch-sensitive surface. | Move the current focus to the next navigable portion of the symbolic expression, increase the selection granularity to the next highest level, and increase the zoom level of the display screen. |
| Three-finger flick left on the touch-sensitive surface. | Move the current focus to the previous navigable portion of the symbolic expression, decrease the selection granularity to the next lowest level, and decrease the zoom level of the display screen. |
| Two-finger single tap on the touch-sensitive surface. | Toggle output of current accessibility information, e.g., toggles between pausing and playing audible accessibility information. |

TABLE 1-continued

Exemplary accessibility gestures

Location-dependent navigation

| Detected gesture | Response to Detected gesture |
| --- | --- |
| Single-finger tap on, near, at, or within a selectable area of the touch-sensitive surface. | Set the current focus to the portion of the symbolic expression corresponding to the selectable area and speak information associated with the portion of the symbolic expression where the current focus is now set. |
| Single-finger trace across selectable areas of the touch-sensitive surface. | Set the current focus to the portion of the symbolic expression corresponding the selectable area being traced across and speak information associated with the portion where the current focus is now set. |

The accessibility gestures in Table 1 are merely exemplary. In some embodiments, the response to opposite gestures (e.g., a downward gesture versus the corresponding upward gesture, or a leftward gesture versus the corresponding rightward gesture) may be reversed from those shown in Table 1. For example, a single-finger flick left gesture may move the current focus to the next navigable portion and a single-finger flick right gesture may move the current focus to the previous navigable portion. In some embodiments, the responses to opposite gestures are user configurable, e.g., via a settings or options menu.

In some embodiments, the accessibility user interface allows a user to associate a command with a predefined gesture. In some embodiments, a gesture may be combined with a modified key (e.g., a control, options, command, or shift key) and mapped to any command of the user's choice. For example, a user may choose to map a two-finger rotation gesture with the control-key activated to a command that adjusts the speaking rate of the accessibility information.

Location-Independent Gestures for Sequential Navigation

UI 400A-UI 400G (FIGS. 4A-4G) depict an example of advancing through a sequence of portions of a symbolic expression displayed on one user interface screen.

UI 400A (FIG. 4A) illustrates an exemplary user interface displaying a navigable symbolic expression. In this example, the symbolic expression is the quadratic formula, but could just as easily by another mathematical symbolic expression or a chemical or scientific symbolic expression. The accessibility cursor 402 is at the quadratic formula portion 401 as a whole, so the current focus is on or at the quadratic formula portion 401 as a whole.

Drill-Down Operation

User gesture 404, e.g., a finger swipe or flick gesture, has an initial contact 404-1 on the touch screen 112 that moves 404-2 towards the right edge of the touch screen 112. Note that in UI 400A, exemplary user gesture 404 is independent of contacting quadratic equation portion 401.

UI 400C (FIG. 4C) illustrates the exemplary user interface following user gesture 404. The accessibility cursor has moved from the quadratic equation as a whole to the identifier portion 401 in response to user gesture 404. This indicates that the current focus is now at the identifier portion 401 instead of the quadratic equation as a whole. Audible information associated with the identifier portion 401, such as "x" and/or "left-hand side", is also output in response to user gesture 404. In some embodiments, the audible information also includes a drill-down sound to indicate that the current focus has moved from a portion of the symbolic expression to a sub-portion of that portion in response to user gesture 404. In this example, the identifier portion 401 is a sub-portion of the entire quadratic equation.

While the user gesture 404 in the exemplary embodiment of UI 400A (FIG. 4A) is a single-finger touch gesture, in other embodiments the user gesture 404 is a multi-finger touch gesture such as a two-finger flick right gesture or three-finger flick-right gesture.

Although in UI 400C the current focus moved from the quadratic equation as a whole to the identifier portion 401 in response to the user gesture 404, the current focus could have just as easily moved from the quadratic equation as a whole to another sub-portion of the quadratic equation in response to the user gesture 404. For example, the current focus could have moved to the sub-portion consisting of the x identifier and the = (equals) operator, or moved to the sub-portion consisting of the entire fraction portion of the quadratic equation, or any other sub-portion of the quadratic equation.

Tree-Based Representation of Symbolic Expressions

In some embodiments, navigable portions of a symbolic expression are represented in a computer memory of the device as a tree data structure. The tree data structure has a root node and one or more other nodes that are children of one other node. Each node of the tree represents a portion of the symbolic expression, with the root node representing a largest portion of the symbolic expression (e.g., the entire symbolic expression).

While in some embodiments the root node represents the entire symbolic expression (e.g., the entire quadratic equation), in other embodiments the root node represents a sub-symbolic expression of the entire symbolic expression (e.g., the right-hand side of the quadratic equation). Each node in the tree corresponds to a portion of the symbolic expression that can be the subject of the current focus. A node can have a parent node (in which case that node is also a child node of the parent node), one or more child nodes (in which case that node is also a parent node of the one or more child nodes), and/or one or more sibling nodes (in which case that node and its sibling nodes all have the same parent node). A child node represents a sub-portion of the portion of the symbolic expression represented by its parent node. A parent node represents a super-portion of the portions of the symbolic expression represents respectively by its children.

Figure 5A:
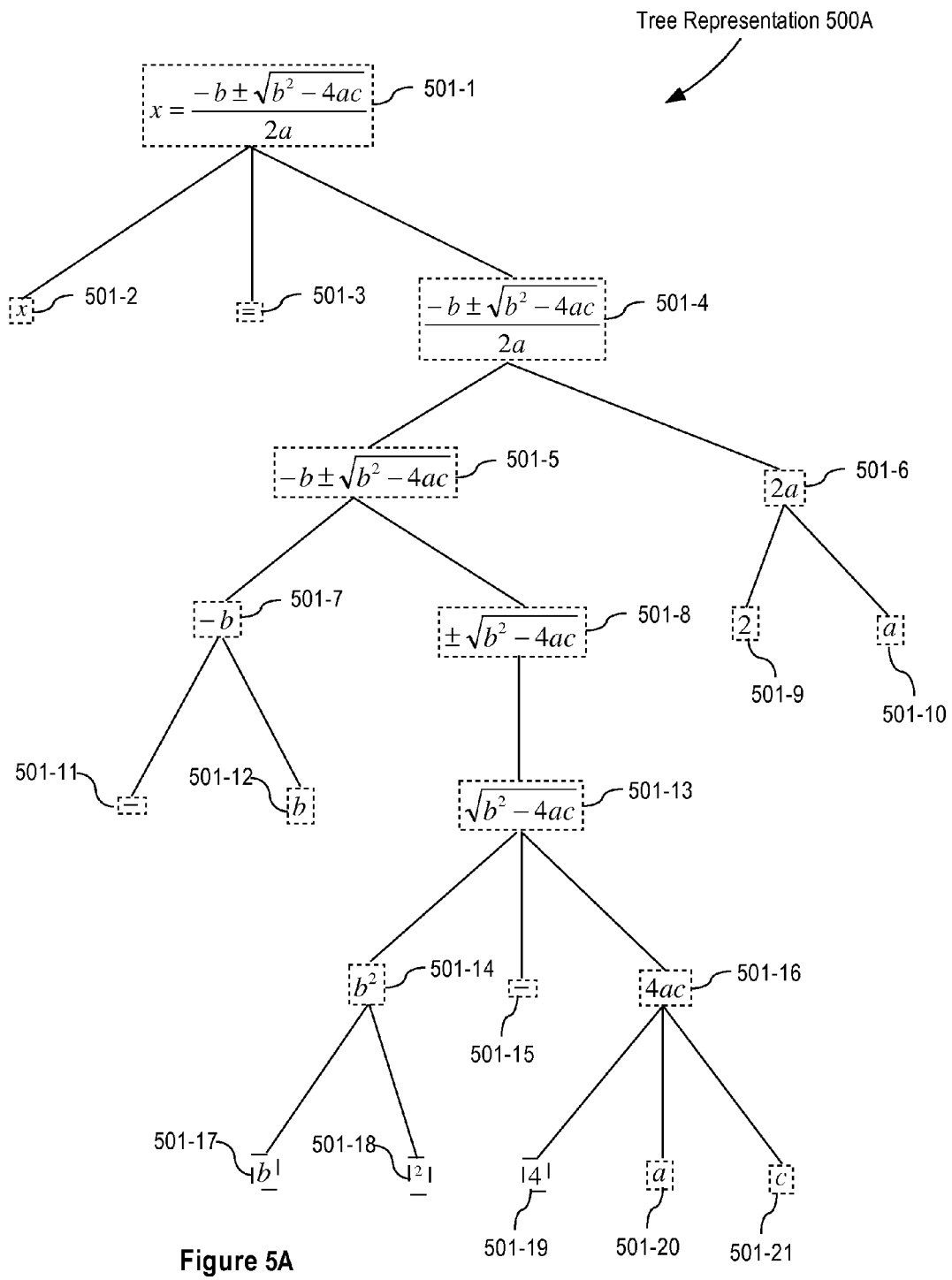
FIGS. 5A-5F illustrate tree representations of symbolic expressions in accordance with some embodiments.

In some embodiments, the tree representation facilitates advancing through navigable portions of a symbolic expression in a sequence corresponding to either a depth-first or breadth-first traversal of the tree. For example, FIG. 5A illustrates an exemplary tree representation 500A of the quadratic equation. Tree 500A has twenty-one nodes numbered from 501-1 to 501-21 in breadth-first traversal order. If the current focus is set to node 501-5, then a gesture to advance the current focus would set the current focus at node 501-6. Audible information associated with node 501-6 such as "denominator" and/or "2 times a", is also output in response to the advance gesture. If the current focus is set at node 501-8, then a gesture to move the current focus backward by one navigable unit would set the current focus at node 501-7. Audible information associated with node 501-7 such as "minus b", is also output in response to the move backward gesture.

Figure 5B:
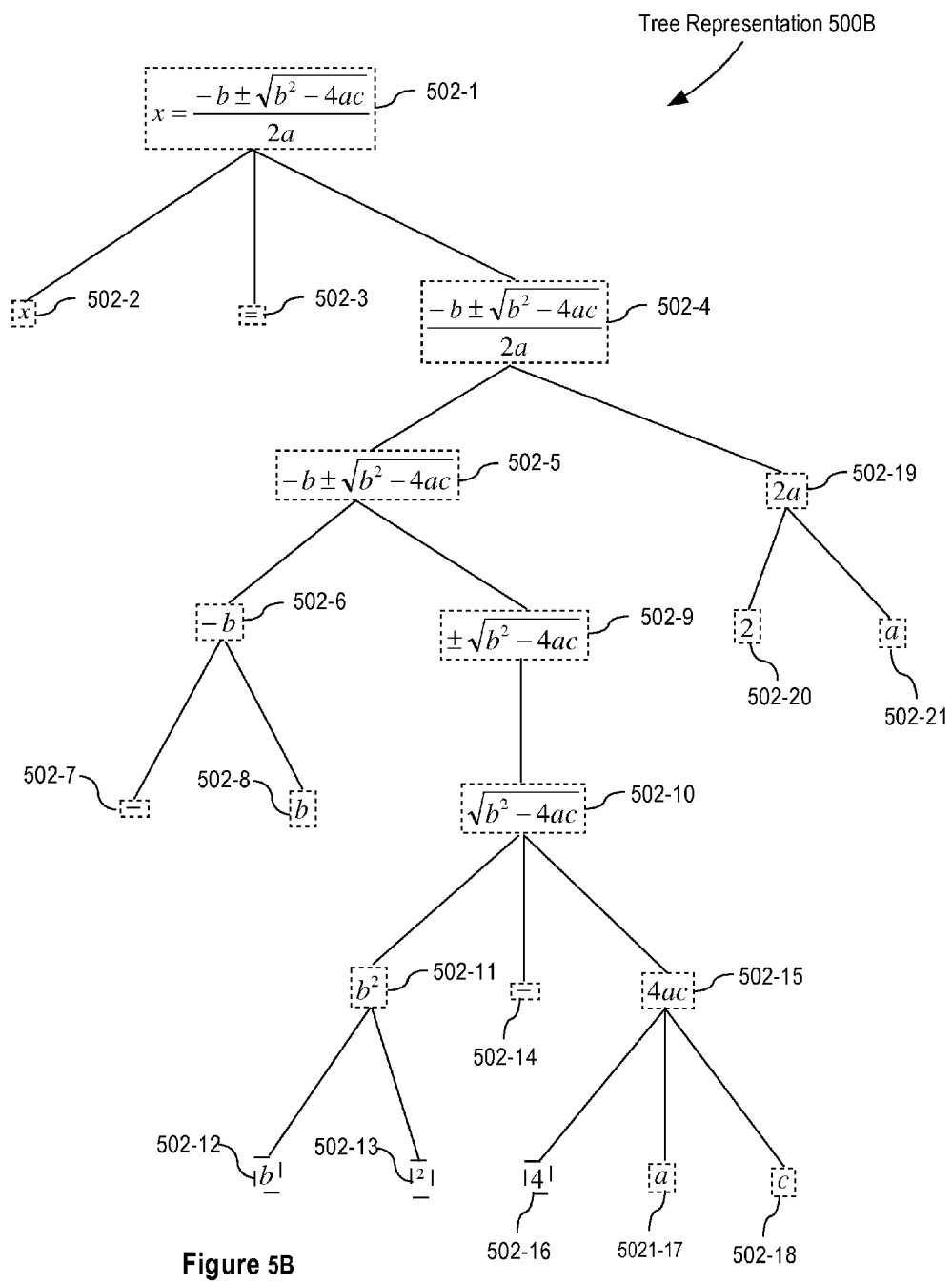

In contrast, tree 500B of FIG. 5B has the same twenty-one nodes numbered from 502-1 to 502-21 in depth-first traversal order. In this case, if the current focus is set to node 502-5, then a gesture to advance the current focus would set the current focus at node 502-6 of tree 500B. Audible information associated with node 502-6 of tree 500B such as "minus b", is also output in response to the advance gesture. If the current focus is set at node 502-9, then a gesture to move the current focus backward by one navigable unit would set the current focus at node 502-8. Audible information associated with node 502-8 of tree 500B such as "b", is also output in response to the move backward gesture.

Although in some embodiments advancing or moving backward navigable portions of a symbolic expression corresponds to a depth-first or breadth-first traversal of a tree representation of the symbolic expression, advancing or moving backward navigable portions may correspond to other traversals of the tree representation. Indeed, a gesture to advance or move backward can correspond to a traversal from the node where the current focus is set directly to any other node of the tree representation. For example, if the current focus is set at node 501-4 of tree representation 500A (FIG. 5A), a gesture to advance to the next navigable portion may correspond to a traversal directly to node 501-9 or directly to any other node of the tree representation 500A.

Although not a requirement, the portions of a symbolic expression that are considered the navigable portions may be based on a markup language description of the symbolic expression from which a tree representation of the symbolic expression may be generated. For example, in the mathematics domain, a Mathematical Markup Language (MathML) or LaTex description may be used. In other domains, other markup language descriptions may be used.

In FIGS. 5A and 5B, each node of tree representations 500A and 500B correspond to a portion of a symbolic expression. Although not depicted in tree representations 500A and 500B, in some embodiments, each individual token and layout element of a symbolic expression corresponds to a leaf node in a tree representation of the symbolic expression. For example, referring to tree representation 500A, individual elements ± and √ do not correspond to a leaf node in representation 500A or 500B. However, in other embodiments, the individual elements ± and √ each correspond to a leaf node that is a child of node 501-5 in tree representation 500A and a child of node 502-5 in tree representation 500B. What is considered to be an individual element of a symbolic expression may vary according to the requirements of the implementation at hand. For example, what is considered to be an individual element of a symbolic expression may be based on a markup language description or other description of the symbolic expression such as, for example, a MathML or LaTex description of the symbolic expression.

Navigating Between Sub-Portions of an Equation

Returning to the navigation example, UI 400C (FIG. 4C) depicts user gesture 406 on the exemplary user interface, e.g., another single-finger or multi-finger swipe or flick gesture. Gesture 406 has an initial contact 406-1 on the touch screen 112 that moves 406-2 towards the right edge of the touch screen 112. Note that exemplary user gesture 406 remains independent of contacting identifier portion 401 or any other portion of the symbolic expression.

UI 400D (FIG. 4D) depicts that, in response to user gesture 406, the current focus, and thus, the accessibility cursor 402 has moved to the equals operator portion 401 of the quadratic equation. Audible information associated with the equals operator portion 401, such as "operator" and/or "equals", is also output in response to user gesture 406.

UI 400D (FIG. 4D) also depicts user gesture 408 on the exemplary user interface, e.g., another single-finger or multi-finger left-to-right finger swipe or flick gesture. Gesture 408 has initial contact point 408-1 on the touch screen that moves 408-2 towards the right edge of the touch screen 112. Note that exemplary user gesture 408 remains independent of contacting equals portion 401 or any other portion of the symbolic expression.

UI 400E (FIG. 4E) depicts that, in response to user gesture 408, the current focus, and thus, the accessibility cursor 402 has moved to the fraction portion 401 of the quadratic equation. Audible information associated with the fraction portion 401, such as "right-hand side", "fraction" or "the fraction minus b plus or minus the square root of b squared minus 4 times a times c over 2 times a", is also output in response to user gesture 408.

UI 400E (FIG. 4E) also depicts user gesture 410 on the exemplary user interface, e.g., another single-finger or multi-finger left-to-right finger swipe or flick gesture. Gesture 410 has initial contact point 410-1 on the touch screen that moves 410-2 towards the right edge of the touch screen 112. Note that exemplary user gesture 410 remains independent of contacting fraction portion 401 or any other portion of the symbolic expression.

UI 400F (FIG. 4F) depicts that, in response to user gesture 410, the current focus, and thus, the accessibility cursor 402 has moved from the fraction portion 401 of the quadratic equation to the numerator portion 401 of the fraction portion. Audible information associated with the numerator portion 401, such as "numerator" and/or "minus b plus or minus the square root of b squared minus 4 times a times c", is also output in response to user gesture 410.

In some embodiments, the audible information also includes a drill-down sound to indicate that the current focus has moved from a portion of the symbolic expression to a sub-portion of that portion in response to user gesture 410. In this example, the current focus has moved from the fraction portion of the quadratic equation to the numerator portion of the fraction. A user may continue to advance through the navigable portions of the symbolic expression by continuing to input single-finger or multi-finger left-to-right finger swipe or flick gestures (not shown).

While in some embodiments as exemplified in UI 400C-400F (FIGS. 4C-4F), the same gesture is performed to navigate between portions of a symbolic expression within a level and to drill-down from one level to another, one gesture is performed to navigate between portions of a symbolic expression within a level and another different gesture is performed to drill-down from one level to another in other embodiments. In these embodiments, an audible navigation indicator sound may be output when the gesture to navigate between portions of a symbolic expression within a level is performed when there are no more portions in the level in the direction of the gesture to navigate to. In some embodiments, the location-independent gesture to navigate between portions of a symbolic expression within a level is a single-finger flick or swipe gesture and the location-independent gesture to drill-down from one level to another is a two-finger flick or swipe gesture. For example, referring to UI 400E (FIG. 4E), assuming user gesture 410 is a single-finger flick or swipe gesture, in response to user gesture 410, an audible beep or other halting sound may be output to indicate to the user that there are no more portions of the symbolic expression in the current level in the direction of the gesture 410 to navigate to. In this case, in response to the single-finger flick or swipe gesture 410, the current focus remains at portion 402. On the other hand, assuming user gesture 410 is a two-finger flick or swipe gesture, in response to that gesture 410, the current focus may move from the fraction portion 401 of the quadratic equation to the numerator portion 401 of the fraction portion as shown in UI 400F (FIG. 4F). Thus, one gesture may be performed to navigate between sibling portions a symbolic expression and another different gesture may be performed to drill-down from a parent portion to child portion of the symbolic expression.

Expand-Up Operations

UI 400F (FIG. 4F) also depicts user gesture 412 on the exemplary user interface, e.g., a single-finger or multi-finger right-to-left finger swipe or flick gesture. Gesture 412 has initial contact point 412-1 on the touch screen that moves 412-2 towards the left edge of the touch screen 112 which is substantially opposite of gestures 404, 406, and 408. Note that exemplary user gesture 412 remains independent of contacting portion 401 or any other portion of the symbolic expression.

UI 400G (FIG. 4G) depicts that, in response to user gesture 412, the current focus, and thus, the accessibility cursor 402 has moved back to the fraction portion 401 of the quadratic equation. Audible information associated with the fraction portion 401, such as "right-hand side", "fraction", or "the fraction minus b plus or minus the square root of b squared minus 4 times a times c over 2 times a", is also output in response to user gesture 412.

In some embodiments, the audible information also includes an expand-up sound to indicate that the current focus has moved from a portion of the symbolic expression to a super-portion of that portion in response to user gesture 412. In this example, the current focus has moved from the numerator portion as depicted in UI 400F (FIG. 4F) to the fraction portion as depicted in UI 400G (FIG. 4G). The expand-up sound may be the same as or different from the drill-down sound.

While in some embodiments as exemplified in UI 400E-400G (FIGS. 4F and 4G), the same gesture is performed to navigate between portions of a symbolic expression within a level and to expand-up from one level to another, one gesture is performed to navigate between portions of a symbolic expression within a level and another different gesture is performed to expand-up from one level to another in other embodiments.

Accordingly, location-independent user gestures in one direction may advance the current focus through a given sequence or order of portions of a symbolic expression; while location-independent user gestures in a substantially opposite direction may cause the current focus to retreat or backtrack through the given sequence or order of portions of the symbolic expression. Advancing or backtracking through a sequence of portions of a symbolic expression may include drilling-down into sub-portions and expanding-up into super-portions of the symbolic expression. Different gestures may be used to advance or backtrack through portions in a group of portions and to drill-down or expand-up from one portion to another. For example, single-finger gestures may be used to advance or backtrack sibling portions of a symbolic expression and multi-finger gestures may be used to drill-down or expand-up between parent and child portions.

Location-Dependent Gestures for Selective Navigation

UI 400H-UI 400I (FIGS. 4H-4I) depict an example of moving the current focus and the accessibility cursor using location-dependent gestures. In this example, the accessibility cursor 402 (and current focus) is initially on or at some other content 403 (e.g., text). User gesture 413, depicted in UI 400H, is a stationary contact on the touch screen 112, e.g., a single-finger tap on the quadratic equation portion 401.

UI 400I (FIG. 4I) depicts that, in response to user gesture 413 (FIG. 4H), the current focus, and thus, the accessibility cursor 402 moves to the quadratic equation portion 401. Audible information associated with the quadratic equation portion 401, such as "quadratic equation" and/or "x equals the fraction minus b plus or minus the square root of b squared minus 4 times a times c over 2 times a", is also output in response to user gesture 413. Thus, the accessibility user interface may include both location-dependent finger gestures for navigation that provide accessibility information about a portion of a symbolic expression at the location of the finger gesture (e.g., gesture 413), as well as location-independent finger gestures for navigation that provide accessibility information about a portion of a symbolic expression independent of the location of the finger gesture (e.g., gestures 404, 406, 408, 410, and 412).

In some embodiments, the audible information associated with a portion of a symbolic expression that is output in response to a user gesture contains grouping information to audibly indicate logical groupings of portions to the user. For example, in response to user gesture 413 (FIG. 4H), audible information associated with the quadratic equation portion 401, such as "x equals start fraction 1 start numerator negative b plus or minus the square root of start group 1 b squared minus 4 times a times c end group 1 end numerator start fraction 1 denominator 2 times a end fraction 1 denominator end fraction 1", may be output.

Location-Independent and Location-Dependent Gestures in Combination

UI 400I-UI 400N (FIGS. 4I-4N) depict an example of navigating portions of a symbolic expression displayed on one user interface screen using a combination of location-independent and location-dependent gestures. In this example, location-independent user gestures are performed to advance and backtrack through a sequence of navigable portions of a symbolic expression as described and depicted in UI 400A-UI 400G (FIGS. 4A-4G). In addition, location-independent gestures are performed to change the "selection granularity" of the symbolic expression. The "selection granularity" determines what portions of the symbolic expression are selectable through performance of location-dependent user gestures.

The exemplary user interfaces depicted in FIGS. 4I-4N include one or more selectable areas are associated with a current selection granularity. Each selectable area covers an area of the display screen and is associated with a specific portion of a symbolic expression which, if selected, would cause the device to execute an action associated with that specific portion. The specific portion associated with a selectable area may be selected by the user by performing a location-dependent gesture on, at, near, or within the selectable area. For example, in UI 400I (FIG. 4I) there is one selectable area 414 associated with the entire quadratic equation portion 401, so that if a location-dependent gesture is performed on, at, near, or within the selectable area 414, the device running the user interface would aurally present information associated with the entire quadratic equation portion 401.

Although in some embodiments, as exemplified in UI 400I, a selectable area may coincide with the area of the accessibility cursor 402 (whether or not displayed), a selectable area may not coincide with the area of the accessibility cursor 402 in other embodiments. Although in some embodiments a selectable area is indicated visually in the user interface, a selectable area is not indicated visually in other embodiments.

UI 400I (FIG. 4I) illustrates an exemplary user interface displaying a navigable symbolic expression. In this example, the symbolic expression is the quadratic formula, but could just as easily by another mathematical symbolic expression or a chemical or scientific symbolic expression. The accessibility cursor 402 is at the quadratic formula portion 401 as a whole, so the current focus is on or at the quadratic formula portion 401 as a whole.

Increasing Granularity of Selectable Sub-Parts

A location-independent user gesture 415, e.g., a single-finger or multi-finger swipe or flick gesture, has an initial contact 415-1 on the touch screen 112 that moves 415-2 towards the right edge of the touch screen 112. Note that in UI 400I, exemplary user gesture 415 is independent of contacting quadratic equation portion 401.

UI 400J (FIG. 4J) illustrates the exemplary user interface following user gesture 415. The accessibility cursor has moved from the quadratic equation as a whole to the identifier portion 401 in response to user gesture 415. This indicates that the current focus is now at the identifier portion 401 instead of the quadratic equation as a whole. Audible information associated with the identifier portion 401, such as "x" and/or "left-hand side", is also output in response to user gesture 415. In some embodiments, the audible information also includes a drill-down sound to indicate that the current focus has moved from a portion of the symbolic expression to a sub-portion of that portion in response to user gesture 415. In this example, the identifier portion 401 is a sub-portion of the entire quadratic equation.

Also in response to user gesture 415, the current selection granularity has become finer (i.e., increased) relative to the previous selection granularity in effect prior to user gesture 415. As a result, in response to user gesture 415, there are now three selectable areas 414-1, 414-2, and 414-3 corresponding to the left-hand side, the equals operator, and the right-hand side of the quadratic equation respectively. In other words, in response to user gesture 415, selectable area 414-1 in effect prior to user gesture 415, has been replaced by selectable areas 414-1, 414-2, and 414-3.

While in some embodiments as exemplified in UI 400I-400J (FIGS. 4F and 4G), the same gesture is performed to navigate between portions of a symbolic expression within a granularity level and to drill-down or expand-up from one granularity level to another, one gesture is performed to navigate between portions of a symbolic expression within a granularity level and another different gesture is performed to drill-down or expand-up from one granularity level to another in other embodiments. For example, referring to UI 400I (FIG. 4I), in order to increase the granularity level, the user gesture 415 may be required to be a multi-finger swipe or flick gesture. In this case, if user gesture 415 is a single-finger swipe or flick gesture, then audible navigation sound (e.g., a beep or bump sound) may be output to indicate that there are no more portions to navigate to in the current granularity level in the direction of the single-finger swipe or flick.

Characteristics of Selectable Areas

In some embodiments, a selectable area for an associated portion of a symbolic expression has the shape of a box (square or rectangle) with rounded or right-angle corners that surrounds the portion of the symbolic expression associated with the selectable area as displayed on the display screen but that does not overlap with other selectable areas for other portions. Thus, the size and shape of the selectable area may vary depending on the size of the portion, the current display screen zoom level, font size, screen orientation, and other display and/or content factors.

In some embodiments, a selectable area is expanded vertically and/or horizontally to cover whitespace in the area surrounding the portion of the symbolic expression with which the selectable area is associated. For example, in UI 400J (FIG. 4J), the selectable areas 414-1 and 414-2 have been expanded vertically to match the vertical height of selectable area 414-3.

While in some embodiments selectable areas are abutting, selectable areas may have a border or boundary such that adjacent selectable areas have a whitespace gap between them.

In some embodiments, the selectable area for a portion of a symbolic expression corresponds to a layout bounding box that encloses the portion in a display screen layout of the symbolic expression. For example, the layout bounding box may correspond to a markup language element (e.g., a HTML element) of a markup language document that is laid out on the display screen. In these embodiments, as the position, shape and size of the layout bounding box changes, the position, shape, and size of the selectable area is also changed correspondingly to maintain coincidence between the layout bounding box and the selectable area. For example, if the display screen is zoomed such that the size of the layout bounding box is changed, then the corresponding selectable area is also changed correspondingly.

While in some embodiments a selectable area has the shape of a box with rounded or right-angle corners, a selectable area has the shape of an oval, a circle, or other polygon in other embodiments.

While in example user interface of FIG. 4J (and other example user interfaces of the figures), adjacent selectable areas are depicted as not abutting each other, in other embodiments adjacent selectable areas are abutting each other.

Increasing Granularity of Selectable Sub-Parts

Continued

A location-dependent gesture 416, depicted in UI 400J, is a stationary contact on the touch screen 112, e.g., a single-finger tap on, at, near, or within selectable area 414-3.

UI 400K (FIG. 4K) depicts that, in response to location-dependent user gesture 416 (FIG. 4J), the current focus, and thus, the accessibility cursor 402 moves to the fraction portion 401 of the quadratic equation. Audible information associated with the fraction portion 401, such as "fraction" or "the fraction minus b plus or minus the square root of b squared minus 4 times a times c over 2 times a", is also output in response to user gesture 416. The current selection granularity has not changed in response to user gesture 416. Accordingly, there are still the three selectable areas 414-1, 414-2, and 414-3.

UI 400K (FIG. 4K) also depicts location-independent user gesture 417 on the exemplary user interface, e.g., another swipe or flick gesture. Gesture 417 has an initial contact 417-1 on the touch screen 112 that moves 417-2 towards the right edge of the touch screen 112. Note that exemplary user gesture 417 is independent of contacting any portion of the symbolic expression.

UI 400L (FIG. 4L) depicts that, in response to user gesture 417, the current focus, and thus, the accessibility cursor 402 has moved to the numerator portion 401 of the quadratic equation. Audible information associated with the numerator portion 401, such as "numerator" and/or "minus b plus or minus the square root of b squared minus 4 times a times c", is also output in response to user gesture 417. In some embodiments, the audible information also includes a drill-down sound to indicate that the current focus has moved from a portion of the symbolic expression to a sub-portion of that portion in response to user gesture 417. In this example, the numerator portion 401 is a sub-portion of the fraction portion.

Also in response to user gesture 417, the current selection granularity has become finer (i.e., increased) relative to the previous selection granularity in effect prior to user gesture 417 (UI 400K). As a result, in response to user gesture 417, there are now four selectable areas 414-1, 414-2, 414-3, and 414-4 corresponding to the left-hand side, the equals operator, the numerator, and the denominator of the quadratic equation respectively. Note, in this example, selectable areas 414-1 and 414-2 corresponding to the left-hand-side and the equals operator respectively were not changed in response to user gesture 417. However, selectable area 413-1 in effect prior to user gesture 417 (UI 400K) was, in response to user gesture 417, replaced by selectable areas 414-3 and 414-4 as shown in UI 400L. A location-dependent gesture 418, depicted in UI 400L, is a stationary contact on the touch screen 112, e.g., a single-finger tap on, at, near, or within selectable area 414-4.

In some embodiments, in response to user gesture 417, the current selection granularity is increased but there are only two selectable areas 414-3 and 414-4 as shown in UI 400L (FIG. 4L) instead of four selectable areas and the selectable areas 414-1 and 414-2 as shown in UI 400L (FIG. 4L) are not selectable at the new selection granularity. In this case, the user may be perform a location-independent gesture (e.g., a two-finger swipe or flick left gesture) to decrease the selection granularity and restore the selectable areas 414-1, 414-2, and 414-3 as shown in UI 400K (FIG. 4K).

UI 400M (FIG. 4M) depicts that, in response to location-dependent user gesture 418 (FIG. 4L), the current focus, and thus, the accessibility cursor 402 moves to the denominator portion 401 of the quadratic equation. Audible information associated with the denominator portion 401, such as "denominator" and/or "2 times a", is also output in response to user gesture 418. The current selection granularity has not changed in response to user gesture 418. Accordingly, there are still the four selectable areas 414-1, 414-2, 414-3, and 414-4. A user may continue to advance through the navigable portions of the symbolic expression by continuing to input left-to-right finger swipe or flick gestures (not shown). A user may continue to select portions of the symbolic expression by continuing to input single-tap gestures to selectable areas corresponding to the portions.

Expand-Up Operations

UI 400M (FIG. 4M) also depicts location-independent user gesture 419 on the exemplary user interface, e.g., a right-to-left swipe or flick gesture. Gesture 419 has an initial contact 419-1 on the touch screen 112 that moves 419-2 towards the left edge of the touch screen 112. Note that exemplary user gesture 419 is independent of contacting any portion of the symbolic expression.

UI 400N (FIG. 4N) depicts that, in response to user gesture 419, the current focus, and thus, the accessibility cursor 402 has moved back to the fraction portion 401 of the quadratic equation. Audible information associated with the fraction portion 401, such as "right-hand side", "fraction", or "the fraction minus b plus or minus the square root of b squared minus 4 times a times c over 2 times a", is also output in response to user gesture 419. In some embodiments, the audible information also includes an expand-up sound to indicate that the current focus has moved from a portion of the symbolic expression to a super-portion of that portion in response to user gesture 419. In this example, the current focus has moved from the denominator portion as depicted in UI 400M (FIG. 4M) to the fraction portion as depicted in UI 400N (FIG. 4N). The expand-up sound may be the same as or different from the drill-down sound.

Also in response to user gesture 419, the current selection granularity has become coarser (i.e., decreased) relative to the previous selection granularity in effect prior to user gesture 419 (UI 400M). As a result, in response to user gesture 419, there are three selectable areas 414-1, 414-2, and 414-3 corresponding to the left-hand side, the equals operator, and the right-hand side of the quadratic equation respectively. Note, in this example, selectable areas 414-1 and 414-2 corresponding to the left-hand-side and the equals operator respectively were not changed in response to user gesture 419. However, selectable areas 414-3 and 414-4 in effect prior to user gesture 419 (UI 400M) were, in response to user gesture 419, replaced by selectable area 414-3 as shown in UI 400N.

Accordingly, location-independent user gestures in one direction, as well as causing the current focus to advance through a given sequence or order of portions of a symbolic expression, may cause the selection granularity to increase; while location-independent user gestures in a substantially opposite direction, as well as causing the current focus to retreat or backtrack through the given sequence or order of portions of the symbolic expression, may cause the selection granularity to decrease. Advancing or backtracking through a sequence of portions of a symbolic expression may include drilling-down into sub-portions and expanding-up into super-portions of the symbolic expression.

In some embodiments, instead of a single-finger flick right gesture to advance to the next portion of a symbolic expression and increase the selection granularity, a two-finger flick right gesture is performed. In some embodiments, instead of a single-finger flick left gesture to backtrack to the previous portion of a symbolic expression and decrease the selection granularity, a two-finger flick left gesture is performed.

In some embodiments, a three-finger flick right gesture, as well as advancing to the next portion and increasing the selection granularity, also increases the zoom level of the display screen. In some embodiments, a three-finger flick left gesture, as well as backtracking to the previous portion and decreasing the selection granularity, also decreases the zoom level of the display screen.

Selection Granularity and Tree Representation of a Symbolic Expression

In some embodiments, a tree representation of a symbolic expression stored in computer memory is involved in determining which portions of the symbolic expression correspond to selectable areas at the current selection granularity. Each level of the tree corresponds to a different selection granularity. The topmost level of the tree consisting of just the root node corresponds to the lowest (i.e., most coarse) selection granularity. The bottommost level that includes the most nested nodes of the tree corresponds to the highest (i.e., finest) selection granularity. The current selection granularity is at the level of the tree where the current focus is set. Every node in the tree at the level where the current focus is set corresponds to portions of the symbolic expression that correspond to selectable areas at the current selection granularity. In addition, all leaf nodes of the tree (i.e., nodes that have no children) at levels in the tree higher that the level where the current focus is set also correspond to portions of the symbolic expression that correspond to selectable areas at the current selection granularity.

Figure 5C:
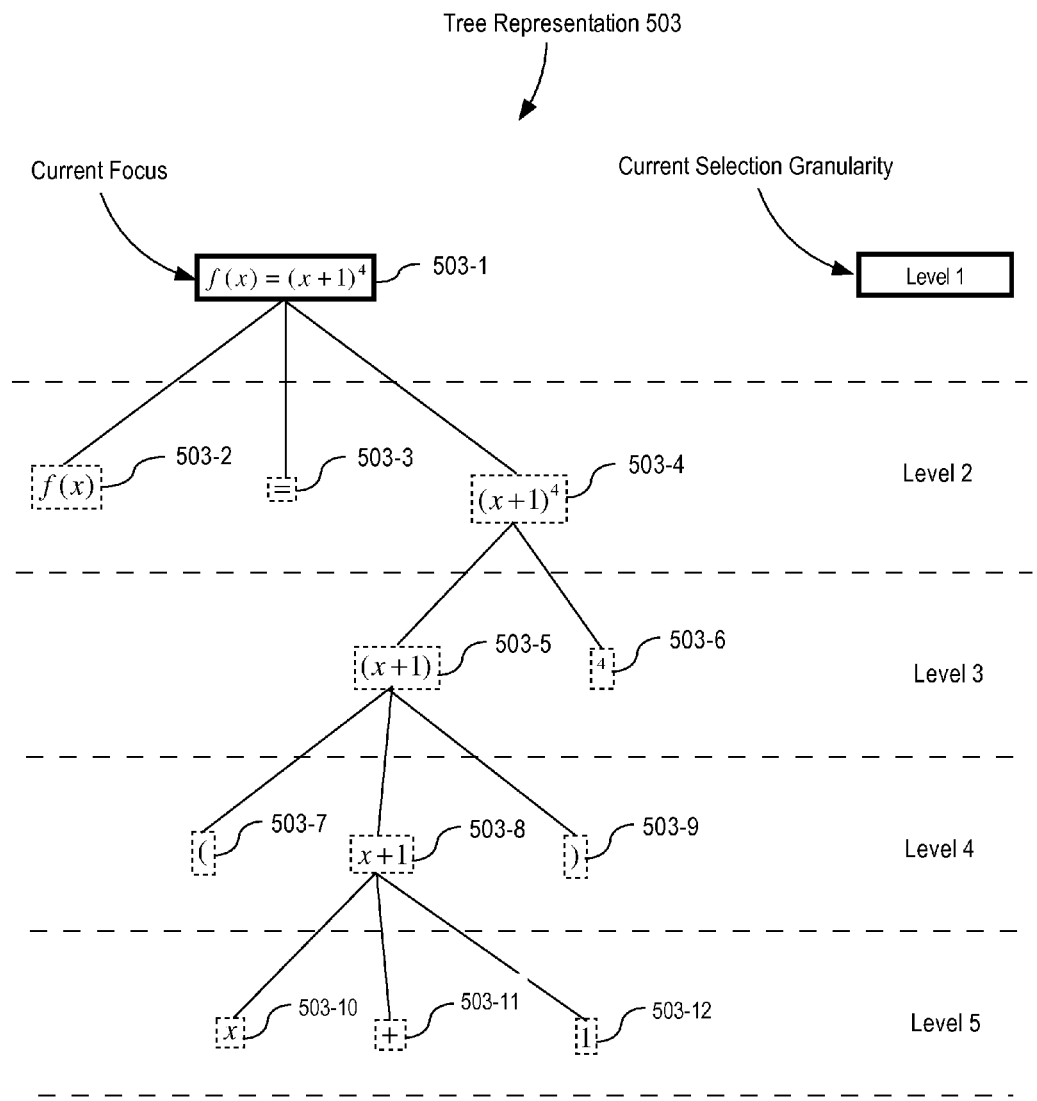

For example, tree representation 503 of FIG. 5C is of the symbolic equation $f(x)=(x+1)^4$. Initially, the current focus is at the portion of the symbolic represented by node 503-1 of the tree. Accordingly, the current selection granularity is set at the first level (Level 1) of the tree 503. The portion of the symbolic expression corresponding to node 503-1 corresponds to a selectable area at the current selection granularity as indicated with the bolded box outline in FIG. 5C.

Figure 5D:
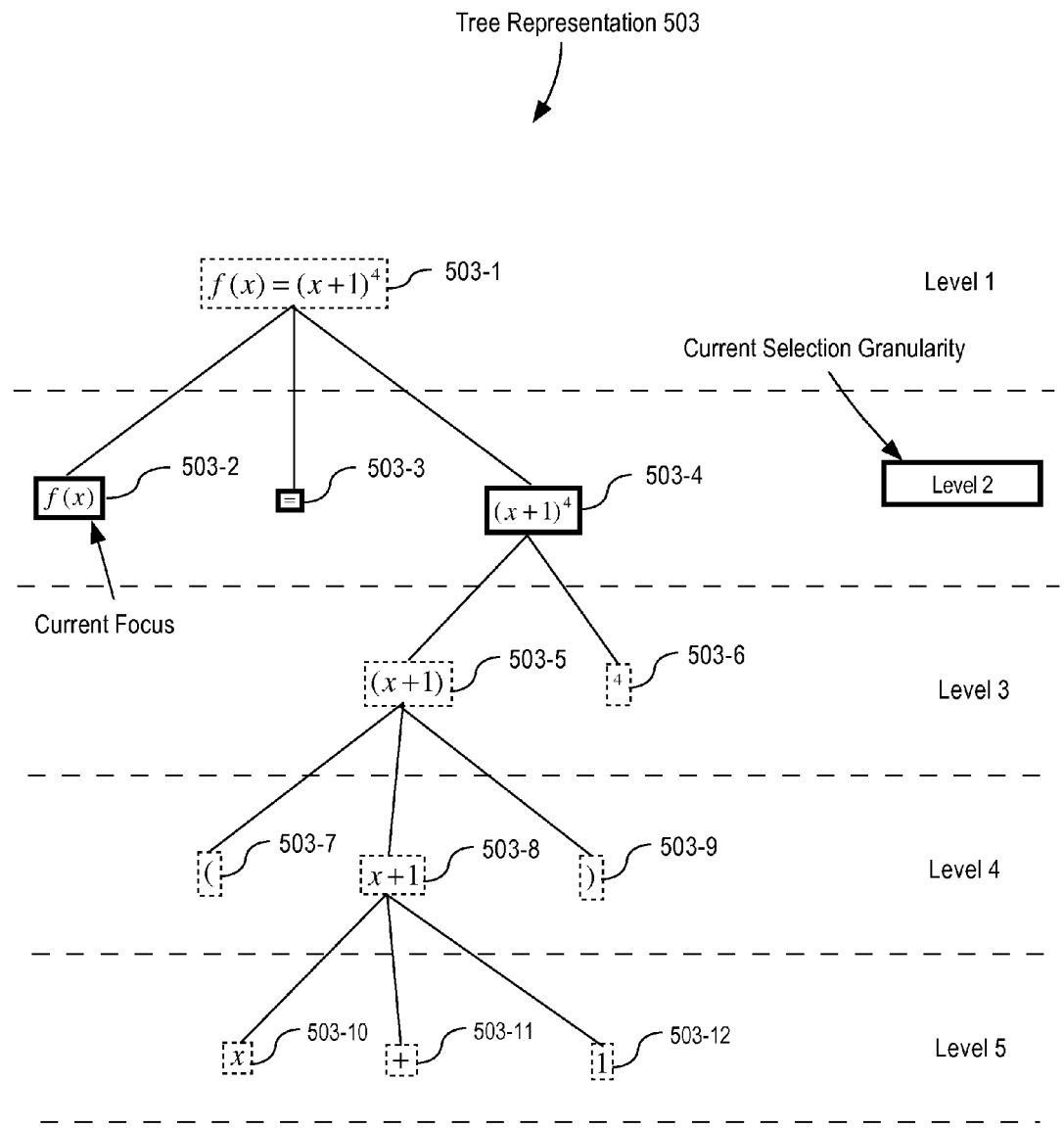

Tree 503 in FIG. 5D shows that the current focus has moved to the portion of the symbolic expression corresponding to node 503-2. Accordingly, the current selection granularity is set at the second level (Level 2) of the tree 503. The portions of the symbolic expression corresponding to nodes 503-2, 503-4, and 503-5 correspond to selectable areas at the current selection granularity as indicated with bolded box outlines in FIG. 5D.

Figure 5E:
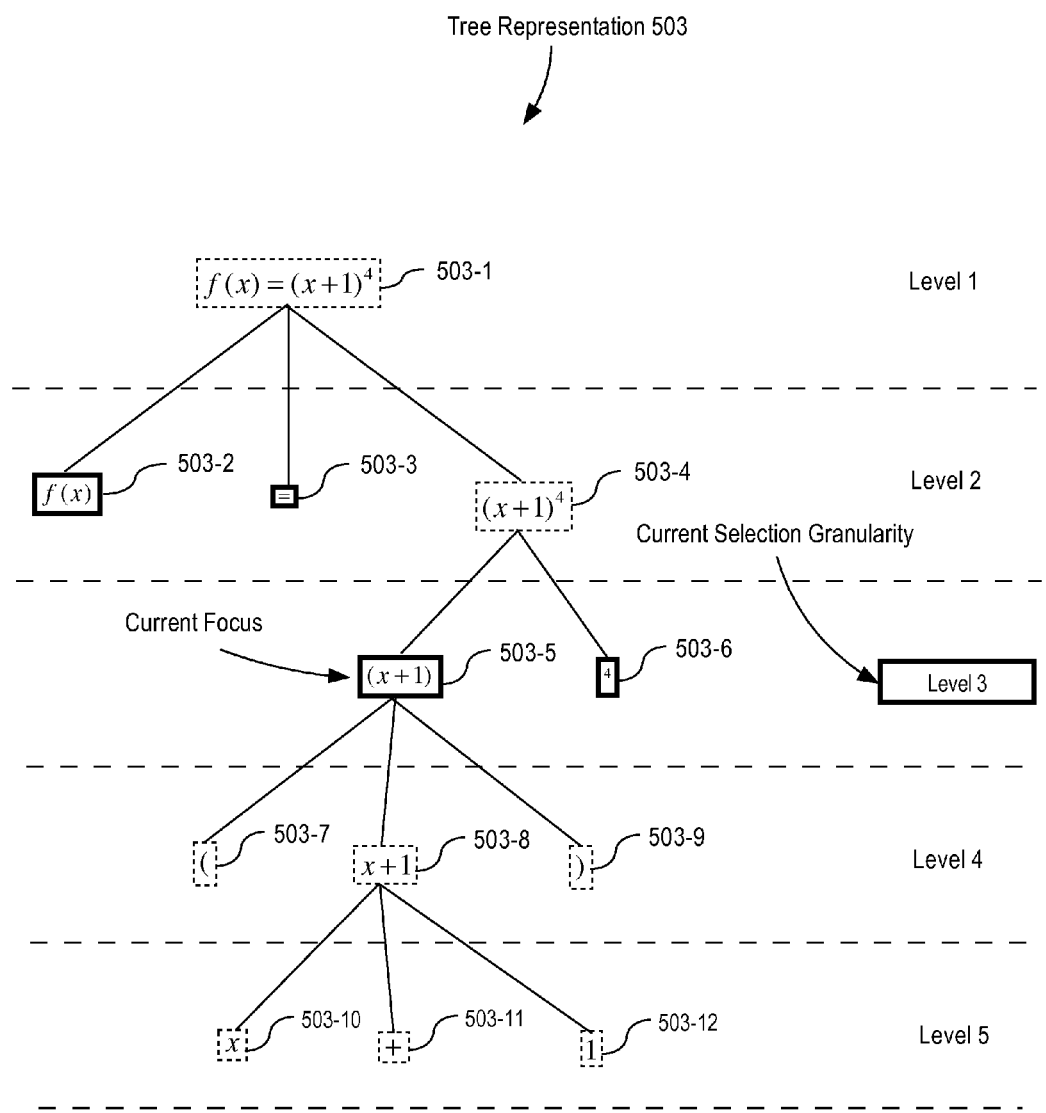

Tree 503 in FIG. 5E shows that the current focus has moved to the portion of the symbolic expression corresponding to node 503-5. Accordingly, the current selection granularity is set at the second level (Level 3) of the tree 503. The portions of the symbolic expression corresponding to nodes 503-2, 503-4, 503-5, and 503-6 correspond to selectable areas at the current selection granularity as indicated with bolded box outlines in FIG. 5E.

Figure 5F:
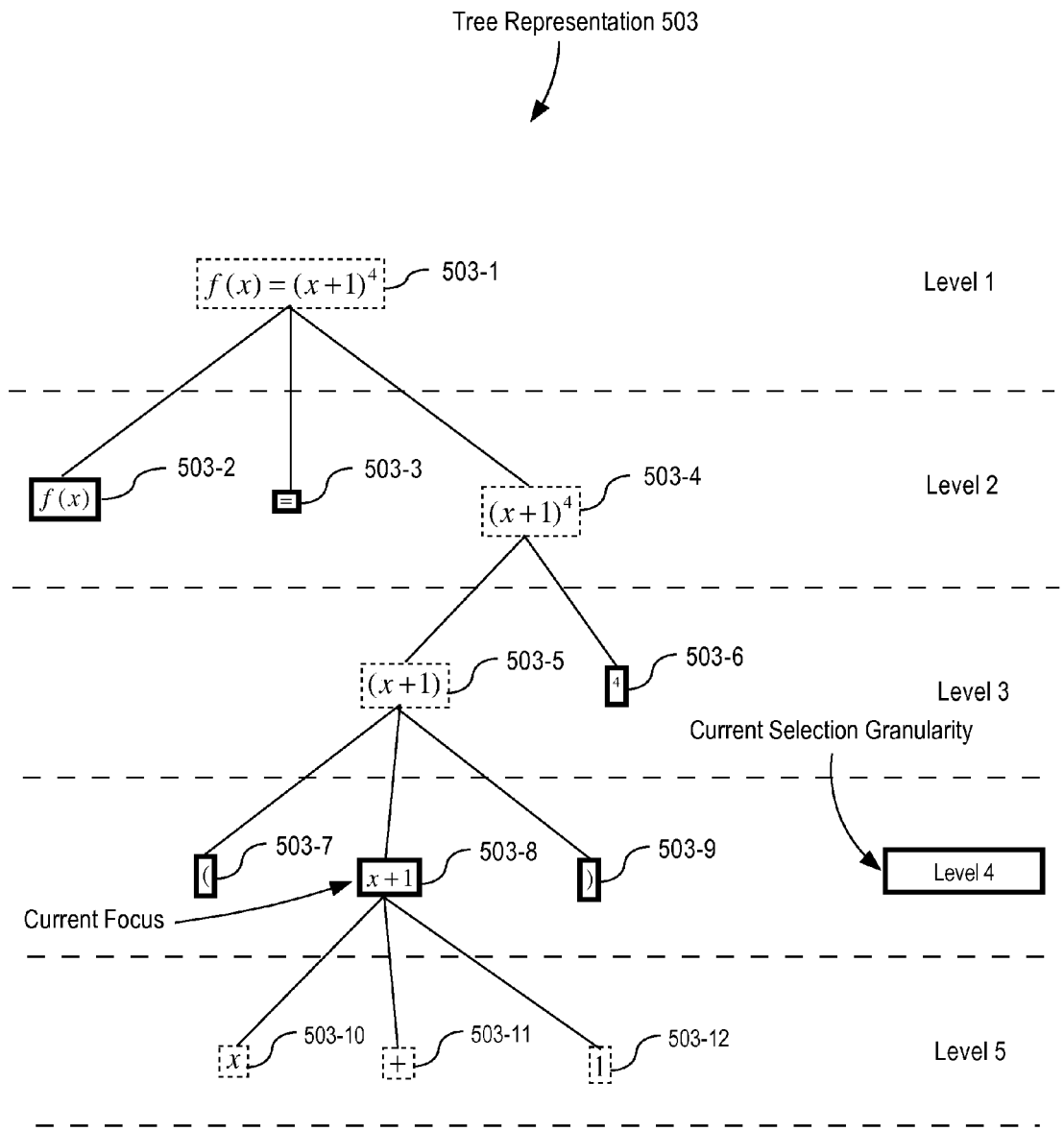

Tree 503 in FIG. 5F shows that the current focus has moved to the portion of the symbolic expression corresponding to node 503-8. Accordingly, the current selection granularity is set at the third level (Level 4) of the tree 503. The portions of the symbolic expression corresponding to nodes 503-2, 503-4, 503-7, 503-8, 503-9, and 503-6 correspond to selectable areas at the current selection granularity as indicated with bolded box outlines in FIG. 5F.

Changing Screen Reader Behavior

In some embodiments, a common gesture may be used to change settings for how accessible navigation of a symbolic expression is performed (e.g., in response to right or left single-flick or swipe gestures, Table 1). For example, a two-finger rotation or twisting gesture on the touch-sensitive surface may be used to "turn" a virtual dial, rotor, or knob to choose between options (referred to hereinafter as "root" or "rotor control" and gestures of this type may be referred herein as "rotor gestures"). This "rotor" control may act as an invisible dial for changing the response of the device to the detection of certain navigation gestures in the accessibility user interface.

The effect of the rotor control can vary. As one example, the rotor may change the response of the device to the detection of a single-flick or swipe right/left gestures from one response option to another. Three possible response options are: (1) moving the current focus to the next/previous navigable portion of the symbolic expression; (2) moving the current focus to the next/previous navigable portion of the symbolic expression and increasing/decreasing the selection granularity; and (3) moving the current focus to the next/previous navigable portion of the symbolic expression, increasing/decreasing the selection granularity, and increasing/decreasing the current zoom level of the display screen. As another example, the rotor may move the current focus to the next or previous navigable portion of the symbolic expression. In this case, a clockwise rotational pattern may advance the current focus to the next navigable portion while a counter-clockwise rotational pattern may move the current focus backwards to the previous navigable portion (or vice versa).

In some embodiments, a rotor-based gesture includes a first finger contact and a second finger contact that are separated by a distance, where the distance between the first finger contact and the second finger contact includes a center point, and the first finger contact and the second finger contact rotate on the touch screen display around the center point. In essence, as discussed above, this rotation gesture simulates turning or twisting a knob in one direction or the other. As the gesture progresses, the simulated knob turning changes the gesture response or moves to the current focus.

In some embodiments, a rotor-based gesture includes placing a first finger contact on a touch-sensitive surface, concurrently placing a second finger contact on the touch-sensitive surface, and rotating the second finger contact about the first finger contact while the first finger contact remains stationary. In this embodiment, the first finger contact acts as a center point for the rotation by the second finger contact.

A rotor-based gesture is just one example of a common gesture that may be used to change settings for how accessible navigation of a symbolic expression is performed. Other common gestures may be used to accomplish the same. As just one example, a two-finger double-tap gesture may be used to accomplish the same as a rotor-based gesture in a clockwise-rotational pattern and a single-finger double-tap gesture may be used to accomplish the same as a rotor-based gesture in a counter-clockwise rotational pattern, or vice-versa. As another example, a spread gesture may be used to accomplish the same as a rotor-based gesture in a clockwise-rotational pattern and a pinch gesture may be used to accomplish the same as a rotor-based gesture in a counter-clockwise rotational pattern, or vice-versa.

In some embodiments, a common gesture is used to select how audible information corresponding to the portion of the symbolic expression with the current focus is output. For example, a common gesture may be used to select between a literal explanation of the portion of the symbolic expression and a more semantic explanation of the portion. For example, a literal explanation of the portion $x^2$ may be audible information such as "x raised to the power of two", while a more semantic explanation of the portion $x^2$ may be audible information such as "x squared".

In some embodiments, a common gesture is used to select the audible output style of the audible information of the portion of the symbolic expression with the current focus. For example, a common gesture may be used to select between a mathematical style and chemical style.

In some embodiments in which the computing device is operatively coupled to a braille output device, a common gesture is used to select the type of braille output to the braille output device. For example, a common gesture may be used to select between Nemeth braille math output and British math braille output.

While in some embodiments a touch gesture is used to change settings for how accessible navigation of a symbolic expression is performed, a keystroke or set of keystrokes is used to change the settings in other embodiments.

Tracing Gestures

UI 400O and UI 400P (FIG. 4O and FIG. 4P) illustrate that, in some embodiments, the accessibility user interface facilitates the use of a finger in a tracing motion on the touch-sensitive surface to navigate through and activate portions of a symbolic expression presented in the interface. In UI 400O of FIG. 4O, user selection gesture 421 begins with a first point of contact 421-1 on at, near, or within selectable area 420-2. In response, the current focus is placed at the portion of the symbolic expression corresponding to selectable area 420-2 (i.e., x) and audible information about the corresponding portion is emitted, e.g., "x" and/or "left-hand side". As user selection gesture 421 begins to move 421-2 across the touch-sensitive surface, the current focus moves to other portions of the symbolic expression. In the example of UI 400O, user selection gesture 421 leaves 421-2 selectable area 420-2 and moves 421-2 across selectable areas 420-3, 420-4, and 420-5 corresponding to the equals operator portion, the right-hand side portion, and the fraction bar portion of the symbolic expression respectively, so the current focus is identified as being the equals operator portion, followed by the right-hand side portion, followed by the fraction bar portion as the user selection gesture 421 moves 421-2 across the touch-sensitive surface. Audible information about the equals operator portion is emitted, e.g., "equals", as or when the user selection gesture 421 enters 421-2 or moves 421-2 on, at, near, or within selectable area 420-3. Audible information about the right-hand side portion is emitted, e.g., "right-hand side", "fraction", or "the fraction minus b plus or minus the square root of b squared minus 4 times a times c over 2 times a", as or when the user selection gesture 421 enters 421-2 or moves 421-2 on, at, near, or within selectable area 420-4. Audible information about the fraction bar portion is emitted, e.g., "fraction bar" or a sound indicating a faction bar, as or when the user selection gesture 421 enters 421-2 or moves 421-2 on, at, near, or within selectable area 420-5.

In some embodiments, an audible transition sound is emitted as or when the user selection gesture leaves one selectable area (e.g., moves across a boundary of the selectable area from a point on, at, near, or within the selectable area to a point that is not on, at, near, or within the selectable area) and enters another selectable area (e.g., moves across a boundary of the selectable area from a point that is not on, at, near, or within the selectable area to a point that is on, at, near, or within the selectable area). For example, referring to UI 400O, as or when the user selection gesture 421 leaves 421-2 selectable area 420-1 and enters 421-2 selectable area 420-3, an audible transition sound such as a beep, whirl, click, or other sound is emitted.

Further, the transition sound may be different depending on whether the transition is from one selectable area to another selectable area nested with that selectable area or from one selectable area to another selectable area that contains that selectable area. For example, in UI 400P of FIG. 4P, user selection gesture 422 begins with a first point of contact 422-1 on at, near, or within selectable area 420-1. In response, the current focus is placed at the portion of the symbolic expression corresponding to selectable area 420-1 (i.e., the entire quadratic equation) and Audible information about the corresponding portion is emitted, e.g., "symbolic expression", "equation", "quadratic equation", and/or "x equals the fraction minus b plus or minus the square root of b squared minus 4 times a times c over 2 times a". As user selection gesture 422 begins to move 422-2 across the touch-sensitive surface, the current focus moves to other portions of the symbolic expression.

In the example of UI 400P, user selection gesture 422 leaves selectable area 420-1 and enters 422-2 selectable area 420-4 corresponding to the right-hand side portion, so the current focus is identified as being the right-hand side portion and a transition sound followed by audible information associated with the right-hand side portion are emitted. The transition sound may be distinctive such that it indicates to the user (e.g., through pitch, pitch variance, number of distinct sounds, types of sound, etc.) that a nested selectable area is being entered by the user selection gesture 422 (in this example, selectable area 420-4 is nested within selectable area 420-1). The transition sound may also indicate the level of nesting of the selectable area being entered relative to the outermost selectable area (in this example, the selectable area 420-4 being entered is one level nested relative to outermost selectable area 420-1). Audible information about the right-hand side portion is emitted, e.g., "right-hand side", "fraction", or "the fraction minus b plus or minus the square root of b squared minus 4 times a times c over 2 times a", as or when the user selection gesture 422 enters 422-2 or moves 422-2 on, at, near, or within selectable area 420-4.

Continuing the example of UI 400P, user selection gesture 422 leaves selectable area 420-4 and enters 422-2 selectable area 420-7 corresponding to the numerator portion, so the current focus is identified as being the numerator portion and a transition sound followed by audible information associated with the numerator portion are emitted. The transition sound may be distinctive such that it indicates to the user (e.g., through pitch, pitch variance, number of distinct sounds, types of sound, etc.) that a nested selectable area is being entered by the user selection gesture 422 (in this example, selectable area 420-7 is nested within selectable area 420-4). The transition sound may also indicate the level of nesting of the selectable area being entered relative to the outermost selectable area (in this example, the selectable area 420-7 being entered is two levels nested relative to outermost selectable area 420-1). Audible information about the numerator portion is emitted, e.g., "numerator" or "minus b plus or minus the square root of b squared minus 4 times a times c", as or when the user selection gesture 422 enters 422-2 or moves 422-2 on, at, near, or within selectable area 420-7.

Continuing the example of UI 400P, user selection gesture 422 leaves selectable area 420-7 and enters 422-2 selectable area 420-11 corresponding to the square root portion, so the current focus is identified as being the square root portion and a transition sound followed by audible information associated with the square root portion are emitted. The transition sound may be distinctive such that it indicates to the user (e.g., through pitch, pitch variance, number of distinct sounds, types of sound, etc.) that a nested selectable area is being entered by the user selection gesture 422 (in this example, selectable area 420-11 is nested within selectable area 420-7). In this case, the transition sound may also indicate the level of nesting of the selectable area being entered relative to the outermost selectable area (in this example, the selectable area 420-11 being entered is three levels nested relative to outermost selectable area 420-1). Audible information about the square root portion is emitted, e.g., "square root" or "the square root of b squared minus 4 times a times c", as or when the user selection gesture 422 enters 422-2 or moves 422-2 on, at, near, or within selectable area 420-11.

Continuing the example of UI 400P, user selection gesture 422 leaves selectable area 420-11 and enters 422-2 selectable area 420-12 corresponding to operand of the square root, so the current focus is identified as being the operand of the square root and a transition sound followed by audible information associated with the operand of the square root portion are emitted. The transition sound may be distinctive such that it indicates to the user (e.g., through pitch, pitch variance, number of distinct sounds, types of sound, etc.) that a nested selectable area is being entered by the user selection gesture 422 (in this example, selectable area 420-12 is nested within selectable area 420-11). In this case, the transition sound may also indicate the level of nesting of the selectable area being entered relative to the outermost selectable area (in this example, the selectable area 420-12 being entered is four levels nested relative to outermost selectable area 420-1). Audible information about the operand of the square root is emitted, e.g., "b squared minus 4 times a times c", as or when the user selection gesture 422 enters 422-2 or moves 422-2 on, at, near, or within selectable area 420-12. Although not shown, the individual tokens (e.g., b, 4, a, c) or groupings of individual tokens (e.g., $b^2$ or 4ac) of the square root operand could each also be within their own respective selectable areas nested with selectable area 420-12.

Continuing the example of UI 400P, user selection gesture 422 leaves 422-2 selectable area 420-12 and re-enters 422-2 selectable area 420-11 corresponding to the square root portion, so the current focus is identified as being the square root portion and a transition sound followed by audible information associated with the square root portion are emitted. The transition sound may be distinctive such that it indicates to the user (e.g., through pitch, pitch variance, number of distinct sounds, types of sound, etc.) that a containing selectable area is being entered by the user selection gesture 422 (in this example, selectable area 420-11 contains selectable area 420-12). In this case, the transition sound may also indicate the level of nesting of the containing selectable area being entered relative to the outermost selectable area (in this example, the containing selectable area 420-11 being entered is three levels nested relative to outermost selectable area 420-1). Audible information about the square root portion is emitted, e.g., "square root" or "the square root of b squared minus 4 times a times c", as or when the user selection gesture 422 enters 422-2 or moves 422-2 on, at, near, or within selectable area 420-12.

Continuing the example of UI 400P, user selection gesture 422 leaves 422-2 selectable area 420-11 and re-enters 422-2 selectable area 420-17 corresponding to the numerator portion, so the current focus is identified as being the numerator portion and a transition sound followed by audible information associated with the numerator portion are emitted. The transition sound may be distinctive such that it indicates to the user (e.g., through pitch, pitch variance, number of distinct sounds, types of sound, etc.) that a containing selectable area is being entered by the user selection gesture 422 (in this example, selectable area 420-7 contains selectable area 420-11). In this case, the transition sound may also indicate the level of nesting of the containing selectable area being entered relative to the outermost selectable area (in this example, the containing selectable area 420-7 being entered is two levels nested relative to outermost selectable area 420-1). Audible information about the numerator portion is emitted, e.g., "numerator" or "minus b plus or minus the square root of b squared minus 4 times a times c", as or when the user selection gesture 422 enters 422-2 or moves 422-2 on, at, near, or within selectable area 420-7.

Continuing the example of UI 400P, user selection gesture 422 leaves 422-2 selectable area 420-7 and re-enters 422-2 selectable area 420-4 corresponding to the right-hand side portion, so the current focus is identified as being the right-hand side portion and a transition sound followed by audible information associated with the right-hand side portion are emitted. The transition sound may be distinctive such that it indicates to the user (e.g., through pitch, pitch variance, number of distinct sounds, types of sound, etc.) that a containing selectable area is being entered by the user selection gesture 422 (in this example, selectable area 420-4 contains selectable area 420-7). In this case, the transition sound may also indicate the level of nesting of the containing selectable area being entered relative to the outermost selectable area (in this example, the containing selectable area 420-4 being entered is one level nested relative to outermost selectable area 420-1). Accessibility information about the right-hand side portion is emitted, e.g., "right-hand side", "fraction", or "the fraction minus b plus or minus the square root of b squared minus 4 times a times c over 2 times a", as or when the user selection gesture 422 enters 422-2 or moves 422-2 on, at, near, or within selectable area 420-4.

Continuing the example of UI 400P, user selection gesture 422 leaves 422-2 selectable area 420-4 and enters 422-2 selectable area 420-5 corresponding to the fraction bar, so the current focus is identified as being the fraction bar and a transition sound followed by audible information associated with the fraction bar portion are emitted. The transition sound may be distinctive such that it indicates to the user (e.g., through pitch, pitch variance, number of distinct sounds, types of sound, etc.) that a nested selectable area is being entered by the user selection gesture 422 (in this example, selectable area 420-5 is nested within selectable area 420-4). In this case, the transition sound may also indicate the level of nesting of the selectable area being entered relative to the outermost selectable area (in this example, the selectable area 420-5 being entered is two levels nested relative to outermost selectable area 420-1). Accessibility information about the fraction bar is emitted, e.g., "fraction bar" or a sound that represents a fraction bar, as or when the user selection gesture 422 enters 422-2 or moves 422-2 on, at, near, or within selectable area 420-5.

Continuing the example of UI 400P, user selection gesture 422 leaves 422-2 selectable area 420-5 and re-enters 422-2 selectable area 420-4 corresponding to the right-hand side portion, so the current focus is identified as being the right-hand side portion and a transition sound followed by audible information associated with the right-hand side portion are emitted. The transition sound may be distinctive such that it indicates to the user (e.g., through pitch, pitch variance, number of distinct sounds, types of sound, etc.) that a containing selectable area is being entered by the user selection gesture 422 (in this example, selectable area 420-4 contains selectable area 420-5). In this case, the transition sound may also indicate the level of nesting of the containing selectable area being entered relative to the outermost selectable area (in this example, the containing selectable area 420-4 being entered is one level nested relative to outermost selectable area 420-1). Accessibility information about the right-hand side portion is emitted, e.g., "right-hand side", "fraction", or "the fraction minus b plus or minus the square root of b squared minus 4 times a times c over 2 times a", as or when the user selection gesture 422 enters 422-2 or moves 422-2 on, at, near, or within selectable area 420-4.

Continuing the example of UI 400P, user selection gesture 422 leaves 422-2 selectable area 420-4 and enters 422-2 selectable area 420-6 corresponding to the denominator portion, so the current focus is identified as being the denominator and a transition sound followed by audible information associated with the denominator portion are emitted. The transition sound may be distinctive such that it indicates to the user (e.g., through pitch, pitch variance, number of distinct sounds, types of sound, etc.) that a nested selectable area is being entered by the user selection gesture 422 (in this example, selectable area 420-6 is nested within selectable area 420-4). In this case, the transition sound may also indicate the level of nesting of the selectable area being entered relative to the outermost selectable area (in this example, the selectable area 420-6 being entered is two levels nested relative to outermost selectable area 420-1). Accessibility information about the denominator is emitted, e.g., "denominator" and/or "2 times a", as or when the user selection gesture 422 enters 422-2 or moves 422-2 on, at, near, or within selectable area 420-6.

Although in some embodiments audible information associated with a portion of a symbolic expression corresponding to a selectable area is emitted both when the user selection gesture enters the selectable area from a containing selectable area and when the user selection gesture enters the selectable area from a nested selectable area, audible information is emitted only when the user selection gesture enters the selectable area from a containing selectable area in other embodiments. For example, referring to UI 400P, audible information associated with the numerator portion corresponding to selectable area 420-7 may be emitted when the user selection gesture 422 leaves 422-1 selectable area 420-4 and enters selectable area 420-7 but not when the user selection gesture 422 leaves selectable area 420-7 and enters selectable area 420-4. However, in these embodiments, a transition sound is still emitted both when the user selection gesture enters the selectable area from a containing selectable area and when the user selection gesture enters the selectable area from a nested selectable area.

While in the exemplary user interfaces 400O and 400P (and in other exemplary user interfaces of the figures), a selectable area nested within another selectable area is depicted as not sharing any portion of its border with the containing selectable area (e.g., selectable area 420-12 is depicted in UI 400O as not sharing any portion of its border with the containing selectable area 420-11), a selectable area nested within another selectable area does share at least one border with its containing selectable area in other embodiments.

While in embodiments described above audible information is output as a tracing gesture enters and leaves a selectable area, in other embodiments audible information is output as a tracing gesture is performed within a selectable area. In particular, audible information may be output as a tracing gesture performed within a selectable area traces the display area of a symbol of the symbolic expression displayed within the selectable area. For example, referring to UI 400O, as user selection gesture 421 traces 421-2 the fraction symbol displayed in selectable area 420-5 an audible tick, click, or other sound may be output while the user selection gesture 422 is tracing 422-2 the symbol. The audible information may be output continuously while the user selection gesture 422 is tracing the 422-2 the symbol. In this way, a tracing gesture may be performed that traces a symbol of a symbolic expression to acquire a spatial layout of that symbolic through audible information that is continuously and concurrently output as the tracing of the symbol is being performed.

In some embodiments as exemplified in UI 400O and 400P (FIGS. 4O and 4P), each selectable area 414 corresponds to a portion of a symbolic expression. Although not depicted in UI 400O and 400P, in some embodiments, each individual token and layout element of a symbolic expression corresponds to a separate selectable area. For example, the number 2 and the symbol a in selectable area 414-8 may each reside in their own separate selectable areas that are sub-selectable areas of selectable area 414-8.

In some embodiments, audible information is not output for selectable areas below the current selection granularity level. For example, when tracing gesture 421 of UI 400O is performed; audible information for only selectable areas 414-1, 414-3, and 414-4 may be output. Similarly, when tracing gesture 422 of UI 400P is performed; audible information for only selectable areas 414-4, 414-5, and 414-6 may be output.

Mapping Selectable Areas Corresponding to Portions of a Symbolic Expression to a Touch-Sensitive Surface FIGS. 6A-6F illustrate accessibility user interfaces that map respective selectable areas corresponding to portions of a symbolic expression to a touch-sensitive surface in accordance with some embodiments. The selectable area mappings are part of an efficient accessibility method for navigation through complex three-dimensional symbolic expressions. A printed form of a symbolic expression can require a reader to read and understand the symbolic expression in a horizontal dimension (e.g., left to right), a vertical dimension (e.g., up and down), and layered dimension (e.g., nested sub-expression) in order to understand the expression as a whole. For example, to read and understand the symbolic expression $$x = \frac{-b \pm \sqrt{b^2 - 4ac}}{2a}$$

as the quadratic equation, the reader must read and understand the expression in a horizontal dimension to know it is an equation, in a vertical dimension to understanding the right-hand side is a fraction, and in a layered dimension to under that $b^2-4ac$ is a square root operand.

As illustrated herein, a selectable area corresponding to a portion of a symbolic expression is a discrete region of a user interface on a display. Selectable areas contain corresponding portions of the symbolic expression. Selectable areas may be organized in a hierarchical fashion (e.g., nested within each other) corresponding to a hierarchical arrangement of the corresponding portions of the symbolic expression.

In some embodiments, the accessibility user interfaces with selectable areas operate on a computing device with a display and a touch-sensitive surface (e.g., a track pad), such as a desktop computer or a laptop computer. In some embodiments, the accessibility user interfaces with selectable areas operate on a computing device with a touch-screen display. In some embodiments, the touch screen display may be used without one or more additional touch-sensitive surfaces, or one or more additional displays. In some embodiments, the accessibility user interfaces with selectable areas are used on portable computing devices (e.g., 100, FIG. 1A) or other computing devices (e.g., 300, FIG. 3).

In FIGS. 6A-6F, gestures are depicted on a touch sensitive surface 601 (e.g., a track pad) that is separate from the display. That the exemplary gestures are illustrated in these figures on a separate touch-sensitive surface 601 does not require that the gestures be performed on a track pad (or other separate touch-sensitive surface) to practice the techniques disclosed herein. For example, in some embodiments, the gestures may be performed on a touch screen instead. For these embodiments, a selectable area of current focus may be mapped to the entire touch screen surface while the touch screen continues to display multiple selectable areas, including the selectable area of current focus.

Table 2 describes exemplary accessibility gestures for mapped selectable area navigation. These gestures are typically finger gestures. In some embodiments, the accessibility gestures for selectable areas may also include other inputs (e.g., keyboard inputs such as holding down a modifier key, or mouse inputs) in conjunction with or in place of the finger gestures.

TABLE 2

Exemplary accessibility gestures for mapped selectable area navigation

| Detected Gesture | Response to Detected Gesture |
| --- | --- |
| Two-finger swipe right on the touch-sensitive surface. | Select a next lower selectable area associated with where the current focus is set. |
| Two-finger swipe left on the touch-sensitive surface. | Select a next higher selectable area associated with where the current focus is set. |
| Single-finger moving/dragging on the touch-sensitive surface. | Move the current focus in the current selectable area in accordance with the mapping of the current selectable area on the touch-sensitive surface and the current position of the single-finger on the touch-sensitive surface. |

In addition, navigational gestures discussed above with respect to Table 1 (e.g., location-independent gestures, location-dependent gestures, flick navigation, trace navigation, etc.) area also applicable to mapped selectable area navigation.

The accessibility gestures in Table 2 are merely exemplary. In some embodiments, a two-finger spread (depinch) gesture, instead of a two-finger swipe right gesture, is used to select a next lower (nested) selectable area associated with where the current focus is set. In some embodiments, a two-finger pinch gesture, instead of a two-finger swipe left gesture, is used to select a next higher (containing) selectable area associated with where the current focus is set. In some embodiments, the response to opposite gestures (e.g., a downward gesture versus the corresponding upward gesture, or a leftward gesture versus the corresponding rightward gesture) may be reversed from those shown in Table 2. For example, a two-finger flick left gesture may be used to select a next lower (nested) selectable area and a two-finger flick right gesture may be used to select a next higher (containing) selectable area. In some embodiments, the responses to opposite gestures are user configurable, e.g., via a settings or options menu.

Figure 6A:
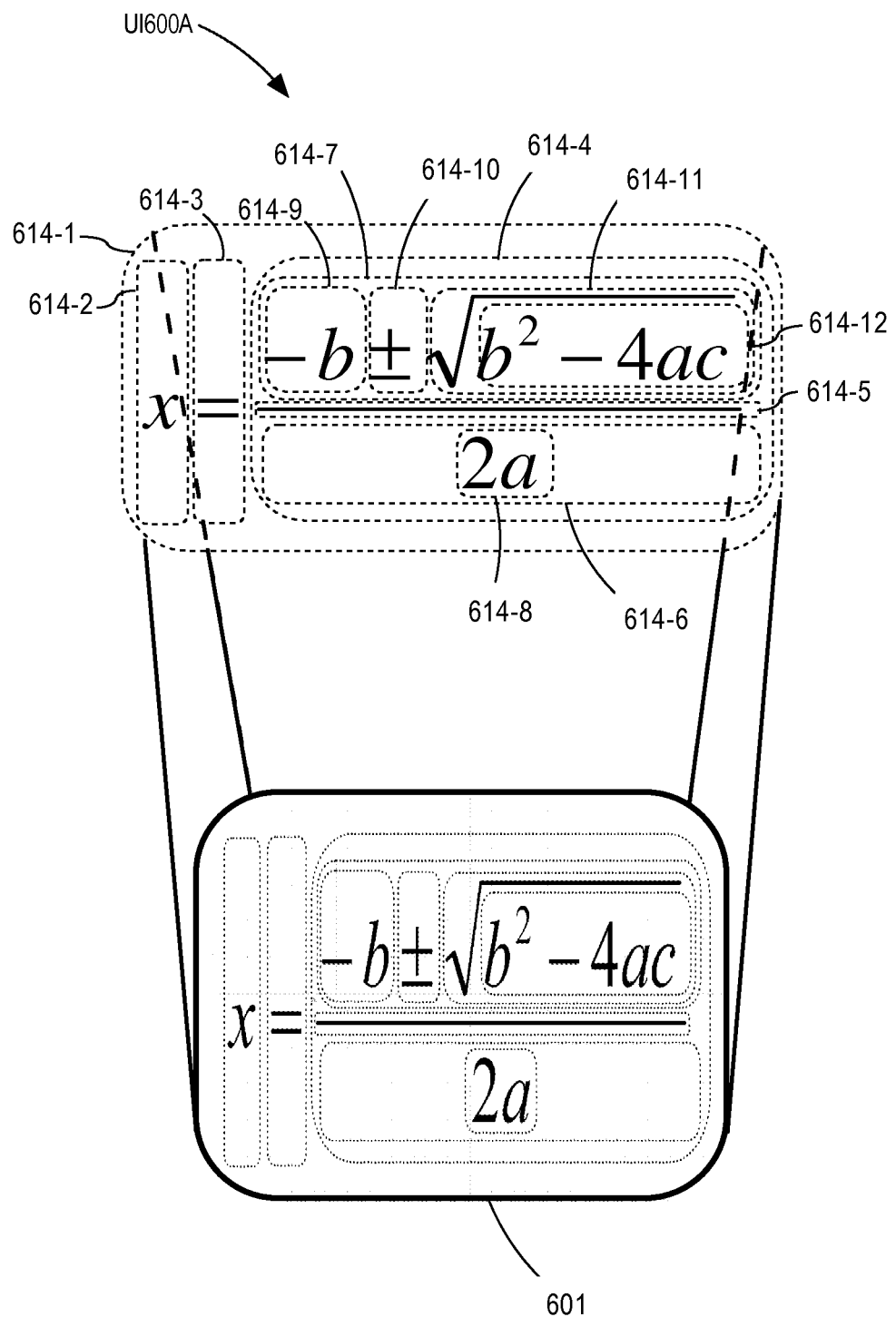
FIGS. 6A-6F illustrate accessibility user interfaces that map respective selectable areas corresponding to portions of a symbolic expression to a touch-sensitive surface in accordance with some embodiments.
Figure 6B:
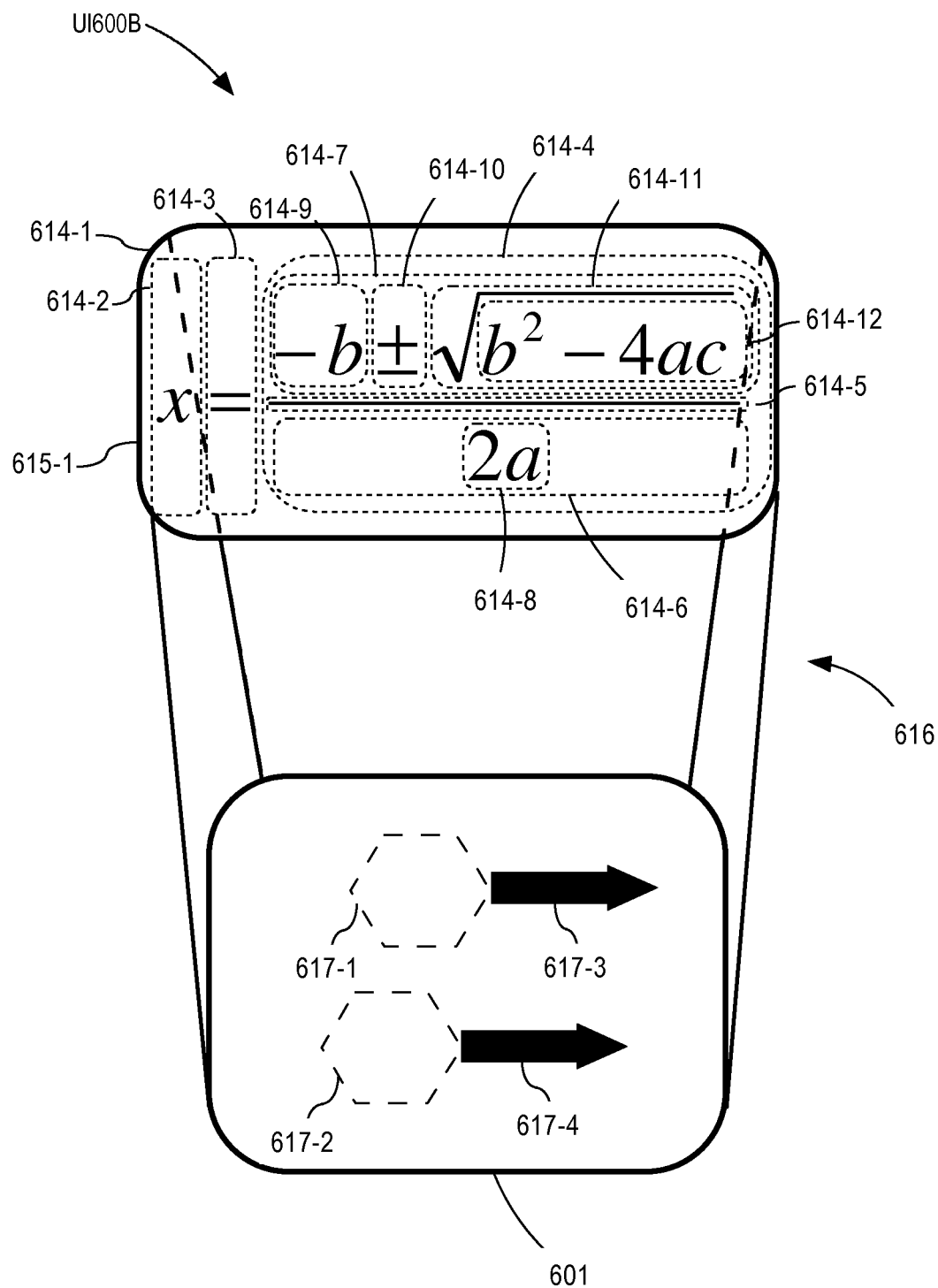

FIG. 6A depicts a mapping of a selectable area corresponding to a portion of a symbolic expression to touch-sensitive surface 601. In some embodiments, touch sensitive surface 601 is touch pad 360 on device 300 (FIG. 3).

In the example of FIG. 6A, selectable area 614-1 and the selectable areas 614-2 through 614-12 contained therein are each proportionally mapped to touch-sensitive surface 601. The proportional mapping vertically stretches and horizontally compresses each of the selectable areas 614-1 through 614-12 as necessary to fit the area of the touch-sensitive surface 601. Vertical or horizontal stretching makes it easier for a visually impaired user to touch a location on the touch-sensitive surface 601 that corresponds to a given selectable area.

UI 600B-UI 600F (FIGS. 6B-6F) depict exemplary user interfaces for navigating a hierarchical (nested) arrangement of selectable areas corresponding to hierarchical (nested) portions of a symbolic expression.

Referring to UI 600B (FIG. 6B), current selectable area indicator 615-1 (e.g., a bolded or otherwise visually highlighted border) is used to identify that the entire symbolic expression is presently selected. In some embodiments, as depicted here, current selectable area indicator may border the selectable area. In some embodiments, current selectable area indicator borders the portion of the symbolic expression to which the selectable area corresponds. Other techniques for visually highlighting the current selectable area are possible. For example, the current selectable area may be filled in with a transparent highlight color. As another example, the portion of the symbolic expression corresponding to the current selectable area may be highlighted (e.g., the color of the characters and symbols changes from black to a highlight color).

In this example, selectable area 614-1 is proportionally mapped 616 to touch-sensitive surface 601 because the current selectable area is the overall symbolic expression.

User interface selectable area selection event 617, in this example, a two-finger swipe gesture, has initial points of contact 617-1 and 617-2, following by movement (617-3 and 617-4) of these initial points of contact. Note that user interface selectable area selection event 617 is location independent. Event 617 may occur at an arbitrary angle and location on the touch-sensitive surface 601. In contrast, gestures for navigating and activating within a given selectable area (e.g., a single finger tracing gesture) are location-dependent gestures on the mapped touch-sensitive surface.

UI 600C (FIG. 6C) illustrates that in response to detecting user interface selectable area selection event 617, current selectable area indicator 615-2 has moved to a nested selectable area of the previous currently selected selectable area 614-1 to reflect that selectable area 614-4 is now the currently selected selectable area mapped to the touch-sensitive surface 601. In response to user interface selectable area selection gesture 617, selectable area 614-4 outlined by current selectable area indicator 615-2 is proportionally mapped 618 to touch-sensitive surface 601. The device may also output audible information associated with the portion of the symbolic expression associated with the currently selected selectable area 614-4 such as speaking "right-hand side", "fraction", or "the fraction minus b plus or minus the square root of b squared minus 4 times a times c over 2 times a". The device may also output a drill-down sound or a transition sound in response to user interface selectable area selection gesture 617.

Note, as exemplified by the current example, nested selectable areas may be skipped in response to a user interface selectable area selection event such as event 617. For example, selectable areas 614-2 and 614-3 nested within containing selectable area 614-1 were skipped in response to event 617. This skipping may be performed because the skipped selectable areas do not have any or have only a few nested selectable areas.

UI 600C also includes an exemplary user interface navigation gesture 619, in this example, a single-finger trace on the touch-sensitive surface 601, that has initial point of contact 619-1, following by movement 619-2 of the initial point of contact.

Figure 6C:
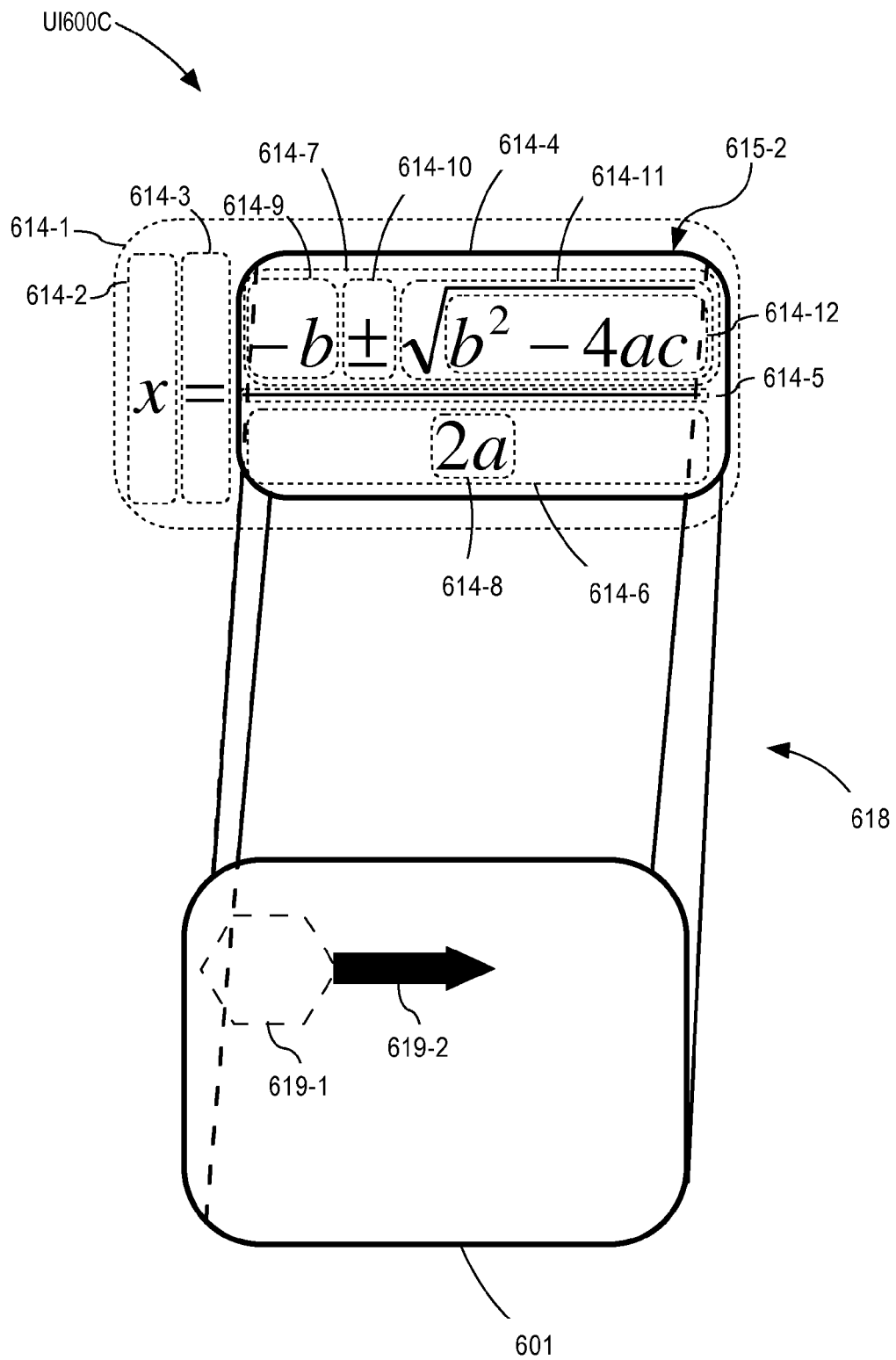
Figure 6D:
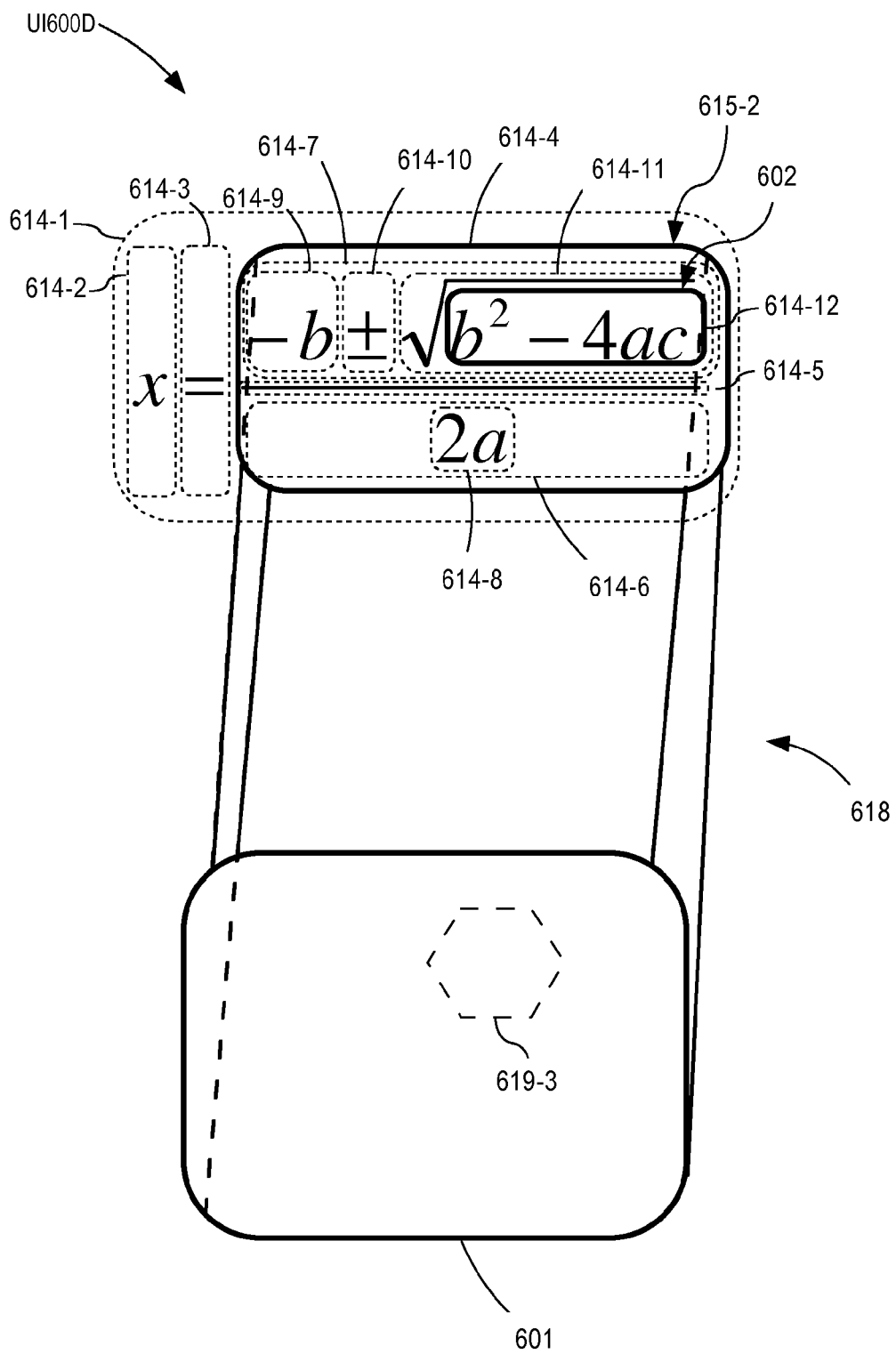
Figure 6E:
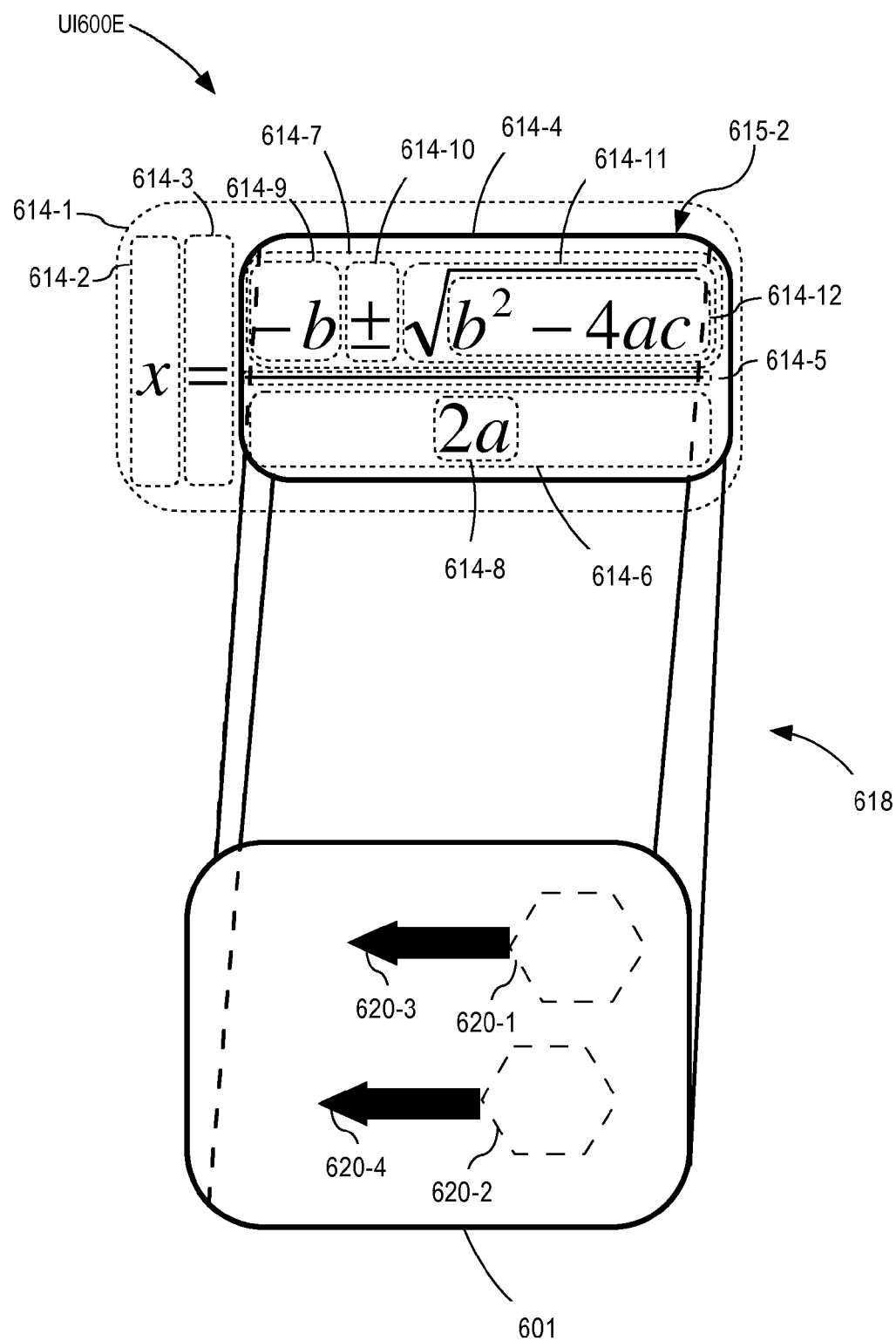
Figure 6F:
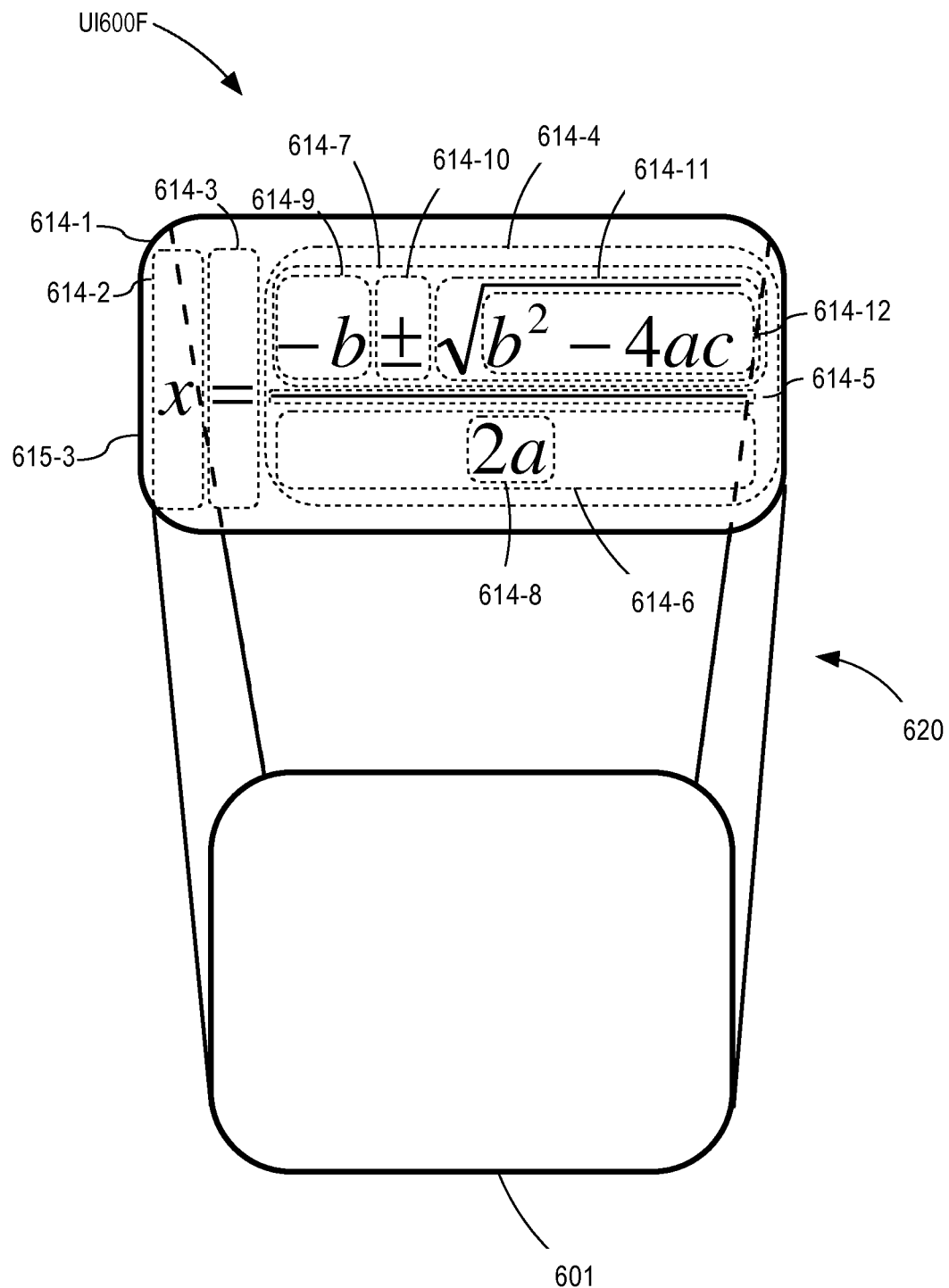

UI 600D (FIG. 6D) illustrates movement of the current focus 602 within the current selectable area 614-4 in accordance with the user interface navigation gesture 619 (FIG. 6C). Here, the current selectable area 614-4 corresponds to the right-hand side of the quadratic equation. In UI 600D, the position of the current focus 602 corresponds to the location of the moving single finger contact 619-3 on the mapped touch-sensitive surface 601. The device may also output audible information associated with the current focus 602 in response to detecting the user interface navigation gesture 629, such as speaking "square root operand" or "b squared minus 4 times a times c".

Thus, the current focus may move independently of the current selected selectable area mapped to the touch-sensitive surface. Further, the accessibility user interface may include both location-independent finger gestures for navigating between nested selectable areas, and location-dependent finger gestures for navigation within a currently selected selectable area, where the current selected selectable area is mapped to the touch-sensitive surface. Both types of gestures may also cause audible information to be output.

Referring now to UI 600E (FIG. 6E), user interface selectable area selection event 620, in this example, a two-finger swipe gesture, has initial points of contact 620-1 and 620-2, following by movement (620-3 and 620-4) of these initial points of contact. Note that user interface selectable area selection event 620 is location independent. Event 620 may occur at an arbitrary angle and location on the touch-sensitive surface 601. In contrast, gestures for navigating and activating within a given selectable area (e.g., a single finger tracing gesture) are location-dependent gestures on the mapped touch-sensitive surface.

UI 600F (FIG. 6F) illustrates that in response to detecting user interface selectable area selection event 620, current selectable area indicator 615-3 has moved to the containing selectable area 614-1 of the previous currently selected selectable area 614-4 to reflect that selectable area 614-1 is now the currently selected selectable area. In response to user interface selectable area selection gesture 620, selectable area 614-1 outlined by current selectable area indicator 615-3 is proportionally mapped 621 to touch-sensitive surface 601. The device may also output audible information associated with the portion of the symbolic expression associated with the currently selected selectable area 614-1 such as speaking "expression", "equation", "quadratic equation", or "the equation x equals the fraction minus b plus or minus the square root of b squared minus 4 times a times c over 2 times a". The device may also output an expand-up sound or a transition sound in response to user interface selectable area selection gesture 620.

Note, as exemplified by the current example, sibling selectable areas may be skipped in response to a user interface selectable area selection event such as event 620. For example, selectable areas 614-2 and 614-3 siblings of selectable area 614-4 were skipped in response to event 620. This skipping may be performed because the skipped selectable areas do not have any or have only a few nested selectable areas. Although not illustrated, containing selectable areas may also be skipped in response to a user interface selectable area selection event. For example, in response to a user interface selectable area selection event, a parent selectable area may be skipped moving directly to a grandparent, great-grandparent, or great-great grandparent, etc. selectable area.

A Process for Presenting a Symbolic Expression

Figure 7:
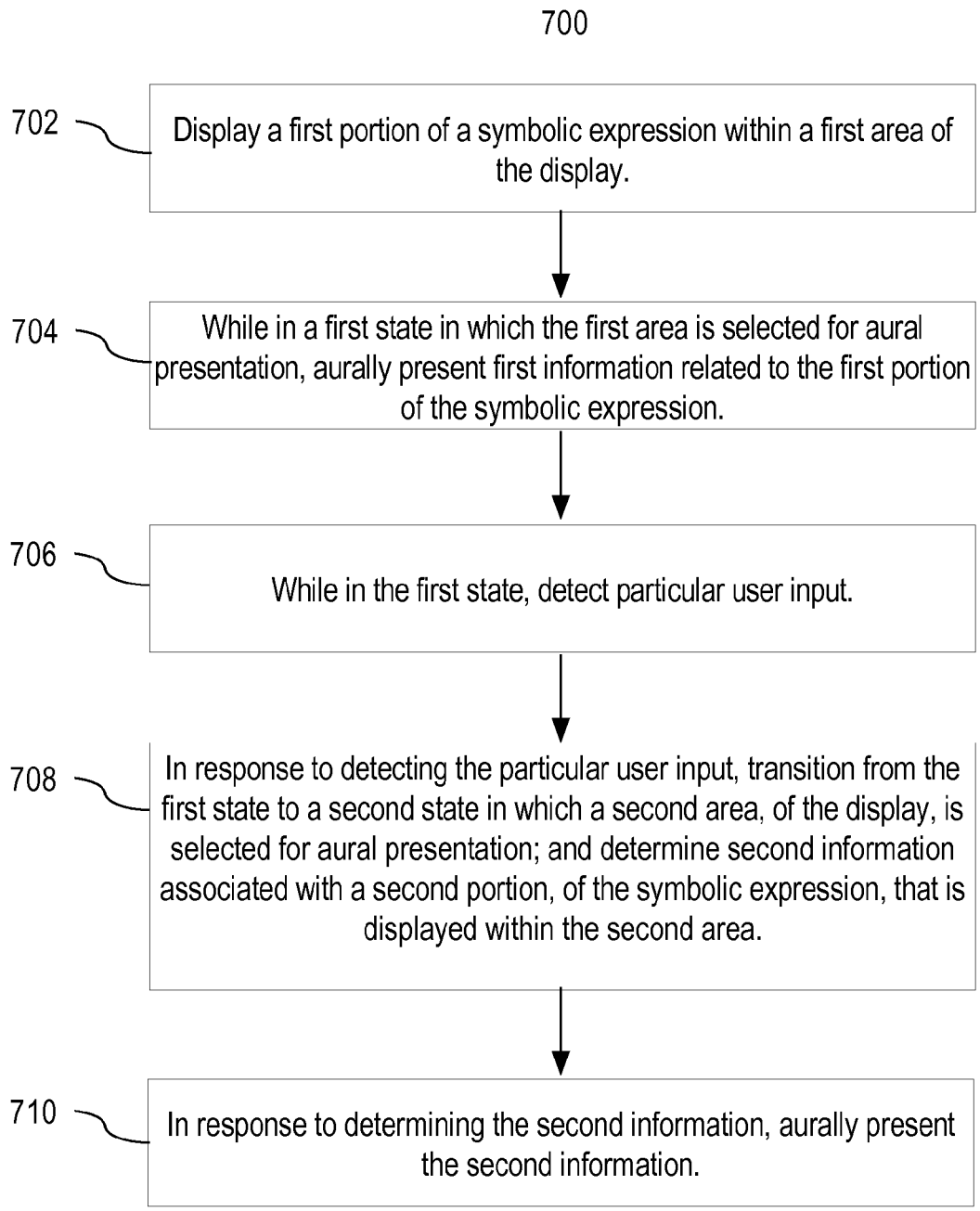
FIG. 7 is a flow diagram illustrating an accessibility method for navigation among portions of a symbolic expression in accordance with some embodiments.

FIG. 7 is a flow diagram illustrating an accessibility method for navigation among portions of a symbolic expression in accordance with some embodiments. The method 700 is performed at an electronic device such as a computing device (e.g., 300, FIG. 3) with a display in conjunction with one or more programs (e.g., accessibility module 129, operating system 126 and/or one or more applications 134). Some operations in method 700 may be combined and/or the order of some operations may be changed.

The method 700 provides an efficient way to navigate through portions of a symbolic expression and provide audible information about the portions. The method reduces the cognitive burden on a user with impaired vision when using a computing device with a display. For battery-operated devices, enabling a user to navigate faster and more efficiently conserves power and increases the time between battery charges.

The device displays (702) a symbolic expression on the display (e.g., UI 400A). The display of the symbolic expression includes display of a first portion of the symbolic expression and display of a second portion of the symbolic expression. The first portion and the second portion may be mutually exclusive portions of the symbolic expression (i.e., the two portions do not overlap in content). For example, the denominator portion of the quadratic equation 2a is mutually exclusive of the numerator portion $-b \pm \sqrt{b^2-4ac}$. The first portion may be a part of the second portion. For example, the denominator portion of the quadratic equation 2a is part of the fraction portion $$\frac{-b \pm \sqrt{b^2 - 4ac}}{2a}.$$

The second portion may be part of the first portion. For example, the denominator portion of the quadratic equation 2a is part of the fraction portion $$\frac{-b \pm \sqrt{b^2 - 4ac}}{2a}.$$

A current focus is on the first portion of the symbolic expression. Accordingly, when the current focus is on the first portion of the symbolic expression, audible information related to or describing the first portion may be output (704) upon detecting appropriate user input. The user input may be touch sensitive surface-based (e.g., finger gesture), pointing device-based (e.g., mouse), and/or keyboard-based (e.g., striking a key or holding down a key). The audible information may be a spoken description of the first portion, a navigation context sound (e.g., a beep, whirl, whistle, chime, etc.), and/or spoken navigation signpost (e.g., the current selection granularity level).

User input is detected (706) that selects a second portion of the symbolic expression for aural presentation. The user input may be touch sensitive surface-based (e.g., finger gesture), pointing device-based (e.g., mouse), and/or keyboard-based (e.g., striking a key or holding down a key). For touch sensitive surface-based input, the user input gesture may be location-dependent (e.g., a single-finger trace), location-independent (e.g., a single-finger swipe gesture, Table 1), and/or a combination of location-independent and location-dependent gestures.

In response to the user input selecting the second portion, the current focus transitions (708) from the first portion to the second portion. Information associated with the second portion is determined (708) and aurally presented (710). The audible information may be a spoken description of the second portion, a navigation context sound (e.g., a beep, whirl, whistle, chime, etc.), and/or spoken navigation signpost (e.g., the current selection granularity level).

In some embodiments, at least a portion of the information associated with the second portion that is aurally presented is determined based on a tree representation of the symbolic expression. For example, a description of the second portion may be associated with a node of the tree representation corresponding to the second portion. The description may be in a text data format that can be input to a text-to-speech transducer or may be ready-to-play digital audio content (e.g., a WAV or AAC file).

In some embodiments, multiple descriptions of the second portion are associated with the second portion and one is selected and aurally presented. Which of the multiple descriptions is selected may vary based on context and/or user settings. For example, the multiple descriptions may correspond to different verbosity levels and one of the multiple descriptions may be selected based on a currently selected verbosity level that is selected, for example, using a rotor gesture or other user input. As another example, the multiple descriptions may correspond to different learning/domain sophistication levels and one of the multiple descriptions may be selected based on a currently selected learning level selected, for example, using a rotor gesture or other user input. As yet another example, the multiple descriptions may correspond to different users or different types of users and one of the multiple descriptions may be selected based on the identity of the current user. For example, if the identity of the current user indicates that the user is a student (e.g., based on configuration data stored in memory of the device), then the description selected may be a student-orientated description. Alternatively, if the identity of the current user indicates that the user is a professional scientist, then the description selected may be a professional-orientated description.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method, comprising:
at a computing device with a touch-screen display:
displaying a first portion of a symbolic expression within a corresponding first area of the touch-screen display;
aurally presenting first information related to the first portion of the symbolic expression;
detecting a particular user input gesture on the touch-screen display;
determining whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display;
in response to determining the particular user input gesture is associated with the first operation to drill-down to the sub-portion of the symbolic expression within the corresponding first area of the touch-screen display, aurally presenting second information related to the sub-portion of the symbolic expression; and
in response to determining the particular user input gesture is associated with the second operation to navigate to the second portion of the symbolic expression within the second area of the touch-screen display, aurally presenting third information related to the second portion of the symbolic expression.

2. The method of claim 1, wherein detecting the particular user input gesture on the touch-screen display includes detecting a user interface navigation gesture on a touch-sensitive surface of the touch-screen display.

3. The method of claim 2, wherein the user interface navigation gesture is a multi-finger touch gesture comprises two or more contacts on the touch-sensitive surface.

4. The method of claim 2, wherein determining whether the particular input gesture is associated with the first operation or the second operation comprises identifying if the user interface navigation gesture is independent of contacting a location on the touch-sensitive-surface that corresponds to the second area.

5. The method of claim 2, wherein determining whether the particular input gesture is associated with the first operation comprises identifying that the user interface navigation gesture does not contact a location on the touch-sensitive surface that corresponds to the second area.

6. The method of claim 2, wherein determining whether the particular user input gestures is associated with the second operation comprises identifying that the user interface navigation gesture contacts a location on the touch-sensitive surface that corresponds to the second area.

7. The method of claim 2, further comprising:
mapping the first area of the display to the touch-sensitive surface; and
in response to detecting the particular user input gesture is associated with the second operation to navigate to the second portion of the symbolic expression within the second area of the touch-screen display:
ceasing to map the first area of the display to the touch-sensitive surface; and
proportionally mapping the second area of the display to be substantially coextensive with the touch-sensitive surface.

8. The method of claim 1, wherein the symbolic expression is a mathematical, scientific, or chemical expression, equation, or formula.

9. The method of claim 1, wherein the first operation to drill-down to the sub-portion of the symbolic expression comprises navigating to a portion of the first portion of the symbolic expression within a third area of the touch-screen display, the third area residing within the first area.

10. The method of claim 1, wherein the first information includes one or more words, aurally presented as spoken text, describing the first portion of the symbolic expression.

11. The method of claim 1, wherein the second information includes one or more words, aurally presented as spoken text, describing the sub-portion of the symbolic expression, and the third information includes one or more words, aurally presented as spoken text, describing the second portion of the symbolic expression.

12. The method of claim 1, further comprising:
in response to determining whether the particular user input gesture is associated with the first operation or the second operation, outputting a corresponding transition sound to indicate detection of the particular user input gesture, a first transition sound corresponding to the first operation differing from a second transition sounds corresponding to the second operation.

13. The method of claim 1, wherein the symbolic expression has an associated tree representation comprising a plurality of nodes representing portions of the symbolic expression and the first operation to drill-down to the sub-portion of the symbolic expression is associated with a depth-first transversal order of the tree to navigate from a first node corresponding to the first portion of the symbolic expression to a child node of the first node, the child node corresponding to the sub-portion.

14. The method of claim 1, wherein the symbolic expression has an associated tree representation comprising a plurality of nodes representing portions of the symbolic expression and the second operation to navigate from the first portion to the second portion of the symbolic expression is associated with a breadth-first transversal order of the tree to navigate from a first node corresponding to the first portion of the symbolic expression to a second node corresponding to the second portion in a same level of the tree.

15. The method of claim 1, wherein determining whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display is based upon a number of contacts detected on the touch-sensitive surface.

16. The method of claim 1, wherein determining whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display is independent of a location on the touch-sensitive surface where the user input is detected.

17. The method of claim 1, wherein the particular input gesture associated with the first operation to drill-down to a sub-portion of the symbolic expression is a multi-finger touch gesture, and the particular gesture associated with the second operation to navigate from the first portion to a second portion of the symbolic expression is a single finger gesture.

18. A computing device, comprising:
a touch-screen display having a touch-sensitive surface;
one or more processors;
memory; and
one or more programs stored in the memory and which, when executed by the one or more processors, cause the computing device to:
display a first portion of a symbolic expression within a corresponding first area of the display;
aurally present first information related to the first portion of the symbolic expression;
detect a particular user input gesture on the touch-screen display;
determine whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display;
in response to determining the particular user input gesture is associated with the first operation to drill-down to the sub-portion of the symbolic expression within the corresponding first area of the touch-screen display, aurally present second information related to the sub-portion of the symbolic expression; and
in response to determining the particular user input gesture is associated with the second operation to navigate to the second portion of the symbolic expression within the second area of the touch-screen display, aurally present third information related to the second portion of the symbolic expression.

19. The computing device of claim 18, wherein the one or more programs cause the computing device to detect the particular user input gesture on the touch-screen display by detecting a user interface navigation gesture on the touch-sensitive surface of the touch-screen display.

20. The computing device of claim 19, wherein the user interface navigation gesture is a multi-finger touch gesture comprises two or more contacts on the touch-sensitive surface.

21. The computing device of claim 19, wherein the one or more programs cause the computing device to determine whether the particular input gesture is associated with the first operation or the second operation by identifying if the user interface navigation gesture is independent of contacting a location on the touch-sensitive surface that corresponds to the second area.

22. The computing device of claim 19, wherein the one or more programs cause the computing device to determine whether the particular input gesture is associated with the first operation by identifying that the user interface navigation gesture does not contact a location on the touch-sensitive surface that corresponds to the second area.

23. The computing device of claim 19, wherein the one or more programs cause the computing device to determine whether the particular user input gestures is associated with the second operation by identifying that the user interface navigation gesture contacts a location on the touch-sensitive surface that corresponds to the second area.

24. The computing device of claim 19, wherein the one or more programs cause the computing device to:
map the first area of the display to the touch-sensitive surface; and in response to detecting the particular user input gesture is associated with the second operation to navigate to the second portion of the symbolic expression within the second area of the touch-screen display:
cease to map the first area of the display to the touch-sensitive surface; and
proportionally map the second area of the display to be substantially coextensive with the touch-sensitive surface.

25. The computing device of claim 18, wherein the symbolic expression is a mathematical, scientific, or chemical expression, equation, or formula.

26. The computing device of claim 18, wherein the first operation to drill-down to the sub-portion of the symbolic expression comprises navigating to a portion of the first portion of the symbolic expression within a third area of the touch-screen display, the third area residing within the first area.

27. The computing device of claim 18, wherein the first information includes one or more words, aurally presented as spoken text, describing the first portion of the symbolic expression.

28. The computing device of claim 18, wherein the second information includes one or more words, aurally presented as spoken text, describing the sub-portion of the symbolic expression, and the third information includes one or more words, aurally presented as spoken text, describing the second portion of the symbolic expression.

29. The computing device of claim 18, wherein the one or more programs cause the computing device to:
in response to determining whether the particular user input gesture is associated with the first operation or the second operation, output a corresponding transition sound to indicate detection of the particular user input gesture, a first transition sound corresponding to the first operation differing from a second transition sounds corresponding to the second operation.

30. The computing device of claim 18, wherein the symbolic expression has an associated tree representation comprising a plurality of nodes representing portions of the symbolic expression and the first operation to drill-down to the sub-portion of the symbolic expression is associated with a depth-first transversal order of the tree to navigate from a first node corresponding to the first portion of the symbolic expression to a child node of the first node, the child node corresponding to the sub-portion.

31. The computing device of claim 18, wherein the symbolic expression has an associated tree representation comprising a plurality of nodes representing portions of the symbolic expression and the second operation to navigate from the first portion to the second portion of the symbolic expression is associated with a breadth-first transversal order of the tree to navigate from a first node corresponding to the first portion of the symbolic expression to a second node corresponding to the second portion in a same level of the tree.

32. The computing device of claim 18, wherein the one or more programs cause the computing device to determine whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display based upon a number of contacts detected on the touch-sensitive surface.

33. The computing device of claim 18, wherein the one or more programs cause the computing device to determine whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display independent of a location on the touch-sensitive surface where the user input is detected.

34. The computing device of claim 18, wherein the particular input gesture associated with the first operation to drill-down to a sub-portion of the symbolic expression is a multi-finger touch gesture, and the particular gesture associated with the second operation to navigate from the first portion to a second portion of the symbolic expression is a single finger gesture.

35. One or more non-transitory computer-readable media storing one or more programs which, when executed by a computing device with a touch-screen display, cause the computing device to perform a method comprising:
displaying a first portion of a symbolic expression within a corresponding first area of the touch-screen display;
aurally presenting first information related to the first portion of the symbolic expression;
detecting a particular user input gesture on the touch-screen display;
determining whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display;
in response to determining the particular user input gesture is associated with the first operation to drill-down to the sub-portion of the symbolic expression within the corresponding first area of the touch-screen display, aurally presenting second information related to the sub-portion of the symbolic expression; and
in response to determining the particular user input gesture is associated with the second operation to navigate to the second portion of the symbolic expression within the second area of the touch-screen display,
presenting third information related to the second portion of the symbolic expression.

36. The non-transitory computer-readable media of claim 35, wherein detecting the particular user input gesture on the touch-screen display includes detecting a user interface navigation gesture on a touch-sensitive surface of the touch-screen display.

37. The non-transitory computer-readable media of claim 36, wherein the user interface navigation gesture is a multi-finger touch gesture comprises two or more contacts on the touch-sensitive surface.

38. The non-transitory computer-readable media of claim 36, wherein determining whether the particular input gesture is associated with the first operation or the second operation comprises identifying if the user interface navigation gesture is independent of contacting a location on the touch-sensitive surface that corresponds to the second area.

39. The non-transitory computer-readable media of claim 36, wherein determining whether the particular input gesture is associated with the first operation comprises identifying that the user interface navigation gesture does not contact a location on the touch-sensitive surface that corresponds to the second area.

40. The non-transitory computer-readable media of claim 36, wherein determining whether the particular user input gestures is associated with the second operation comprises identifying that the user interface navigation gesture contacts a location on the touch-sensitive surface that corresponds to the second area.

41. The non-transitory computer-readable media of claim 36, further comprising:
mapping the first area of the display to the touch-sensitive surface; and
in response to detecting the particular user input gesture is associated with the second operation to navigate to the second portion of the symbolic expression within the second area of the touch-screen display:
ceasing to map the first area of the display to the touch-sensitive surface; and proportionally mapping the second area of the display to be substantially coextensive with the touch-sensitive surface.

42. The non-transitory computer-readable media of claim 19, wherein the symbolic expression is a mathematical, scientific, or chemical expression, equation, or formula.

43. The non-transitory computer-readable media of claim 35, wherein the first operation to drill-down to the sub-portion of the symbolic expression comprises navigating to a portion of the first portion of the symbolic expression within a third area of the touch-screen display, the third area residing within the first area.

44. The non-transitory computer-readable media of claim 35, wherein the first information includes one or more words, aurally presented as spoken text, describing the first portion of the symbolic expression.

45. The non-transitory computer-readable media of claim 35, wherein the second information includes one or more words, aurally presented as spoken text, describing the sub-portion of the symbolic expression, and the third information includes one or more words, aurally presented as spoken text, describing the second portion of the symbolic expression.

46. The non-transitory computer-readable media of claim 19, further comprising:
in response to determining whether the particular user input gesture is associated with the first operation or the second operation, outputting a corresponding transition sound to indicate detection of the particular user input gesture, a first transition sound corresponding to the first operation differing from a second transition sounds corresponding to the second operation.

47. The non-transitory computer-readable media of claim 35, wherein the symbolic expression has an associated tree representation comprising a plurality of nodes representing portions of the symbolic expression and the first operation to drill-down to the sub-portion of the symbolic expression is associated with a depth-first transversal order of the tree to navigate from a first node corresponding to the first portion of the symbolic expression to a child node of the first node, the child node corresponding to the sub-portion.

48. The non-transitory computer-readable media of claim 35, wherein the symbolic expression has an associated tree representation comprising a plurality of nodes representing portions of the symbolic expression and the second operation to navigate from the first portion to the second portion of the symbolic expression is associated with a breadth-first transversal order of the tree to navigate from a first node corresponding to the first portion of the symbolic expression to a second node corresponding to the second portion in a same level of the tree.

49. The non-transitory computer-readable media of claim 35, wherein determining whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display is based upon a number of contacts detected on the touch-sensitive surface.

50. The non-transitory computer-readable media of claim 35, wherein determining whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display is independent of a location on the touch-sensitive surface where the user input is detected.

51. The non-transitory computer-readable media of claim 35, wherein the particular input gesture associated with the first operation to drill-down to a sub-portion of the symbolic expression is a multi-finger touch gesture, and the particular gesture associated with the second operation to navigate from the first portion to a second portion of the symbolic expression is a single finger gesture.

52. A computing device having a graphical user interface, the computing device comprising:
a touch-screen display having a touch-sensitive surface;
a symbolic expression displayed on the touch-screen display;
a plurality of selectable areas of the touch-screen display;
wherein:
the symbolic expression has a plurality of portions,
each selectable area of the plurality of selectable areas corresponds to a portion of the plurality of portions;
a first portion of the symbolic expression displayed in a first selectable area of the plurality of selectable areas and the first selectable area is selected for aural presentation, and first information related to the first portion of the symbolic expression corresponding to the first selectable area is aurally presented;
a user input of a particular input gesture on the touch-screen display for navigating to a new portion in the plurality of portions of the symbolic expression is detected, where the particular input gesture detected is determined to be one of a first type associated with a first operation to drill-down to a sub-portion of the symbolic expression within the first selectable area and a second type associated with a second operation to navigate from the first portion to a second portion of the symbolic expression within a corresponding second selectable area;
in response to determining the particular user input gesture is of the first type associated with the first operation to drill-down to the sub-portion of the symbolic expression within the first selectable area of the touch-screen display, second information related to the sub-portion of the symbolic expression is aurally presented; and
in response to determining the particular user input gesture is of the second type associated with the second operation to navigate to the second portion of the symbolic expression within the corresponding second selectable area, third information related to the second portion of the symbolic expression is aurally presented.

53. A computer-implemented method, comprising:
at a computing device with a touch-screen display:
displaying a first portion of a symbolic expression within a corresponding first area of the touch-screen display;
presenting first information related to the first portion of the symbolic expression;
detecting a particular user input gesture on the touch-screen display;
determining whether the particular input gesture is associated with a first operation to drill-down to a sub-portion of the symbolic expression within the corresponding first area of the touch-screen display or a second operation to navigate from the first portion to a second portion of the symbolic expression within a second area of the touch-screen display;
in response to determining the particular user input gesture is associated with the first operation to drill-down to the sub-portion of the symbolic expression within the corresponding first area of the touch-screen display, presenting second information related to the sub-portion of the symbolic expression; and in response to determining the particular user input gesture is associated with the second operation to navigate to the second portion of the symbolic expression within the second area of the touch-screen display, presenting third information related to the second portion of the symbolic expression.

54. The method of claim 21, wherein the computing device has or is operatively coupled to an electro-mechanical braille display; and wherein presenting the second or the third information includes sending the information to the electro-mechanical braille display.

* * * * *